(12) United States Patent
Hayashi et al.

(10) Patent No.: US 10,797,849 B2
(45) Date of Patent: Oct. 6, 2020

(54) USER TERMINAL, BASE STATION APPARATUS, AND COMMUNICATION METHOD

(71) Applicant: Sharp Kabushiki Kaisha, Sakai, Osaka (JP)

(72) Inventors: Takashi Hayashi, Sakai (JP); Shoichi Suzuki, Sakai (JP); Tatsushi Aiba, Sakai (JP); Toshizo Nogami, Sakai (JP); Wataru Ouchi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/126,307

(22) PCT Filed: Mar. 20, 2015

(86) PCT No.: PCT/JP2015/058545
§ 371 (c)(1),
(2) Date: Sep. 15, 2016

(87) PCT Pub. No.: WO2015/141838
PCT Pub. Date: Sep. 24, 2015

(65) Prior Publication Data
US 2017/0085355 A1     Mar. 23, 2017

(30) Foreign Application Priority Data

Mar. 20, 2014 (JP) .................. 2014-057355

(51) Int. Cl.
*H04L 5/00* (2006.01)
*H04L 5/14* (2006.01)
(Continued)

(52) U.S. Cl.
CPC .......... *H04L 5/0057* (2013.01); *H04L 1/0026* (2013.01); *H04L 1/0027* (2013.01);
(Continued)

(58) Field of Classification Search
CPC ... H04L 5/0057; H04L 5/0073; H04L 1/1469; H04W 88/02; H04W 88/08
(Continued)

(56) References Cited

U.S. PATENT DOCUMENTS

2014/0269451 A1* 9/2014 Papasakellariou ... H04B 7/2656
370/280
2014/0301232 A1* 10/2014 Rao ........................ H04W 24/02
370/252
(Continued)

FOREIGN PATENT DOCUMENTS

EP 3076626 * 2/2013
EP 3076626 * 11/2014
(Continued)

OTHER PUBLICATIONS

EP3076626 (Year: 2013).*
(Continued)

*Primary Examiner* — Jae Y Lee
*Assistant Examiner* — Jean F Voltaire
(74) *Attorney, Agent, or Firm* — Keating & Bennett, LLP

(57) ABSTRACT

A user terminal includes a measurement unit that performs measurement for calculating channel state information, a configuration unit that configures two subframe sets including a first subframe set and a second subframe set based on first information and second information, a transmission unit that transmits channel state information reports corresponding to the first subframe set and channel state information reports corresponding to the second subframe set. In a case where the second information is configured, the first information is not configured, and in a case where a plurality of channel state information reports of the same serving cell collides for a user terminal for which the two subframe sets are configured based on the second information, and in a (Continued)

case where the plurality of channel state information reports has physical uplink control channel reporting types having the same priority, the channel state information reports corresponding to the second subframe set are dropped.

10 Claims, 27 Drawing Sheets

(51) Int. Cl.
*H04L 1/00* (2006.01)
*H04W 88/02* (2009.01)
*H04W 88/08* (2009.01)

(52) U.S. Cl.
CPC .......... *H04L 1/0028* (2013.01); *H04L 5/0073* (2013.01); *H04L 5/1469* (2013.01); *H04W 88/02* (2013.01); *H04W 88/08* (2013.01)

(58) Field of Classification Search
USPC ...................................................... 370/280
See application file for complete search history.

(56) References Cited

U.S. PATENT DOCUMENTS

| | | | | |
|---|---|---|---|---|
| 2015/0249981 A1* | 9/2015 | Wu | ....................... | H04W 24/10 370/329 |
| 2016/0165591 A1* | 6/2016 | Li | ........................ | H04L 5/0055 370/280 |
| 2017/0188255 A1* | 6/2017 | Chandrasekhar | ..... | H04W 24/10 |

FOREIGN PATENT DOCUMENTS

| | | |
|---|---|---|
| EP | 3 076 626 A1 | 10/2016 |
| WO | 2013/070870 A2 | 5/2013 |

OTHER PUBLICATIONS

Official Communication issued in International Patent Application No. PCT/JP2015/058545, dated Jun. 23, 2015.
Ericsson et al., "On standardization impact of TDD UL-DL adaptation", 3GPP TSG-RAN WG1 #69, R1-122016, May 21-25, 2012, pp. 1-3.
Ericsson et al., "Signalling support for dynamic TDD", 3GPP TSG-RAN WG1 #72, R1-130558, Jan. 28-Feb. 1, 2013, 3 pages.
"3rd Generation Partnership Project; Technical Specification Group Radio Access Network; Evolved Universal Terrestrial Radio Access (E-UTRA); Physical layer procedures (Release 11)", 3GPP TS 36.213 V11.2.0, Feb. 2013, pp. 1-173.
Qualcomm Incorporated, "Remaining details of CSI measurement and reporting in eIMTA", 3GPP TSG RAN WG1 Meeting #76, R1-140438, Feb. 10-14, 2014, pp. 1-4.

* cited by examiner

FIG. 9

| UPLINK-DOWNLINK CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 12

| SET # | (PRIMARY CELL UL-DL CONFIGURATION, SECONDARY CELL UL-DL CONFIGURATION) | SECONDARY CELL SECOND UPLINK REFERENCE UL-DL CONFIGURATION |
|---|---|---|
| SET 1 | (1,1),(1,2),(1,4),(1,5) | 1 |
|  | (2,2),(2,5) | 2 |
|  | (3,3),(3,4),(3,5) | 3 |
|  | (4,4),(4,5) | 4 |
|  | (5,5) | 5 |
| SET 2 | (1,0),(2,0),(3,0),(4,0),(5,0),(6,0) | 0 |
|  | (2,1),(4,1),(5,1) | 1 |
|  | (5,2) | 2 |
|  | (4,3),(5,3) | 3 |
|  | (5,4) | 4 |
|  | (1,6),(2,6),(3,6),(4,6),(5,6) | 6 |
| SET 3 | (3,1) | 1 |
|  | (3,2),(4,2) | 2 |
|  | (1,3),(2,3) | 3 |
|  | (2,4) | 4 |
| SET 4 | (0,0),(6,0) | 0 |
|  | (0,1),(0,2),(0,4),(0,5),(6,1),(6,2),(6,5) | 1 |
|  | (0,3),(0,6) | 3 |
|  | (6,4) | 4 |
|  | (0,6),(6,6) | 6 |

FIG. 14

| SET # | (PRIMARY CELL UL-DL CONFIGURATION, SECONDARY CELL UL-DL CONFIGURATION) | SECONDARY CELL SECOND DOWNLINK REFERENCE UL-DL CONFIGURATION |
|---|---|---|
| SET 1 | (0,0) | 0 |
| | (1,0),(1,1),(1,6) | 1 |
| | (2,0),(2,2),(2,1),(2,6) | 2 |
| | (3,0),(3,3),(3,6) | 3 |
| | (4,0),(4,1),(4,3),(4,4),(4,6) | 4 |
| | (5,0),(5,1),(5,2),(5,3),(5,4),(5,5),(5,6) | 5 |
| | (6,0),(6,6) | 6 |
| SET 2 | (0,1),(6,1) | 1 |
| | (0,2),(1,2),(6,2) | 2 |
| | (0,3),(6,3) | 3 |
| | (0,4),(1,4),(3,4),(6,4) | 4 |
| | (0,5),(1,5),(2,5),(3,5),(4,5),(6,5) | 5 |
| | (0,6) | 6 |
| SET 3 | (3,1),(1,3) | 4 |
| | (3,2),(4,2),(2,3),(2,4) | 5 |
| SET 4 | (0,1),(02),(0,3),(0,4),(0,5),(0,6) | 0 |
| | (1,2),(1,4),(1,5) | 1 |
| | (2,5) | 2 |
| | (3,4),(3,5) | 3 |
| | (4,5) | 4 |
| | (6,1),(6,2),(6,3),(6,4),(6,5) | 6 |
| SET 5 | (1,3) | 1 |
| | (2,3),(2,4) | 2 |
| | (3,1),(3,2) | 3 |
| | (4,2) | 4 |

FIG. 15

| CONDITION | FIRST UPLINK REFERENCE UL-DL CONFIGURATION | FIRST DOWNLINK REFERENCE UL-DL CONFIGURATION |
|---|---|---|
| (a) | D | D |
| (b) | U | U or D |
| (c) | S | S or D |

FIG. 16

| CONDITION | FIRST UPLINK REFERENCE UL-DL CONFIGURATION | FIRST DOWNLINK REFERENCE UL-DL CONFIGURATION | TRANSMISSION DIRECTION UL-DL CONFIGURATION |
|---|---|---|---|
| (d) | D | D | D |
| (e) | U | U | U |
| (f) | U | D | U or D |
| (g) | S | S | S |
| (h) | S | D | S or D |

FIG. 17

| FIRST UPLINK REFERENCE UL-DL CONFIGURATION | FIRST DOWNLINK REFERENCE UL-DL CONFIGURATION | TRANSMISSION DIRECTION UL-DL CONFIGURATION |
|---|---|---|
| 0 | 0 | – (0) |
| 0 | 1 | 0, 1, 6 |
| 0 | 2 | 0, 1, 2, 6 |
| 0 | 3 | 0, 3, 6 |
| 0 | 4 | 0, 1, 3, 4, 6 |
| 0 | 5 | 0, 1, 2, 3, 4, 5, 6 |
| 0 | 6 | 0, 6 |
| 1 | 1 | – (1) |
| 1 | 2 | 1, 2 |
| 1 | 4 | 1, 4 |
| 1 | 5 | 1, 2, 4, 5 |
| 2 | 2 | – (2) |
| 2 | 5 | 2, 5 |
| 3 | 3 | – (3) |
| 3 | 4 | 3, 4 |
| 3 | 5 | 3, 4, 5 |
| 4 | 4 | – (4) |
| 4 | 5 | 4, 5 |
| 5 | 5 | – (5) |
| 6 | 6 | – (6) |
| 6 | 1 | 1, 6 |
| 6 | 2 | 1, 2, 6 |
| 6 | 3 | 3, 6 |
| 6 | 4 | 1, 3, 4, 6 |
| 6 | 5 | 1, 2, 3, 4, 5, 6 |

FIG. 18

| UPLINK-DOWNLINK CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 |   |   |   | 4 | 6 |   |   |   |
| 1 |   | 6 |   |   | 4 |   | 6 |   |   | 4 |
| 2 |   |   |   | 4 |   |   |   |   | 4 |   |
| 3 | 4 |   |   |   |   |   |   |   | 4 | 4 |
| 4 |   |   |   |   |   |   |   |   | 4 | 4 |
| 5 |   |   |   |   |   |   |   |   | 4 |   |
| 6 | 7 | 7 |   |   |   | 7 | 7 |   |   | 5 |

FIG. 19

| UPLINK-DOWNLINK CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 |   |   |   | 7 | 4 |   |   |   |
| 1 |   | 4 |   |   | 6 |   | 4 |   |   | 6 |
| 2 |   |   |   | 6 |   |   |   |   | 6 |   |
| 3 | 6 |   |   |   |   |   |   |   | 6 | 6 |
| 4 |   |   |   |   |   |   |   |   | 6 | 6 |
| 5 |   |   |   |   |   |   |   |   | 6 |   |
| 6 | 6 | 4 |   |   |   | 7 | 4 |   |   | 6 |

FIG. 20

| UPLINK-DOWNLINK CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

FIG. 21

| UPLINK-DOWNLINK CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | | | 6 | | 4 | | | 6 | | 4 |
| 1 | | | 7, 6 | 4 | | | | 7, 6 | 4 | |
| 2 | | | 8, 7, 4, 6 | | | | | 8, 7, 4, 6 | | |
| 3 | | | 7, 6, 11 | 6, 5 | 5, 4 | | | | | |
| 4 | | | 12, 8, 7, 11 | 6, 5, 4, 7 | | | | | | |
| 5 | | | 13, 12, 9, 8, 7, 5, 4, 11, 6 | | | | | | | |
| 6 | | | 7 | 7 | 5 | | | 7 | 7 | |

FIG. 22

| CQI INDEX | MODULATION | CODING RATE × 1024 | EFFICIENCY |
|---|---|---|---|
| 0 | OUT OF RANGE | | |
| 1 | QPSK | 73 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

FIG. 24

| RADIO FRAME NUMBER | 0 | | | | | | | | | | 1 | | | | | | | | | |
|---|---|---|---|---|---|---|---|---|---|---|---|---|---|---|---|---|---|---|---|---|
| SUBFRAME NUMBER | 0 | 1 | 2 | 3 | 4 | 5 | 6 | 7 | 8 | 9 | 0 | 1 | 2 | 3 | 4 | 5 | 6 | 7 | 8 | 9 |
| SUBFRAME SET | a | a | - | b | b | a | a | - | b | a | a | a | - | b | b | a | a | - | b | a |
| UPLINK REFERENCE UL-DL CONFIGURATION 0 | D | S | U | U | U | D | S | U | U | U | D | S | U | U | U | D | S | U | U | U |
| DOWNLINK REFERENCE UL-DL CONFIGURATION 2 | D | S | U | D | D | D | D | U | D | D | D | S | U | D | D | D | S | U | D | D |
| TRANSMISSION DIRECTION UL-DL CONFIGURATION 1 | D | S | U | U | D | D | D | S | U | D | | | | | | | | | | |
| PERIODIC CSI REPORT | | | | | R | | | | | | | | | | | | | P | | |
| CSI REFERENCE RESOURCE | | | | | | | | | | | | | | | | | | | | |

NO EFFECTIVE UL-DL CONFIGURATION

SUBFRAME POSITIONED BEFORE FOUR OR MORE SUBFRAMES FROM SUBFRAME IN WHICH CSI IS REPORTED

FIG. 25

| RADIO FRAME NUMBER | 0 | | | | | | | | | | 1 | | | | | | | | | |
|---|---|---|---|---|---|---|---|---|---|---|---|---|---|---|---|---|---|---|---|---|
| SUBFRAME NUMBER | 0 | 1 | 2 | 3 | 4 | 5 | 6 | 7 | 8 | 9 | 0 | 1 | 2 | 3 | 4 | 5 | 6 | 7 | 8 | 9 |
| SUBFRAME SET | a | a | - | b | b | a | a | - | b | a | a | a | - | b | b | a | a | - | b | a |
| UPLINK REFERENCE UL-DL CONFIGURATION 0 | D | S | U | U | U | D | S | U | U | U | D | S | U | U | U | D | S | U | U | U |
| DOWNLINK REFERENCE UL-DL CONFIGURATION 2 | D | S | U | D | D | D | S | U | D | D | D | S | U | D | D | D | D | U | D | D |
| TRANSMISSION DIRECTION UL-DL CONFIGURATION 1 | D | S | U | U | D | D | S | U | U | D | \multicolumn{10}{c|}{NO EFFECTIVE UL-DL CONFIGURATION} |
| CSI REQUEST | | | | | | G | | | | | | | | | | | | | | |
| APERIODIC CSI REPORT | | | | | | | | | R | | | | A | | | | | | | |
| CSI REFERENCE RESOURCE | | | | | | | | | | | | | | | | | | | | |

SUBFRAME POSITIONED BEFORE FOUR OR MORE SUBFRAMES FROM SUBFRAME IN WHICH CSI IS REPORTED, AND SUBFRAME IN WHICH CSI REQUEST IS DETECTED OR SUBSEQUENT SUBFRAME

| | | SUBFRAME SET INDEX |
|---|---|---|
| eICIC SUBFRAME SET | FIRST SUBFRAME SET | 0 |
| | SECOND SUBFRAME SET | 1 |
| eIMTA SUBFRAME SET | THIRD SUBFRAME SET | 2 |
| | FOURTH SUBFRAME SET | 3 |

FIG. 30

|  |  | SUBFRAME SET INDEX |
|---|---|---|
| eICIC SUBFRAME SET | FIRST SUBFRAME SET | 0 |
|  | SECOND SUBFRAME SET | 1 |
| eIMTA SUBFRAME SET | THIRD SUBFRAME SET | 0 |
|  | FOURTH SUBFRAME SET | 1 |

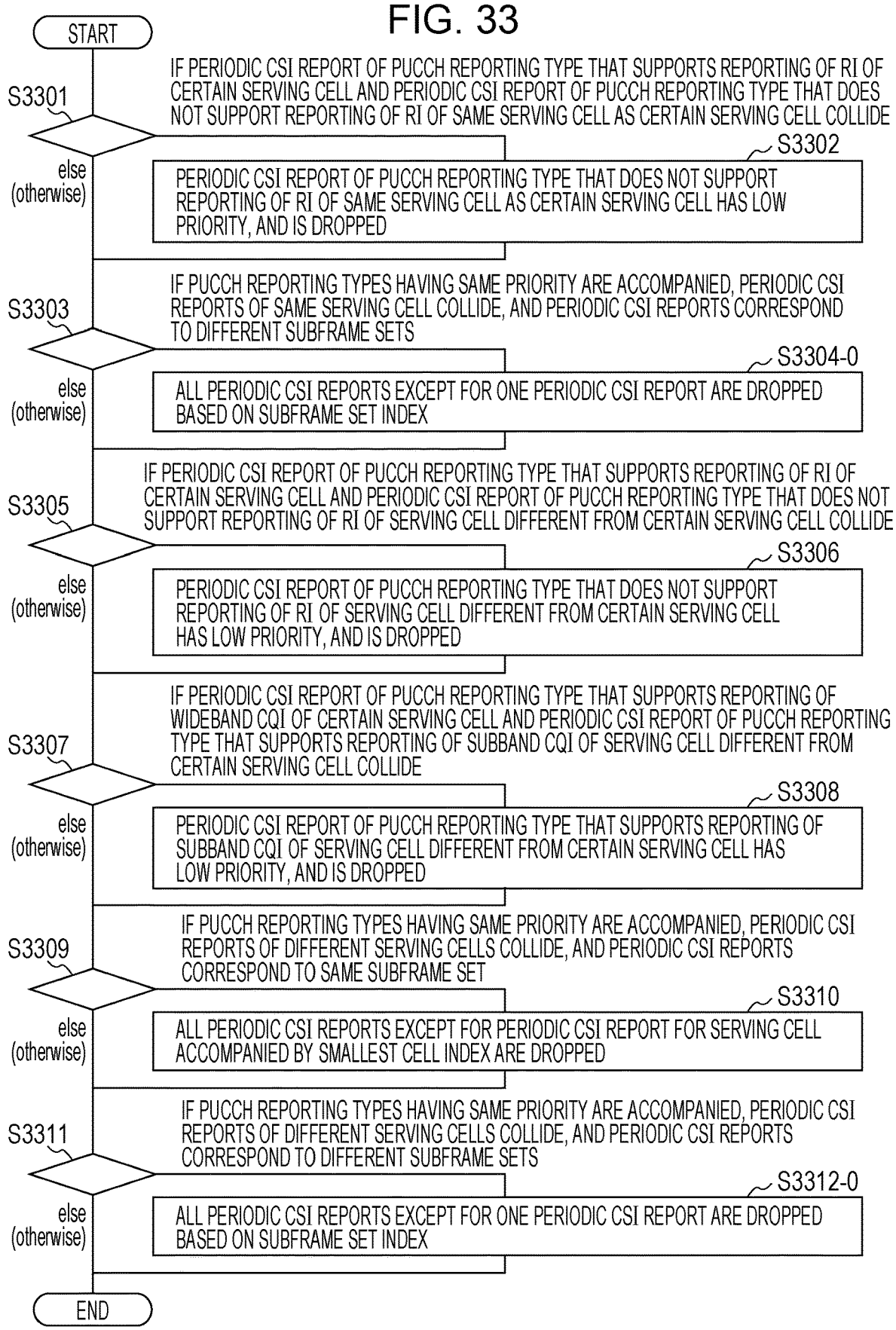

USER TERMINAL, BASE STATION APPARATUS, AND COMMUNICATION METHOD

TECHNICAL FIELD

The present invention relates to a user terminal, a base station apparatus, and a communication method.

The present disclosure contains subject matter related to that disclosed in Japanese Priority Patent Application JP 22014-057355 filed in the Japan Patent Office on Mar. 20, 2014, the entire contents of which are hereby incorporated by reference.

BACKGROUND ART

A radio access scheme and a radio network for cellular mobile communication (hereinafter, referred to as "Long-Term Evolution (LTE)" or "Evolved Universal Terrestrial Radio Access: EUTRA") have been examined in the 3rd Generation Partnership Project (3GPP). In the LTE, a base station apparatus is also referred to as Evolved Node B (eNodeB), and a mobile station apparatus is also referred to as user equipment (UE). The LTE is a cellular communication system in which a plurality of areas within the coverage of the base station apparatus is arranged in the form of cells. A single base station apparatus may manage a plurality of cells.

LTE supports time-division duplexing (TDD). LTE that adopts the TDD system is also referred to as TD-LTE or LTE TDD. The TDD system is a technology that enables full-duplex communication in a single frequency band by performing time-division multiplexing on uplink signals and downlink signals.

In the 3GPP, a traffic adaptation technology and an interference reduction technology (DL-UL interference management and traffic adaptation) being applied to TD-LTE has been examined. The traffic adaptation technology is a technology in which a ratio between uplink resources and downlink resources is changed depending on uplink traffic and downlink traffic. The traffic adaptation technology is also referred to as dynamic TDD.

In NPL 1, a method using a flexible subframe is suggested as a method of realizing the traffic adaptation. The base station apparatus can receive an uplink signal or transmit a downlink signal in the flexible subframe. In NPL 1, the mobile station apparatus regards the flexible subframe as a downlink subframe unless there is an instruction from the base station apparatus to transmit the uplink signal in the flexible subframe.

NPL 1 describes that a hybrid automatic repeat request (HARQ) timing of a physical downlink shared channel (PDSCH) is determined based on a newly introduced uplink-downlink configuration, and an HARQ timing of a physical uplink shared channel (PUSCH) is determined based on an initial UL-DL configuration.

NPL 2 describes that (a) a UL/DL reference configuration is introduced, and (b) several subframes may be scheduled for any one of an uplink and a downlink by dynamic grant/assignment from a scheduler.

In Section 7.2 of NPL 3, a procedure of the mobile station apparatus for reporting channel state information (CSI) is described. The base station apparatus assigns downlink resources to the mobile station apparatus based on the channel state information reported from the plurality of mobile station apparatuses. The channel state information includes a channel quality indicator (CQI).

CITATION LIST

Non Patent Literature

NPL 1: "On standardization impact of TDD UL-DL adaptation", R1-122016, Ericsson, ST-Ericsson, 3GPP TSG-RAN WG1 Meeting #69, Prague, Czech Republic, 21-25May 2012.

NPL 2: "Signalling support for dynamic TDD", R1-130558, Ericsson, ST-Ericsson, 3GPP TSG-RAN WG1 Meeting #72, St Julian's, Malta, 28Jan. 1Feb. 2013.

NPL 3: "3GPP TS36.213 v11.2.0 (2013-02)", 15th Mar. Feb., 2013.

SUMMARY OF INVENTION

Technical Problem

However, in the wireless communication system, a technology related to the channel state information has not been sufficiently examined. An aspect of the invention has been made in view of the above-described problem, and it is an object of the invention to provide to a user terminal capable of efficiently performing communication in a wireless communication system capable of using channel state information.

Solution to Problem (1) In order to achieve the above-described object, aspects of the present invention provide the following means.

That is, an aspect of the present invention provides a user terminal including: a measurement unit that performs measurement for calculating channel state information; a configuration unit that configures two subframe sets including a first subframe set and a second subframe set based on first information and second information; a transmission unit that transmits channel state information reports corresponding to the first subframe set and channel state information reports corresponding to the second subframe set. In a case where the second information is configured, the first information is not configured, and in a case where a plurality of channel state information reports of the same serving cell collides for a user terminal for which the two subframe sets are configured based on the second information, and in a case where the plurality of channel state information reports has physical uplink control channel reporting types having the same priority, the channel state information reports corresponding to the second subframe set are dropped.

(2) In the aspect of the present invention, in a case where the plurality of channel state information reports corresponds to the two subframe sets based on the first information, the plurality of channel state information reports of the same serving cell, which has the physical uplink control channel reporting types having the same priority, may not collide.

(3) In the aspect of the present invention, the channel state information may include at least a channel quality indicator.

(4) In the aspect of the present invention, the plurality of collided channel state information reports may include at least the channel state information reports corresponding to the first subframe set and the channel state information reports corresponding to the second subframe set.

(5) Another aspect of the present invention provides a base station apparatus including: a transmission unit that transmits first information and second information which configure two subframe sets including a first subframe set and a second subframe set; and a reception unit that receives channel state information reports corresponding to the first subframe set and channel state information reports corresponding to the second subframe set. The transmission unit does not transmit the first information in a case where the second information is transmitted, and the reception unit performs a reception process by assuming that the channel state information reports corresponding to the second subframe set are dropped in a case where a plurality of channel state information reports of the same serving cell collides for a user terminal for which the two subframe sets are configured based on the second information, and in a case where the plurality of channel state information reports has physical uplink control channel reporting types having the same priority.

(6) In the aspect of the present invention, in a case where the plurality of channel state information reports corresponds to the two subframe sets based on the first information, the plurality of channel state information reports of the same serving cell, which has the physical uplink control channel reporting types having the same priority, may not collide.

(7) In the aspect of the present invention, the channel state information may include at least a channel quality indicator.

(8) In the aspect of the present invention, the plurality of collided channel state information reports may include at least the channel state information reports corresponding to the first subframe set and the channel state information reports corresponding to the second subframe set.

(9) Still another aspect of the present invention provides a communication method in a user terminal. The method includes: a step of performing measurement for calculating channel state information; a step of configuring two subframe sets including a first subframe set and a second subframe set based on first information and second information; and a step of transmitting channel state information reports corresponding to the first subframe set and channel state information reports corresponding to the second subframe set. In a case where the second information is configured, the first information is not configured, and in a case where a plurality of channel state information reports of the same serving cell collides for a user terminal for which the two subframe sets are configured based on the second information, and in a case where the plurality of channel state information reports has physical uplink control channel reporting types having the same priority, the channel state information reports corresponding to the second subframe set are dropped.

(10) Still another aspect of the present invention provides a communication method in a base station apparatus. The method includes: a step of transmitting first information and second information which configure two subframe sets including a first subframe set and a second subframe set; and a step of receiving channel state information reports corresponding to the first subframe set and channel state information reports corresponding to the second subframe set. The first information is not transmitted in a case where the second information is transmitted, and a reception process is performed by assuming that the channel state information reports corresponding to the second subframe set are dropped in a case where a plurality of channel state information reports of the same serving cell collides for a user terminal for which the two subframe sets are configured based on the second information, and in a case where the plurality of channel state information reports has physical uplink control channel reporting types having the same priority.

Advantageous Effects of Invention

According to the aspects of the present invention, it is possible to efficiently perform communication between a user terminal and a base station apparatus in a wireless communication system capable of using channel state information.

BRIEF DESCRIPTION OF DRAWINGS

FIG. 9 is a table showing an example of an uplink-downlink configuration according to the present embodiment.

FIG. 12 is a diagram showing the correspondence between a pair formed by the first uplink reference UL-DL configuration for another serving cell (primary cell) and the first uplink reference UL-DL configuration for a serving cell (secondary cell) and the second uplink reference UL-DL configuration for the secondary cell in the present embodiment.

FIG. 14 is a diagram showing the correspondence between a pair formed by the first downlink reference UL-DL configuration for the primary cell and the first downlink reference UL-DL configuration for the secondary cell and the second downlink reference UL-DL configuration for the secondary cell in the present embodiment.

FIG. 15 is a diagram showing the relationship between a subframe indicated by the first uplink reference UL-DL configuration and a subframe indicated by the first downlink reference UL-DL configuration according to the present embodiment.

FIG. 16 is a diagram showing the relationship between the subframe indicated by the first uplink reference UL-DL configuration, the subframe indicated by the first downlink reference UL-DL configuration and a subframe indicated by a transmission direction UL-DL configuration according to the present embodiment.

FIG. 17 is a diagram showing the relationship between the first uplink reference UL-DL configuration, the first downlink reference UL-DL configuration and the transmission direction UL-DL configuration according to the present embodiment.

FIG. 18 is a diagram showing the correspondence between a subframe n to which PDCCH/EPDCCH/PHICH is allocated and a subframe n+k to which PUSCH corresponding to the PDCCH/EPDCCH/PHICH is allocated in the present embodiment.

FIG. 19 is a diagram showing the correspondence between the subframe n to which PHICH is allocated and a subframe n-k to which PUSCH corresponding to the PHICH is allocated in the present embodiment.

FIG. 20 is a diagram showing the correspondence between the subframe n to which PUSCH is allocated and the subframe n+k to which PHICH corresponding to the PUSCH is allocated in the present embodiment. The mobile station apparatus 1 specifies (selects or determines) a value of k according to the table of FIG. 20.

FIG. 21 is a diagram showing the correspondence between the subframe n-k to which PDSCH is allocated and the subframe n in which HARQ-ACK corresponding to the PDSCH is transmitted in the present embodiment.

FIG. 22 is a table showing a modulation scheme and a coding rate corresponding to a CQI index according to the present embodiment.

FIG. 24 is a diagram showing an example of a CSI reference resource corresponding to the reporting of periodic CSI according to the present embodiment.

FIG. 25 is a diagram showing an example of a CSI reference resource corresponding to the reporting of aperiodic CSI according to the present embodiment.

FIG. 30 is a diagram showing an example of the subframe set index according to the present embodiment.

FIG. 33 shows an example of a flow of determining the priority of the periodic CSI report in a case where the plurality of serving cells is configured for the mobile station apparatus 1 according to the present embodiment.

DESCRIPTION OF EMBODIMENTS

Hereinafter, an embodiment of the present invention will be described.

In the present embodiment, a plurality of cells is configured for a mobile station apparatus. A technology in which the mobile station apparatus communicates through a plurality of cells is referred to as cell aggregation or carrier aggregation. The present invention may be applied to each of the plurality of cells configured for the mobile station apparatus. The present invention may be applied to some of the plurality of configured cells. The cells configured for the mobile station apparatus is also referred to as serving cells.

The plurality of configured serving cells includes one primary cell and one or a plurality of secondary cells. The primary cell is a cell indicated as a serving cell in which an initial connection establishment procedure is performed, a serving cell in which a connection re-establishment procedure is started, or a primary cell in a handover procedure. The secondary cell may be configured at a point of time when or after the RRC connection is established. It is preferable that the plurality of cells is identified by cell indexes (cell identifier or cell identity). The cell index of the primary cell is "0". The cell index of the secondary cell is any one of integers of "1" to "7", and is configured by a higher layer. For example, in a case where communication is performed between one primary cell and two secondary cells, the cell index of the primary cell may be identified by "0", the cell index of the first secondary cell may be identified by "1", and the cell index of the second secondary cell may be identified by "2".

A time-division duplex (TDD) system is applied to a wireless communication system according to the present embodiment. In the case of the cell aggregation, the TDD system may be applied to all the plurality of cells. In the case of the cell aggregation, the cell to which the TDD system is applied and the cells to which a frequency-division duplex (FDD) system is applied may be aggregated. In a case where the cells to which the TDD system is applied and the cells to which the FDD system is applied are aggregated, the present invention may be applied to the cell to which the TDD system is applied.

The mobile station apparatus transmits information indicating the combination of bands that support the carrier aggregation by the mobile station apparatus to the base station apparatus. The mobile station apparatus transmits information indicating whether or not simultaneous transmission and reception in the plurality of serving cells in a plurality of different bands are supported for each combination of the bands to the base station apparatus.

In the present embodiment, "X/Y" includes the meaning of "X or Y". In the present embodiment, "X/Y" includes the meaning of "X and Y". In the present embodiment, "X/Y" includes the meaning of "X and/or Y".

Figure 1:
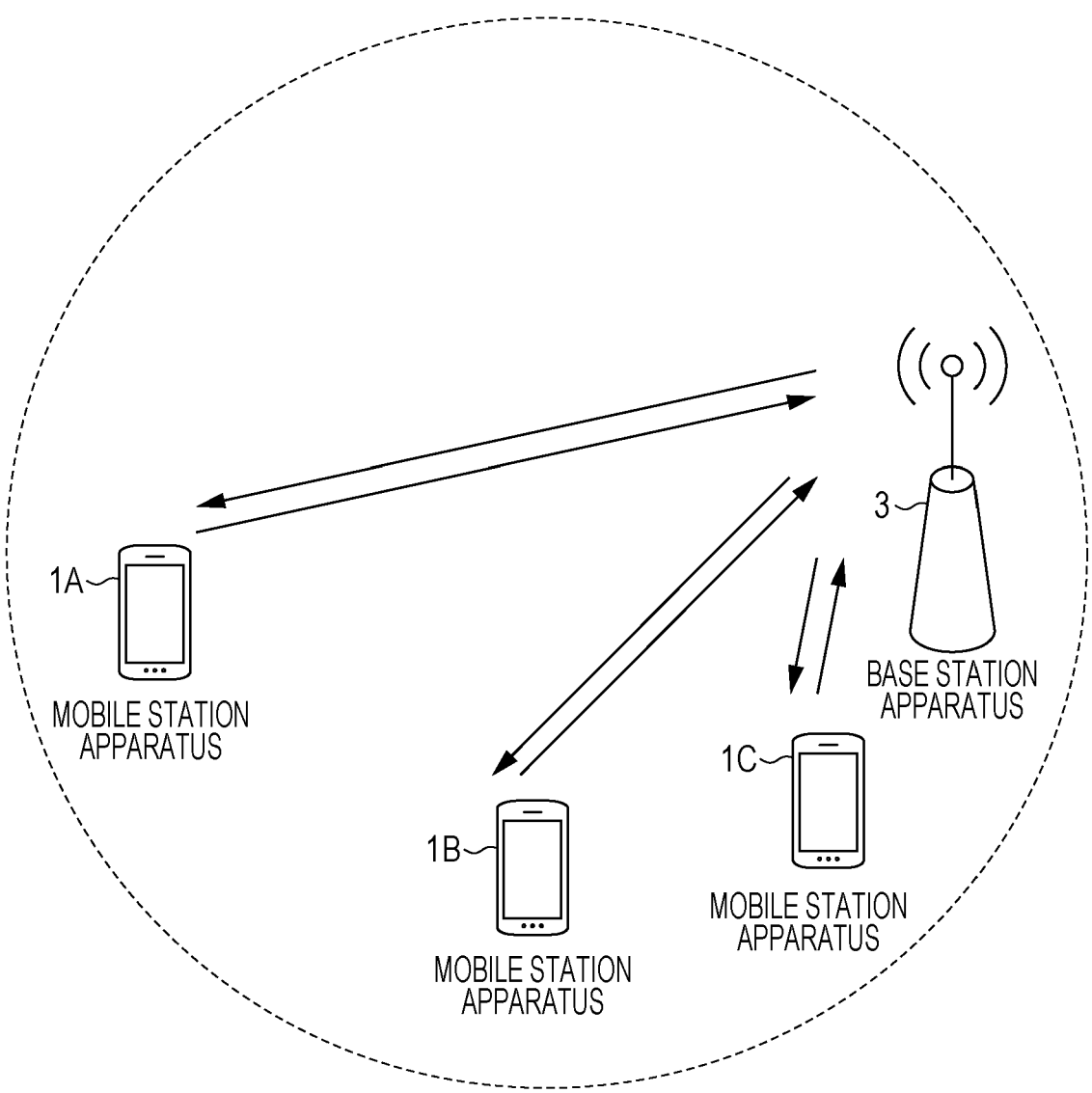
FIG. 1 is a conceptual diagram of a wireless communication system according to the present embodiment.

FIG. 1 is a conceptual diagram of the wireless communication system according to the present embodiment. In FIG. 1, the wireless communication system includes mobile station apparatuses 1A to 1C, and a base station apparatus 3. Hereinafter, the mobile station apparatuses 1A to 1C are referred to as the mobile station apparatus 1.

Physical channels and physical signals according to the present embodiment will be described.

In FIG. 1, in wireless communication of an uplink from the mobile station apparatus 1 to the base station apparatus 3, the following uplink physical channels are used. The uplink physical channels are used to transmit information output from the higher layer.

Physical uplink control channel (PUCCH)
Physical uplink shared channel (PUSCH)
Physical random access channel (PRACH)

The PUCCH is a physical channel used to transmit uplink control information (UCI). The uplink control information includes channel state information (CSI) of a downlink, a scheduling request (SR) indicating a request for a PUSCH resource, and acknowledgement (ACK)/negative-acknowledgement (NACK) of downlink data (transport block or downlink-shared channel (DL-SCH)). The ACK/NACK is also referred to as HARQ-ACK, HARQ feedback, or response information.

The PUSCH is a physical channel used to transmit uplink data (uplink-shared channel (UL-SCH)). The PUSCH may be used to transmit the HARQ-ACK and/or the channel state information together with the uplink data. The PUSCH may be used to transmit only the channel state information, or only the HARQ-ACK and the channel state information.

The PRACH is a physical channel used to transmit a random access preamble. The PRACH is mainly used to synchronize the mobile station apparatus 1 with the base station apparatus 3 in time domain. In addition, the PRACH is used to indicate the initial connection establishment procedure, the handover procedure, the connection re-establishment procedure, the synchronization of uplink transmission (timing adjustment) and the request for the PUSCH.

In FIG. 1, in the wireless communication of the uplink, the following uplink physical signal is used. The uplink physical signal is not used to transmit the information output from the higher layer but is used by a physical layer.

Uplink reference signal (UL RS)

In the present embodiment, the following two types of uplink reference signals are used.

Demodulation reference signal (DMRS)
Sounding reference signal (SRS)

The DMRS is associated with the transmission of the PUSCH or the PUCCH. The DMRS is time-multiplexed with the PUSCH or the PUCCH. The base station apparatus 3 uses the DMRS in order to perform channel compensation of the PUSCH or the PUCCH. Hereinafter, a case where both the PUSCH and the DMRS are transmitted is simply referred to a case where the PUSCH is transmitted. Hereinafter, a case where both the PUCCH and the DMRS are transmitted is simply referred to as a case where the PUCCH is transmitted.

The SRS is not associated with the transmission of the PUSCH or the PUCCH. The base station apparatus 3 uses the SRS in order to measure a channel state of the uplink. The mobile station apparatus 1 transmits a first SRS in a first resource configured by the higher layer. In a case where information indicating that there is a request for the transmission of the SRS is received through the PDCCH, the mobile station apparatus 1 transmits a second SRS in a second resource configured by the higher layer only once. The first SRS is also referred to as a periodic SRS or a type 0 triggered SRS. The second SRS is also referred to as an aperiodic SRS or a type 1 triggered SRS. The transmission of the aperiodic SRS is scheduled by the information indicating that there is a request for the transmission of the SRS.

In FIG. 1, in wireless communication of the downlink from the base station apparatus 3 to the mobile station apparatus 1, the following downlink physical channels are used. The downlink physical channels are used to transmit information output from the higher layer.

Physical broadcast channel (PBCH)
Physical control format indicator channel (PCFICH)
Physical hybrid automatic repeat request indicator channel (PHICH)
Physical downlink control channel (PDCCH)
Enhanced physical downlink control channel (EPDCCH)
Physical downlink shared channel (PDSCH)
Physical multicast channel (PMCH)

The PBCH is used to broadcast a master information block (MIB or broadcast channel (BCH)) used in common to the mobile station apparatuses 1. The MIB is transmitted at an interval of 40 ms, and the MIB is iteratively transmitted at a cycle of 10 ms. Specifically, initial transmission of the MIB is performed in a subframe 0 of a radio frame that satisfies SFN mod 4=0, and re-transmission (repetition) of the MIB is performed in subframes 0 of all other radio frames. A system frame number (SFN) is a radio frame number. The MIB is system information. For example, the MIB includes information indicating the SFN.

The PCFICH is used to transmit information indicating a region (OFDM symbol) used in the transmission of the PDCCH.

The PHICH is used to transmit the HARQ indicator (HARQ feedback or response information) indicating the acknowledgement (ACK) or negative acknowledgement (NACK) of the uplink data (uplink shared channel (UL-SCH)) received by the base station apparatus 3. For example, in a case where the HARQ indicator indicating the ACK is received, the mobile station apparatus 1 does not retransmit the corresponding uplink data. For example, in a case where the HARQ indicator indicating the NACK is received, the mobile station apparatus 1 retransmits the corresponding uplink data. A single PHICH transmits the HARQ indicator for a single uplink data item. The base station apparatus 3 transmits HARQ indicators for a plurality of uplink data items included in the same PUSCH by using a plurality of PHICHs.

The PDCCH and the EPDCCH are used to transmit downlink control information (DCI). The downlink control information is also referred to as a DCI format. The downlink control information includes a downlink grant and an uplink grant. The downlink grant is also referred to as downlink assignment or downlink allocation.

The downlink grant is used to schedule a single PDSCH within a single cell. The downlink grant is used to schedule the PDSCH within the same subframe as the subframe in which the downlink grant is transmitted. The uplink grant is used to schedule a single PUSCH within a single cell. The uplink grant is used to schedule a single PUSCH within a subframe which is positioned after four or more subframes from the subframe in which the uplink grant is transmitted.

A cyclic redundancy check (CRC) parity bit is added to the DCI format. The CRC parity bit is scrambled with cell-radio network temporary identifier (C-RNTI), or semi-persistent scheduling cell-radio network temporary identifier (SPS C-RNTI). The C-RNTI and the SPS C-RNTI are identifiers for identifying the mobile station apparatuses in the cell.

The C-RNTI is used to control the PDSCH or the PUSCH in a single subframe. The SPS C-RNTI is used to periodically assign the resource of the PDSCH or the PUSCH.

The PDSCH is used to transmit the downlink data (downlink shared channel (DL-SCH)).

The PMCH is used to transmit multicast data (multicast channel (MCH)).

In FIG. 1, in the wireless communication of the downlink, the following downlink physical signals are used. The downlink physical signals are not used to transmit the information output from the higher layer but are used by the physical layer.

Synchronization signal (SS)
Downlink reference signal (DL RS)

The synchronization signals are used by the mobile station apparatus 1 to synchronize frequency domain and the time domain of the downlink. In the TDD system, the synchronization signals are allocated to subframes 0, 1, 5 and 6 within the radio frame. In the FDD system, the synchronization signals are allocated to the subframes 0 and 5 in the radio frame.

The downlink reference signal is used by the mobile station apparatus 1 to perform channel compensation of the downlink physical channel. The downlink reference signal is used by the mobile station apparatus 1 to calculate the channel state information of the downlink.

In the present embodiment, the following 5 types of downlink reference signals are used.

Cell-specific reference signal (CRS)
UE-specific reference signal (URS) associated with PDSCH
Demodulation reference signal (DMRS) associated with EPDCCH
Non-zero power channel state information-reference signal (NZP CSI-RS)
Zero power channel state information-reference signal (ZP CSI-RS)
Multimedia broadcast and multicast service over single frequency network reference signal (MBSFN RS)
Positioning reference signal (PRS)

The CRS is transmitted in all bands of the subframe. The CRS is used to demodulate the PBCH/PDCCH/PHICH/PCFICH/PDSCH. The CRS may be used by the mobile station apparatus 1 to calculate the channel state information of the downlink. The PBCH/PDCCH/PHICH/PCFICH is transmitted through an antenna port used to transmit the CRS.

The URS associated with the PDSCH is transmitted in a subframe and a band used to transmit the PDSCH with which the URS is associated. The URS is used to demodulate the PDSCH with which the URS is associated.

The PDSCH is transmitted through an antenna port used to transmit the CRS or the URS. A DCI format 1A is used to schedule the PDSCH transmitted through an antenna port used to transmit the CRS. A DCI format 2D is used to schedule the PDSCH transmitted through an antenna port used to transmit the URS.

The DMRS associated with the EPDCCH is transmitted in a subframe and a band used to transmit the EPDCCH with which the DMRS is associated. The DMRS is used to demodulate the EPDCCH with which the DMRS is associated. The EPDCCH is transmitted through an antenna port used to transmit the DMRS.

The NZP CSI-RS is transmitted in the configuration subframe. A resource in which the NZP CSI-RS is transmitted is configured by the base station apparatus. The NZP CSI-RS is used by the mobile station apparatus 1 to calculate the channel state information of the downlink. The mobile station apparatus 1 performs signal measurement (channel measurement) by using the NZP CSI-RS.

A resource of the ZP CSI-RS is configured by the base station apparatus 3. The base station apparatus 3 transmits the ZP CSI-RS at zero power. That is, the base station apparatus 3 does not transmit the ZP CSI-RS. The base station apparatus 3 does not transmit the PDSCH and the EPDCCH in the configured resource of the ZP CSI-RS. For example, the mobile station apparatus 1 may measure interference in the resource corresponding to the NZP CSI-RS in a certain cell.

The MBSFN RS is transmitted in all the bands of the subframe used to transmit the PMCH. The MBSFN RS is used to modulate the PMCH. The PMCH is transmitted through an antenna port used to transmit the MBSFN RS.

The PRS is used by the mobile station apparatus to measure a geographic position of the mobile station apparatus.

The downlink physical channel and the downlink physical signal are generally referred to as the downlink signal. The uplink physical channel and the uplink physical signal are generally referred to as the uplink signal. The downlink physical channel and the uplink physical channel are generally referred to as the physical channel. The downlink physical signal and the uplink physical signal are generally referred to as the physical signal.

The BCH, the MCH, the UL-SCH and the DL-SCH are transport channels. A channel used in the medium access control (MAC) layer is referred to as a transport channel. A unit of the transport channel used in the MAC layer is also referred to as a transport block (TB) or a MAC protocol data unit (PDU). In the MAC layer, a hybrid automatic repeat request (HARQ) is controlled for each transport block. The transport block is a unit of data delivered to the physical layer from the MAC layer. In the physical layer, the transport block is mapped to a code word, and a coding process is performed on each code word.

Hereinafter, a structure of the radio frame according to the present embodiment will be described.

Figure 2:
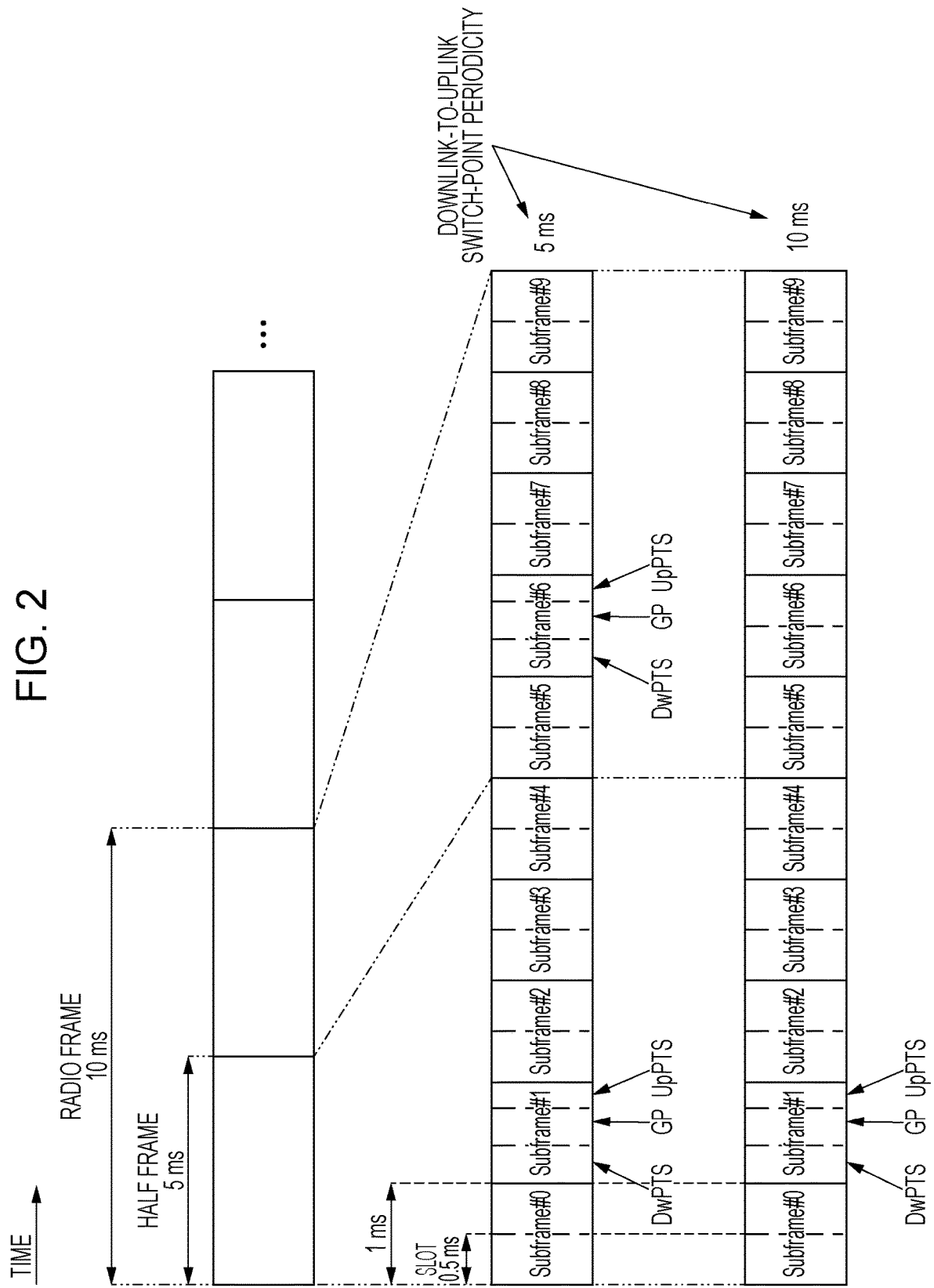
FIG. 2 is a diagram showing a schematic structure of a radio frame according to the present embodiment.

FIG. 2 is a diagram showing a schematic structure of the radio frame according to the present embodiment. Each radio frame has a length of 10 ms. In FIG. 2, a horizontal axis represents a time axis. Each radio frame includes two half frames. Each half frame has a length 5 ms. Each half frame includes 5 subframes. Each subframe has a length of 1 ms, and is defined by two successive slots. Each slot has a length of 0.5 ms. An i-th subframe within the radio frame includes a (2×i)-th slot and a (2×i+1)-th slot. That is, 10 subframes may be used for every interval of 10 ms.

In the present embodiment, the following 3 types of subframes are defined.

Downlink subframe (first subframe)
Uplink subframe (second subframe)
Special subframe (third subframe)

The downlink subframe is a subframe reserved for downlink transmission. The uplink subframe is a subframe reserved for uplink transmission. The special subframe includes 3 fields. The three fields are a downlink pilot time slot (DwPTS), a guard period (GP), and an uplink pilot time slot (UpPTS). The total length of the DwPTS, GP and UpPTS is 1 ms. The DwPTS is a field reserved for downlink transmission. The UpPTS is a field reserved for uplink transmission. The GP is a field in which the downlink transmission and the uplink transmission are not performed. The special subframe may include only the DwPTS and the GP, or may include only the GP and the UpPTS.

A single radio frame includes at least the downlink subframe, the uplink subframe and the special subframe.

The wireless communication system according to the present embodiment supports downlink-to-uplink switch-point periodicities having 5 ms and 10 ms. In a case where the downlink-to-uplink switch-point periodicity is 5 ms, the special subframes are included in both the half frames within the radio frame. In a case where the downlink-to-uplink switch-point periodicity is 10 ms, the special subframe is included in only the initial half frame within the radio frame.

Hereinafter, a structure of the slot according to the present embodiment will be described.

Figure 3:
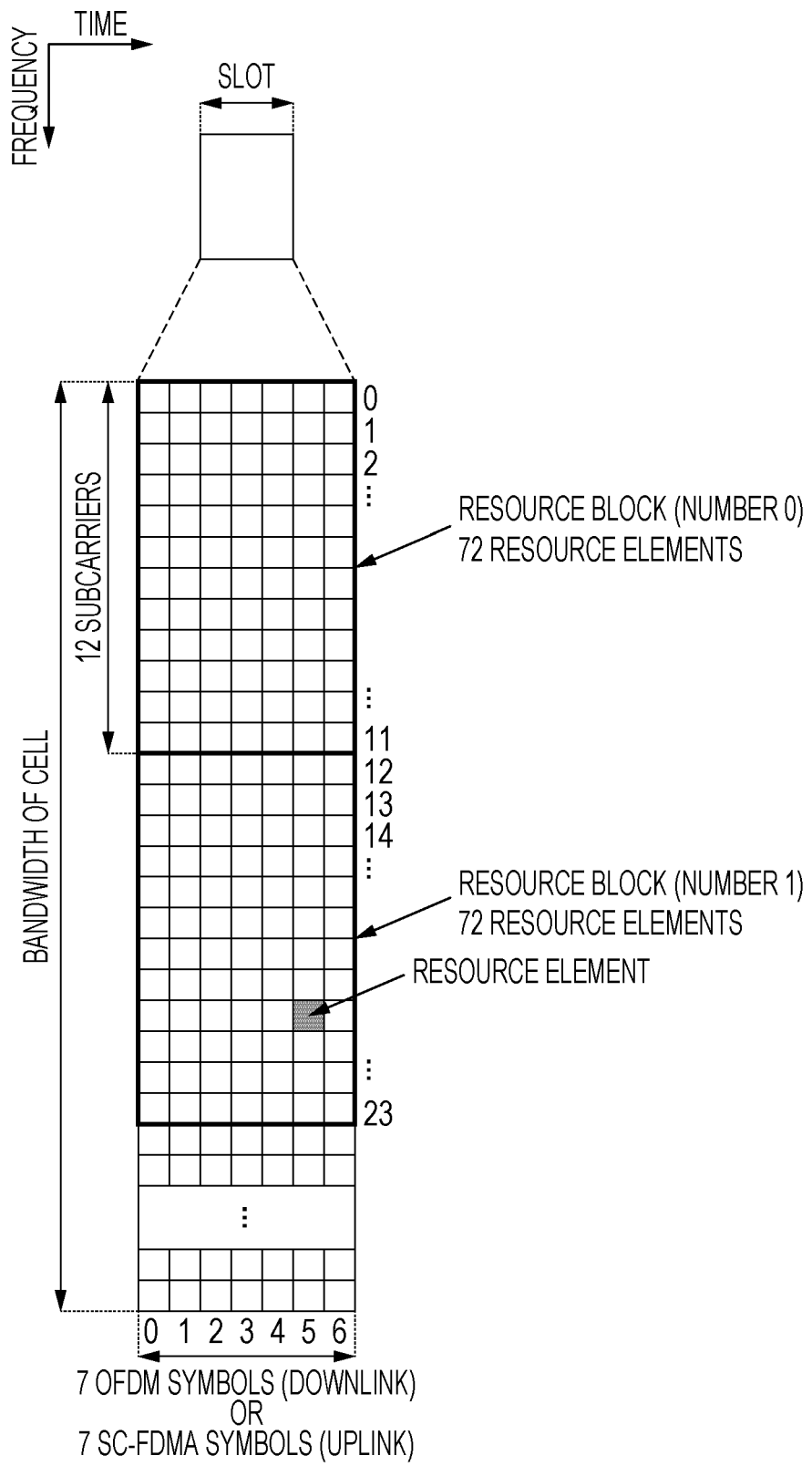
FIG. 3 is a diagram showing a structure of a slot according to the present embodiment.

FIG. 3 is a diagram showing a structure of the slot according to the present embodiment. In the present embodiment, normal cyclic prefix (CP) is applied to the OFDM symbol. Extended cyclic prefix (CP) may be applied to the OFDM symbol. The physical signal or the physical channel transmitted in each slot is expressed by a resource grid. In FIG. 3, a horizontal axis represents a time axis, and a vertical axis represents a frequency axis. In the downlink, the resource grid is defined by a plurality of subcarriers and a plurality of OFDM symbols. In the uplink, the resource grid is defined by a plurality of subcarriers and a plurality of SC-FDMA symbols. The number of subcarriers constituting one slot depends on a bandwidth of the cell. The number of OFDM symbols or SC-FDMA symbols constituting one slot is 7. Each element within the resource grid is referred to as a resource element. The resource element is identified using a subcarrier number and an OFDM symbol or SC-FDMA symbol number.

The resource block is used to express the mapping of a certain physical channel (PDSCH or PUSCH) to the resource element. A virtual resource block and a physical resource block are defined for the resource block. A certain physical channel is initially mapped to the virtual resource block. Thereafter, the virtual resource block is mapped to the physical resource block. One physical resource block is defined by 7 successive OFDM symbols or SC-FDMA symbols in the time domain and 12 successive subcarriers in the frequency domain. One physical resource block includes (7×12) resource elements. One physical resource block corresponds to one slot in the time domain, and corresponds to 180 kHz in the frequency domain. The physical resource blocks are assigned numbers from 0 in the frequency domain.

Hereinafter, the physical channel and the physical signal transmitted in each subframe will be described.

Figure 4:
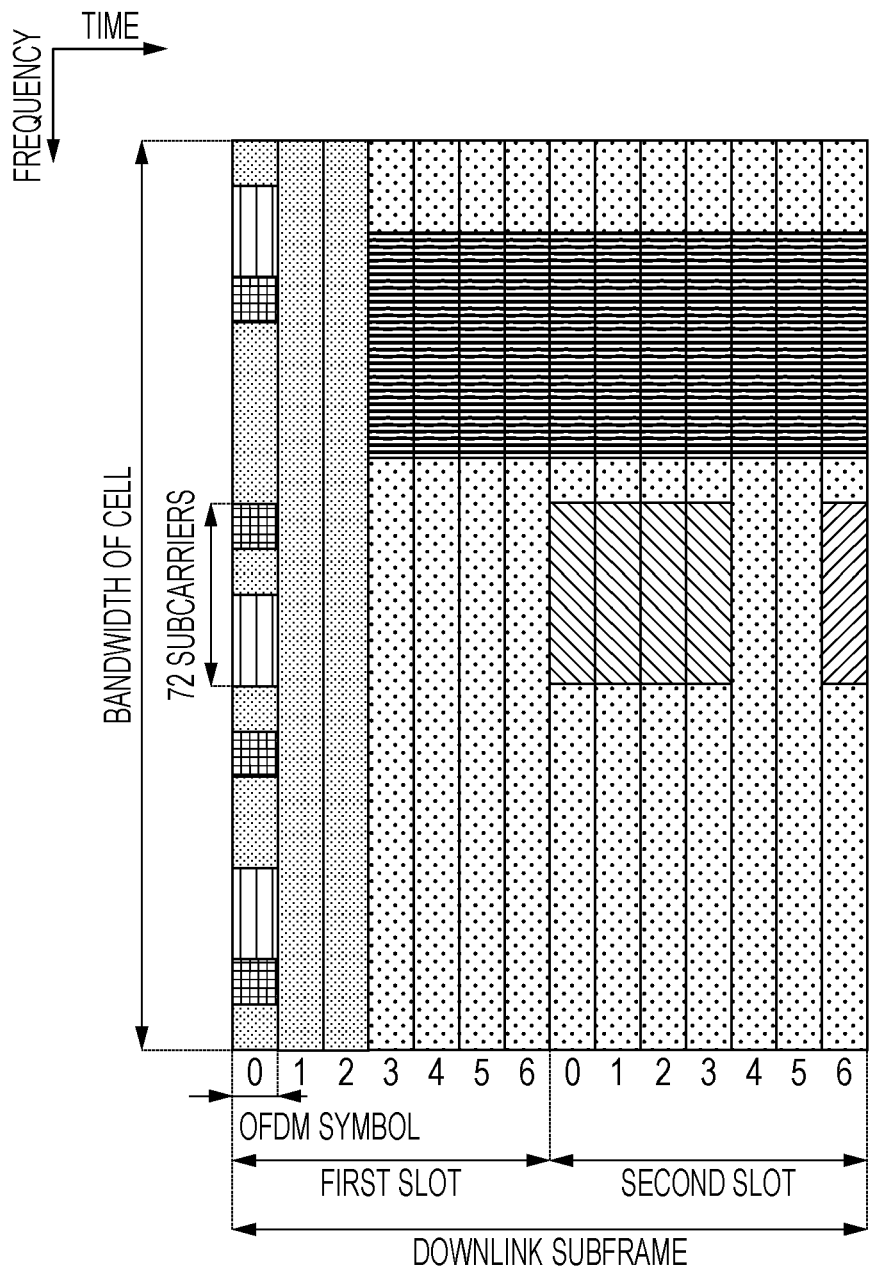
FIG. 4 is a diagram showing an example of the arrangement of physical channels and physical signals in a downlink subframe according to the present embodiment.

FIG. 4 is a diagram showing an example of the allocation of the physical channels and the physical signals in the downlink subframe according to the present embodiment. In FIG. 4, a horizontal axis represents a time axis, and a vertical axis represents a frequency axis. The base station apparatus 3 may transmit the downlink physical channels (PBCH, PCFICH, PHICH, PDCCH, EPDCCH, and PDSCH) and the downlink physical signals (synchronization signal and downlink reference signal) in the downlink subframe. The PBCH is transmitted only in the subframe 0 within the radio frame. The downlink reference signals are allocated to the resource elements distributed in the frequency domain and the time domain. In order to simplify the description, the downlink reference signal is not shown in FIG. 4.

In PDCCH regions, a plurality of PDCCHs may be frequency-, and time-multiplexed. In EPDCCH regions, a plurality of EPDCCH may be frequency-, time- and spatial-multiplexed. In PDSCH regions, a plurality of PDSCHs may be frequency-, and special-multiplexed. The PDCCH and the PDSCH or the EPDCCH may be time-multiplexed. The PDSCH and the EPDCCH may be frequency-multiplexed.

Figure 5:
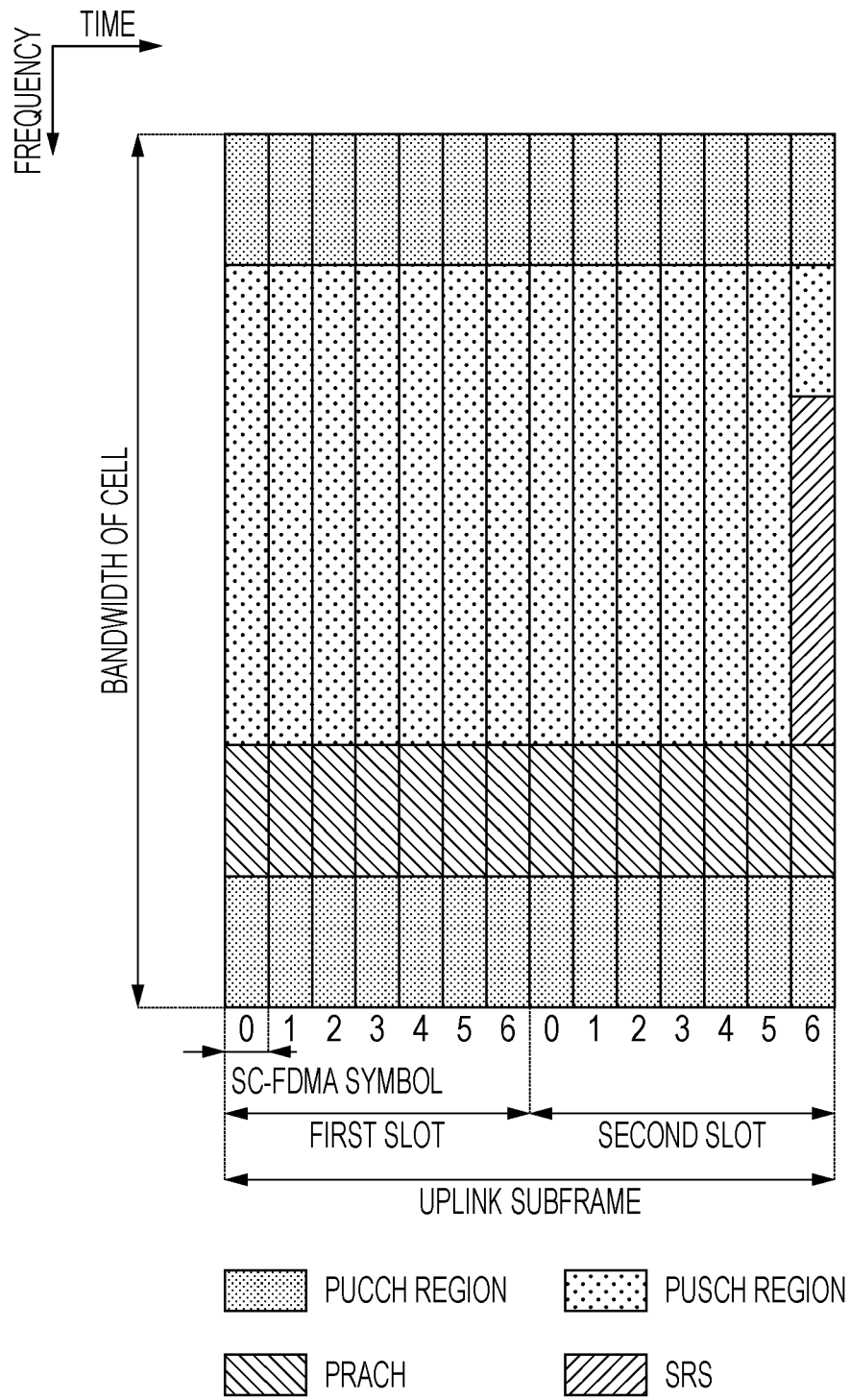
FIG. 5 is a diagram showing an example of the arrangement of physical channels and physical signals in an uplink subframe according to the present embodiment.

FIG. 5 is a diagram showing an example of the allocation of the physical channels and the physical signals in the uplink subframe according to the present embodiment. In FIG. 5, a horizontal axis represents a time axis, and a vertical axis represents a frequency axis. The mobile station apparatus 1 may transmit the uplink physical channels (PUCCH, PUSCH, and PRACH) and the uplink physical signals (DMRS and SRS) in the uplink subframe. In PUCCH regions, a plurality of PUCCHs may be frequency-, time-, and code-multiplexed. In PUSCH regions, a plurality of PUSCHs may be frequency-, and spatial-multiplexed. The PUCCH and the PUSCH may be frequency-multiplexed. The PRACH may be allocated to a single subframe or over two subframes. A plurality of PRACHs may be code-multiplexed.

The SRS is transmitted using the last SC-FDMA symbol within the uplink subframe. That is, the SRS is allocated to the last SC-FDMA symbol within the uplink subframe. The mobile station apparatus 1 is not able to simultaneously transmit the SRS and the PUCCH/PUSCH/PRACH in a single SC-FDMA symbol within a single cell. The mobile station apparatus 1 may transmit the PUSCH and/or the PUCCH by using the SC-FDMA symbols except for the last SC-FDMA symbol within the uplink subframe in a single uplink subframe of a single cell, and may transmit the SRS by using the last SC-FDMA symbol within the uplink subframe. That is, the mobile station apparatus 1 may transmit both the SRS and the PUSCH/PUCCH in a single uplink subframe of a single cell. The DMRS is time-multiplexed with the PUCCH or the PUSCH. In order to simplify the description, the DMRS is not shown in FIG. 5.

Figure 6:
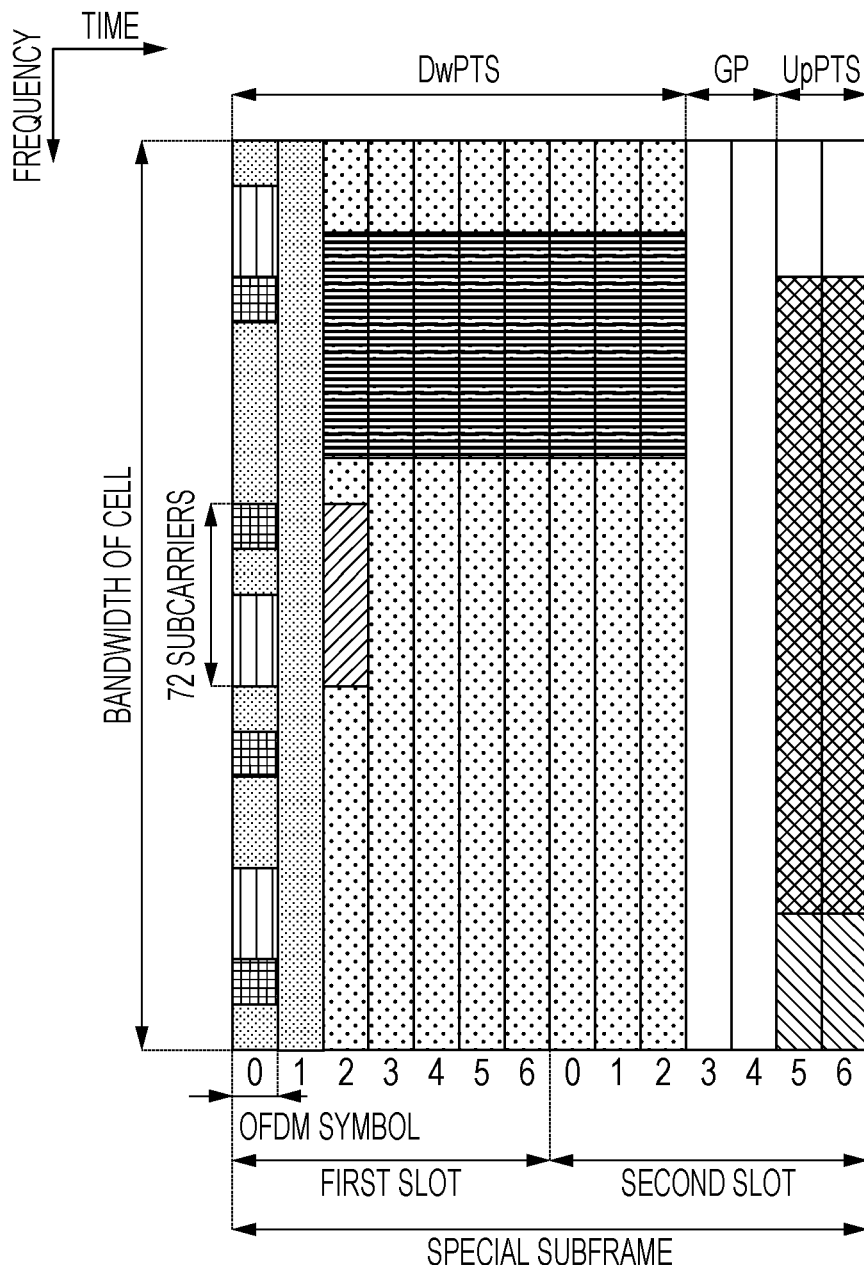
FIG. 6 is a diagram showing an example of the arrangement of physical channels and physical signals in a special subframe according to the present embodiment.

FIG. 6 is a diagram showing an example of the allocation of the physical channels and the physical signals in the special subframe according to the present embodiment. In FIG. 6, a horizontal axis represents a time axis, and a vertical axis represents a frequency axis. In FIG. 6, the DwPTS includes first to tenth SC-FDMA symbols within the special subframe, the GP includes eleventh and twelfth SC-FDMA symbols within the special subframe, and the UpPTS includes thirteenth and fourteenth SC-FDMA symbols within the special subframe.

The base station apparatus 3 may transmit the PCFICH, the PHICH, the PDCCH, the EPDCCH, the PDSCH, the synchronization signal and the downlink reference signal in the DwPTS of the special subframe. The base station apparatus 3 does not transmit the PBCH in the DwPTS of the special subframe. The mobile station apparatus 1 may transmit the PRACH and the SRS in the UpPTS of the special subframe. That is, the mobile station apparatus 1 does not transmit the PUCCH, the PUSCH and the DMRS in the UpPTS of the special subframe.

Figure 7:
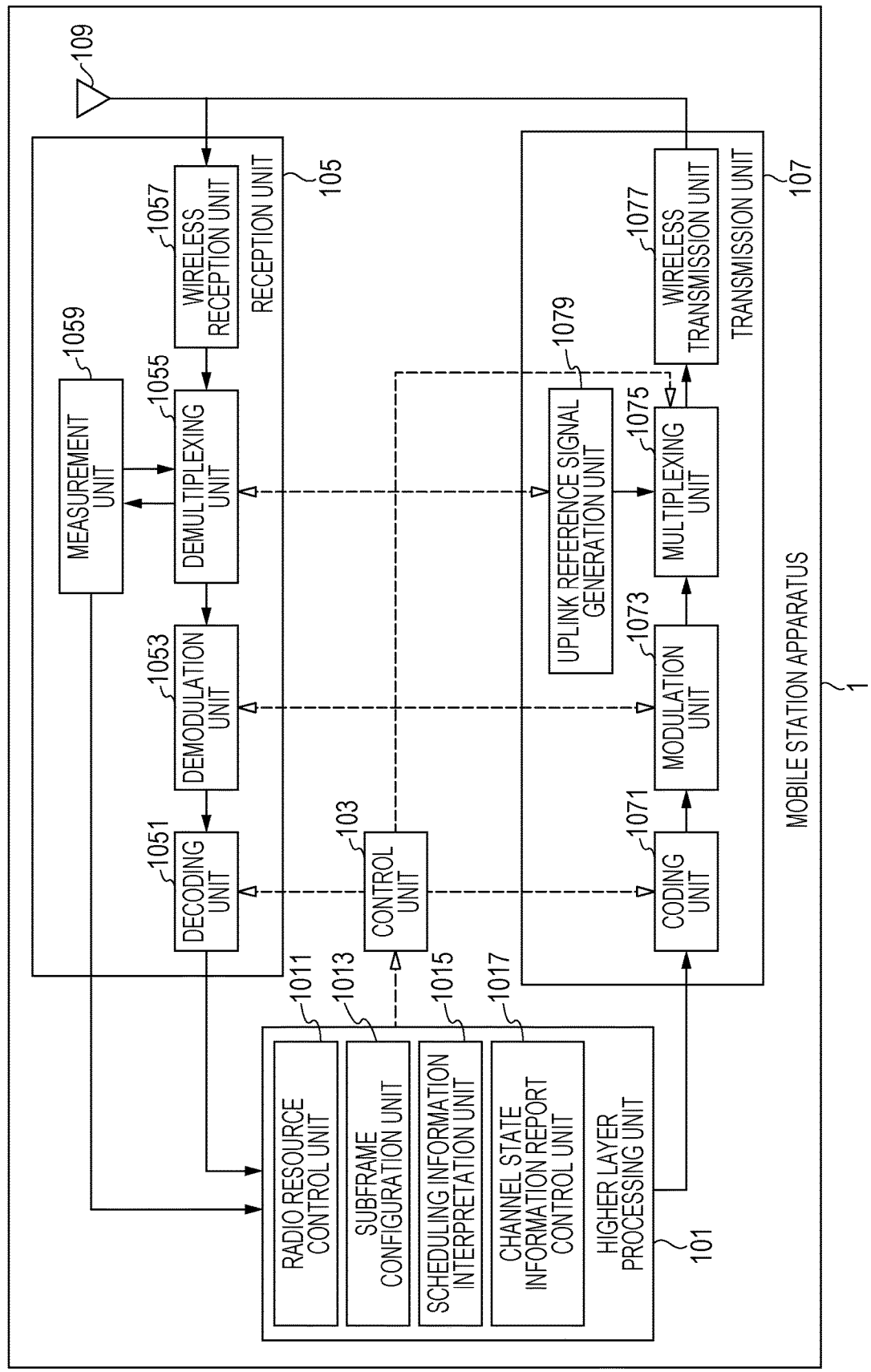
FIG. 7 is a schematic block diagram showing a structure of a mobile station apparatus 1 according to the present embodiment.

FIG. 7 is a schematic block diagram showing a structure of the mobile station apparatus 1 according to the present embodiment. As shown in the drawing, the mobile station apparatus 1 includes a higher layer processing unit 101, a control unit 103, a reception unit 105, a transmission unit 107, and a transmit and receive antenna 109. The higher layer processing unit 101 includes a radio resource control unit 1011, a subframe configuration unit 1013, a scheduling information interpretation unit 1015, and a channel state information (CSI) report control unit 1017. The reception unit 105 includes a decoding unit 1051, a demodulation unit 1053, a demultiplexing unit 1055, a wireless reception unit 1057, and a measurement unit 1059. The transmission unit 107 includes a coding unit 1071, a modulation unit 1073, a multiplexing unit 1075, a wireless transmission unit 1077, and an uplink reference signal generation unit 1079.

The higher layer processing unit 101 outputs uplink data (transport block) generated by an operation of a user to the transmission unit 107. The higher layer processing unit 101 performs processes of a medium access control (MAC) layer, a packet data convergence protocol (PDCP) layer, a radio link control (RLC) layer, and a radio resource control (RRC) layer.

The radio resource control unit 1011 of the higher layer processing unit 101 manages various configuration information items of the mobile station apparatus. The radio resource control unit 1011 generates information allocated to each channel of the uplink, and outputs the generated information to the transmission unit 107.

The subframe configuration unit 1013 of the higher layer processing unit 101 manages a first uplink reference UL-DL configuration (uplink reference configuration), a first downlink reference UL-DL configuration (downlink reference configuration), a second uplink reference UL-DL configuration, a second downlink reference UL-DL configuration, and a transmission direction UL-DL configuration (transmission direction configuration).

The subframe configuration unit 1013 sets the first uplink reference UL-DL configuration, the first downlink reference UL-DL configuration, the second uplink reference UL-DL configuration, the second downlink reference UL-DL configuration, and the transmission direction UL-DL configuration. The subframe configuration unit 1013 sets at least two subframe sets.

The scheduling information interpretation unit 1015 of the higher layer processing unit 101 interprets the DCI format (scheduling information) received through the reception unit 105, generates control information in order to control the reception unit 105 and the transmission unit 107 based on the result of interpreting the DCI format, and outputs the generated information to the control unit 103.

The scheduling information interpretation unit 1015 determines timings when a transmission process and a reception process based on the first uplink reference UL-DL configuration, the first downlink reference UL-DL configuration, the second uplink reference UL-DL configuration, the second downlink reference UL-DL configuration, and/or the transmission direction UL-DL configuration.

The CSI report control unit 1017 specifies a CSI reference resource. The CSI report control unit 1017 instructs the measurement unit 1059 to derive a CQI associated with the CSI reference resource. The CSI report control unit 1017 instructs the transmission unit 107 to transmit the CQI. The CSI report control unit 1017 sets a configuration used when the measurement unit 1059 calculates the CQI.

The control unit 103 generates control signals for controlling the reception unit 105 and the transmission unit 107 based on the control information from the higher layer processing unit 101. The control unit 103 outputs the generated control signals to the reception unit 105 and the transmission unit 107, and controls the reception unit 105 and the transmission unit 107.

In response to the control signal input from the control unit 103, the reception unit 105 separates, demodulates and decodes a reception signal received from the base station apparatus 3 through the transmit and receive antenna 109, and outputs the decoded information to the higher layer processing unit 101.

The wireless reception unit 1057 converts a frequency of a downlink signal received through the transmit and receive antenna 109 into an intermediate frequency (down-conversion), removes an unnecessary frequency component from the single, controls an amplification level such that a signal level is appropriately maintained, performs quadrature demodulation based on an in-phase component and a quadrature component of the received signal, and converts the quadrature-demodulated analog signal into a digital signal. The wireless reception unit 1057 removes a portion equivalent to a guard interval (GI) from the converted digital signal, performs fast Fourier transform (FFT) on the signal acquired by removing the guard interval, and extracts a signal in the frequency domain.

The demultiplexing unit 1055 separates the extracted signals into the PHICH, the PDCCH, the EPDCCH, the PDSCH and the downlink reference signal. The demultiplexing unit 1055 compensates the channels of the PHICH, the PDCCH, the EPDCCH and the PDSCH from the estimation values of the channel input from the measurement unit 1059. The demultiplexing unit 1055 outputs the separated downlink reference signal to the measurement unit 1059.

The demodulation unit 1053 combines the PHICH and a corresponding code by multiplying the PHICH by the corresponding code, and performs demodulation on the combined signal by using a binary phase shift keying (BPSK) modulation scheme, and outputs the demodulated signal to the decoding unit 1051. The decoding unit 1051 decodes the PHICH addressed to the mobile station apparatus, and outputs the decoded HARQ indicator to the higher layer processing unit 101. The demodulation unit 1053 performs demodulation on the PDCCH and/or the EPDCCH by using a QPSK modulation scheme, and outputs the demodulated signal to the decoding unit 1051. The decoding unit 1051 tries to decode the PDCCH and/or the EPDCCH, and outputs the decoded downlink control information and the RNTI corresponding to the downlink control information to the higher layer processing unit 101 in a case where the decoding succeeds.

The demodulation unit 1053 demodulates the PDSCH by using a modulation scheme such as quadrature phase shift keying (QPSK), 16-quadrature amplitude modulation (QAM), or 64-QAM notified by the uplink grant, and outputs the demodulated PDSCH to the decoding unit 1051. The decoding unit 1051 performing the decoding based on information related to the coding rate notified using the downlink control information, and outputs the decoded downlink data (transport block) to the higher layer processing unit 101.

The measurement unit 1059 measures the path loss of the downlink or the state of the channel from the downlink reference signal input from the demultiplexing unit 1055, and outputs the measured path loss and channel state to the higher layer processing unit 101. The measurement unit 1059 calculates an estimation value of the channel of the downlink from the downlink reference signal, and outputs the calculated value to the demultiplexing unit 1055. In order to calculate the CQI, the measurement unit 1059 performs channel measurement and/or interference measurement.

In response to the control signal input from the control unit 103, the transmission unit 107 generates the uplink reference signal, codes and modulates the uplink data (transport block) input from the higher layer processing unit 101, multiplexes the PUCCH, the PUSCH, and the generated uplink reference signal, and transmits the multiplexed signal to the base station apparatus 3 through the transmit and receive antenna 109.

The coding unit 1071 performs coding such as convolutional coding or block coding on the uplink control information input from the higher layer processing unit 101. The coding unit 1071 performs the turbo coding based on the information used to schedule the PUSCH.

The modulation unit 1073 modulates the coding bit input from the coding unit 1071 by using a modulation scheme such as BPSK, QPSK, 16-QAM or 64-QAM notified using the downlink control information or a modulation scheme previously determined for each channel. The modulation unit 1073 determines the number of sequences of spatial-multiplexed data based on the information used to schedule the PUSCH, maps a plurality of uplink data items transmitted through the same PUSCH to a plurality of sequences by using multiple input multiple output spatial multiplexing (MIMO SM), and performs precoding on the sequences.

The uplink reference signal generation unit 1079 generates a sequence acquired by a prescribed rule (expression) based on a physical cell identity (referred to as PCI or Cell ID) for identifying the base station apparatus 3, a bandwidth to which the uplink reference signal is allocated, cyclic shift notified using the uplink grant, and a parameter value for generating a DMRS sequence. In response to the control signal input from the control unit 103, the multiplexing unit 1075 rearranges the modulation symbols of the PUSCHs in parallel, and then performs discrete Fourier transform (DFT) on the rearranged modulation symbols. The multiplexing unit 1075 multiplexes the PUCCH and PUSCH signals and the generated uplink reference signal for each transmission antenna port. That is, the multiplexing unit 1075 allocates the PUCCH and PUSCH signals and the generated uplink reference signal to the resource elements for each transmission antenna port.

The wireless transmission unit 1077 performs inverse fast Fourier transform (IFFT) on the multiplexed signal, performs an SC-FDMA modulation scheme, adds a guard interval to the SC-FDMA modulated SC-FDMA symbol, and generates a baseband digital signal. The wireless transmission unit converts the baseband digital signal into an analog signal, generates an in-phase component and a quadrature component of an intermediate frequency from the analog signal, removes an extra frequency component for an intermediate frequency band, and converts the signal having the intermediate frequency into a signal having a high frequency (up conversion). The wireless transmission unit removes an extra frequency component from the signal, amplifies a power of the signal, and outputs and transmits the amplified signal to the transmit and receive antenna 109.

Figure 8:
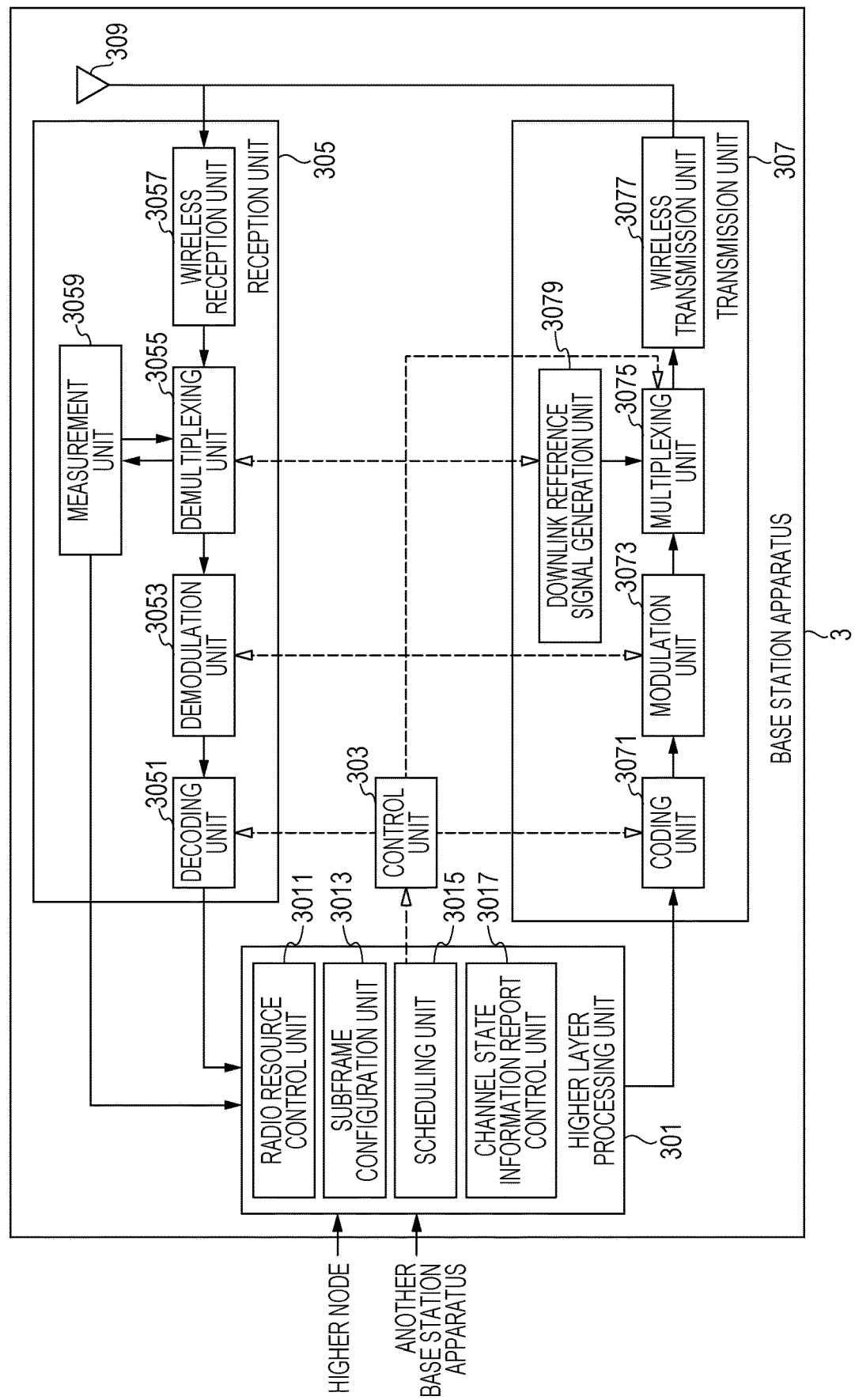
FIG. 8 is a schematic block diagram showing a structure of a base station apparatus 3 according to the present embodiment.

FIG. 8 is a schematic block diagram showing a structure of the base station apparatus 3 according to the present embodiment. As shown in the drawing, the base station apparatus 3 includes a higher layer processing unit 301, a control unit 303, a reception unit 305, a transmission unit 307, and a transmit and receive antenna 309. The higher layer processing unit 301 includes a radio resource control unit 3011, a subframe configuration unit 3013, a scheduling unit 3015, and a CSI report control unit 3017. The reception unit 305 includes a decoding unit 3051, a demodulation unit 3053, a demultiplexing unit 3055, a wireless reception unit 3057, and a measurement unit 3059. The transmission unit 307 includes a coding unit 3071, a modulation unit 3073, a multiplexing unit 3075, a wireless transmission unit 3077, and a downlink reference signal generation unit 3079.

The higher layer processing unit 301 performs processes of a medium access control (MAC) layer, a packet data convergence protocol (PDCP) layer, a radio link control (RLC) layer, and a radio resource control (RRC) layer. The higher layer processing unit 301 generates control information in order to control the reception unit 305 and the transmission unit 307, and outputs the generated information to the control unit 303.

The radio resource control unit 3011 of the higher layer processing unit 301 generates downlink data (transport block), system information, RRC message, and MAC control element (CE) which are allocated to the PDSCH of the downlink or acquires these information items from the higher node, and outputs the generated or acquired information items to the transmission unit 307. The radio resource control unit 3011 manages various configuration information items of each mobile station apparatus 1.

The subframe configuration unit 3013 of the higher layer processing unit 301 performs the management of the first uplink reference UL-DL configuration, the first downlink reference UL-DL configuration, the second uplink reference UL-DL configuration, the second downlink reference UL-DL configuration and the transmission direction UL-DL configuration on each mobile station apparatus 1.

The subframe configuration unit 3013 sets the first uplink reference UL-DL configuration, the first downlink reference UL-DL configuration, the second uplink reference UL-DL configuration, the second downlink reference UL-DL configuration and the transmission direction UL-DL configuration to each mobile station apparatus 1.

The subframe configuration unit 3013 generates first information indicating the first uplink reference UL-DL configuration, second information indicating the first downlink reference UL-DL configuration, and third information indicating the transmission direction UL-DL configuration. The subframe configuration unit 3013 transmits the first information, the second information and the third information to the mobile station apparatus 1 through the transmission unit 307.

The base station apparatus 3 may determine the first uplink reference UL-DL configuration, the first downlink reference UL-DL configuration, the second uplink reference UL-DL configuration, the second downlink reference UL-DL configuration and/or the transmission direction UL-DL configuration for the mobile station apparatus 1. The base station apparatus 3 may be instructed that the first uplink reference UL-DL configuration, the first downlink reference UL-DL configuration, the second uplink reference UL-DL configuration, the second downlink reference UL-DL configuration and/or the transmission direction UL-DL configuration for the mobile station apparatus 1 are performed from the higher node.

For example, the subframe configuration unit 3013 may determine the first uplink reference UL-DL configuration, the first downlink reference UL-DL configuration, the second uplink reference UL-DL configuration, the second downlink reference UL-DL configuration and/or the transmission direction UL-DL configuration based on the traffic amount of the uplink and the traffic amount of the downlink.

The subframe configuration unit 3013 manages at least two subframe sets. The subframe configuration unit 3013 may set at least two subframe sets to each mobile station apparatus 1. The subframe configuration unit 3013 may set at least two subframe sets to each serving cell. The subframe configuration unit 3013 may set at least two subframe sets to each CSI process.

The subframe configuration unit 3013 transmits information indicating at least two subframe sets to the mobile station apparatus 1 through the transmission unit 307.

The scheduling unit 3015 of the higher layer processing unit 301 determines a frequency and a subframe to which the physical channels (PDSCH and PUSCH) are assigned, a coding rate and a modulation scheme of the physical channels (PDSCH and PUSCH) and a transmission power from the received channel state information and the quality of the channel or the estimation value of the channel input from the measurement unit 3059. The scheduling unit 3015 determines whether to schedule the downlink physical channel and/or the downlink physical signal or to schedule the uplink physical channel and/or the uplink physical signal in a flexible subframe. The scheduling unit 3015 generates control information (for example, DCI format) in order to control the reception unit 305 and the transmission unit 307 based on the scheduling result, and outputs the generated information to the control unit 303.

The scheduling unit 3015 generates information used to schedule the physical channels (PDSCH and PUSCH) based on the scheduling result. The scheduling unit 3015 determines timings when a transmission process and a reception process based on the first uplink reference UL-DL configuration, the first downlink reference UL-DL configuration, the second uplink reference UL-DL configuration, the second downlink reference UL-DL configuration and/or the transmission direction UL-DL configuration.

The CSI report control unit 3017 of the higher layer processing unit 301 controls the CSI report of the mobile station apparatus 1. The CSI report control unit 3017 transmits information indicating various configurations assumed in order for the mobile station apparatus 1 to derive the CQI in the CSI resource to the mobile station apparatus 1 through the transmission unit 307.

The control unit 303 generates control signals for controlling the reception unit 305 and the transmission unit 307 based on the control information from the higher layer processing unit 301. The control unit 303 outputs the generated control signals to the reception unit 305 and the transmission unit 307, and controls the reception unit 305 and the transmission unit 307.

In response to the control signal input from the control unit 303, the reception unit 305 separates, demodulates and decodes a reception signal received from the mobile station apparatus 1 through the transmit and receive antenna 309, and outputs the decoded information to the higher layer processing unit 301. The wireless reception unit 3057 converts a frequency of an uplink signal received through the transmit and receive antenna 309 into an intermediate frequency (down conversion), removes an unnecessary frequency component from the signal, controls the signal such that a signal level is appropriately maintained, perform quadrature demodulation based on an in-phase component and a quadrature component of the received signal, and converts the quadrature-demodulated analog signal into a digital signal.

The wireless reception unit 3057 removes a portion equivalent to a guard interval (GI) from the converted digital signal. The wireless reception unit 3057 performs fast Fourier transform (FFT) on the signal by removing the guard interval, extracts a signal in the frequency domain, and outputs the extracted signal to the demultiplexing unit 3055.

The demultiplexing unit 3055 separates the signal input from the wireless reception unit 3057 into signals such as the PUCCH, the PUSCH, and the uplink reference signal. Such separation is previously determined by the radio resource control unit 3011 of the base station apparatus 3, and is performed based on the assignment information of the radio resource included in the uplink grant notified to each mobile station apparatus 1. The demultiplexing unit 3055 compensates the channels of the PUCCH and the PUSCH from the estimation value of the channel input from the measurement unit 3059. The demultiplexing unit 3055 outputs the separated uplink reference signal to the measurement unit 3059.

The demodulation unit 3053 performs inverse discrete Fourier transform (IDFT) on the PUSCH to acquire a modulation symbol, and demodulates a reception signal for each modulation symbol of the PUCCH and the PUSCH by using a prescribed modulation scheme such as binary phase shift keying (BPSK), QPSK, 16-QAM or 64-QAM or a modulation scheme previously notified using the uplink grant to each mobile station apparatus 1 by the base station apparatus. The demodulation unit 3053 separates modulation symbols of a plurality of uplink data items transmitted through the same PUSCH by using the MIMO SM based on the number of spatial-multiplexed sequences previously notified using the uplink grant to each mobile station apparatus 1 and the information indicating the precoding performed on the sequences.

The decoding unit 3051 decodes the coding bits of the demodulated PUCCH and PUSCH by using a prescribed coding scheme at a coding rate which is previously determined or previously notified using the uplink grant to the mobile station apparatus 1 by the base station apparatus, and outputs the decoded uplink data and the uplink control information to the higher layer processing unit 101. In a case where the PUSCH is retransmitted, the decoding unit 3051 performs decoding by using a coding bit retained in an HARQ buffer input from the higher layer processing unit 301 and the demodulated coding bit. The measurement unit 309 measures the quality of the channel and the estimation value of the channel from the uplink reference signal input from the demultiplexing unit 3055, and outputs the measured estimation value and channel quality to the demultiplexing unit 3055 and the higher layer processing unit 301.

In response to the control signal input from the control unit 303, the transmission unit 307 generates the downlink reference signal, codes and modulates the HARQ indicator, the downlink control information and the downlink data input from the higher layer processing unit 301, multiplexes the PHICH, the PDCCH, the EPDCCH, the PDSCH, and the downlink reference signal, and transmits the signal to the mobile station apparatus 1 through the transmit and receive antenna 309.

The coding unit 3071 performs coding on the HARQ indicator, the downlink control information and the downlink data input from the higher layer processing unit 301 by using a prescribed coding scheme such as block coding, convolutional coding or turbo coding, or performs coding by using a coding scheme determined by the radio resource control unit 3011. The modulation unit 3073 modulates the coding bit input from the coding unit 3071 by a prescribed modulation scheme such as BPSK, QPSK, 16-QAM or 64-QAM or a modulation scheme determined by the radio resource control unit 3011.

The downlink reference signal generation unit 3079 generates a sequence known to the mobile station apparatus 1, as the downlink reference signal, which is acquired by a prescribed rule based on the physical cell identity (PCI) for identifying the base station apparatus 3. The multiplexing unit 3075 multiplexes the modulation symbol of each modulated channel and the generated downlink reference signal. That is, the multiplexing unit 3075 allocates the modulation symbol of each modulated channel and the generated downlink reference signal to the resource elements.

The wireless transmission unit 3077 performs inverse fast Fourier transform (IFFT) on the multiplexed modulation symbol, performs modulation by using an OFDM scheme, adds the guard interval to the OFDM-modulated OFDM symbol, and generates a baseband digital signal. The wireless transmission unit converts the baseband digital signal into an analog signal, generates an in-phase component and a quadrature component of an intermediate frequency from the analog signal, and removes an extra frequency component for an intermediate frequency band. The wireless transmission unit converts the signal having the intermediate frequency into a signal having a high frequency (up conversion), removes an extra frequency component from the signal, amplifies a power of the signal, and outputs and transmits the amplified signal to the transmit and receive antenna 309.

Hereinafter, the first uplink reference uplink-downlink (UL-DL) configuration, the first downlink reference uplink-downlink (UL-DL) configuration, the second uplink reference UL-DL configuration, the second downlink reference UL-DL configuration and the transmission direction uplink-downlink (UL-DL) configuration will be described.

The first uplink reference UL-DL configuration, the first downlink reference UL-DL configuration, the second uplink reference UL-DL configuration, the second downlink reference UL-DL configuration and the transmission direction UL-DL configuration are defined by the uplink-downlink configuration (UL-DL configuration).

The uplink-downlink configuration is a configuration related to a pattern of a subframe within the radio frame. The uplink-downlink configuration indicates whether or not each subframe within the radio frame is any one of the downlink subframe, the uplink subframe, and the special subframe.

That is, the first uplink reference UL-DL configuration, the first downlink reference UL-DL configuration, the second uplink reference UL-DL configuration, the second downlink reference UL-DL configuration and the transmission direction UL-DL configuration are defined by the pattern of the downlink subframe, the uplink subframe, and the special subframe within the radio frame.

The pattern of the downlink subframe, the uplink subframe and the special subframe indicates whether or not each of subframes #0 to #9 is any one of the downlink subframe, the uplink subframe, and the special subframe, and is preferably expressed by an arbitrary combination such that the length of D, U and S (respectively indicating the downlink subframe, the uplink subframe and the special subframe) is 10. More preferably, the first subframe (that is, subframe #0) is D, and the second subframe (that is, subframe #1) is S.

FIG. 9 is a table showing an example of the uplink-downlink configuration according to the present embodiment. In FIG. 9, D represents the downlink subframe, U represents the uplink subframe, and S represents the special subframe.

In FIG. 9, the subframe 1 within the radio frame is constantly the special subframe. In FIG. 9, the subframes 0 and 5 are reserved for downlink transmission, and the subframe 2 is constantly reserved for uplink transmission.

In FIG. 9, in a case where the downlink-to-uplink switch-point periodicity is 5 ms, the subframe 6 within the radio frame is the special subframe, and in a case where the downlink-to-uplink switch-point periodicity is 10 ms, the subframe 6 within the radio frame is the downlink subframe.

The first uplink reference UL-DL configuration is also referred to as a first parameter, a first configuration or a serving cell uplink-downlink configuration. The first downlink reference UL-DL configuration is also referred to as a second parameter or a second configuration. The second uplink reference UL-DL configuration is also referred to as a third parameter or a third configuration. The second downlink reference UL-DL configuration is also referred to as a fourth parameter or a fourth configuration. The transmission direction UL-DL configuration is also referred to as a fifth parameter or a fifth configuration.

A case where an uplink-downlink configuration i is set as the first or second uplink reference UL-DL configuration is referred to as a case where a first or second uplink reference UL-DL configuration i is set. A case where an uplink-downlink configuration i is set as the first or second downlink reference UL-DL configuration is referred to as a case where a first or second downlink reference UL-DL configuration i is set. A case where an uplink-downlink configuration i set as the transmission direction UL-DL configuration is referred to as a case where a transmission direction UL-DL configuration i is set.

Hereinafter, a method of setting the first uplink reference UL-DL configuration, the first downlink reference UL-DL configuration and the transmission direction UL-DL configuration will be described.

The base station apparatus 3 sets the first uplink reference UL-DL configuration, the first downlink reference UL-DL configuration and the transmission direction UL-DL configuration. The base station apparatus 3 may transmit first information (TDD-Config) indicating the first uplink reference UL-DL configuration, second information indicating the first downlink reference UL-DL configuration and third information indicating the transmission direction UL-DL configuration by adding these information items to at least one of the MIB, the system information block type 1 message, the system information message, the RRC message, the MAC control element (CE), and the control information (for example, DCI format) of the physical layer. The base station apparatus 3 may add the first information, the second information and the third information to any one of the MIB, the system information block type 1 message, the system information message, the RRC message, the MAC control element (CE) and the control information (for example, DCI format) of the physical layer.

The first uplink reference UL-DL configuration, the second uplink reference UL-DL configuration, the first downlink reference UL-DL configuration, the second downlink reference UL-DL configuration and the transmission direction UL-DL configuration may be defined for each of the plurality of serving cells.

The base station apparatus 3 transmits the first information, the second information, and the third information for each serving cell to the mobile station apparatus 1 for which the plurality of serving cells is configured. The first information, the second information, and the third information may be defined for each serving cell.

The base station apparatus 3 may transmits the first information for the primary cell, the second information for the primary cell, the third information for the primary cell, the first information for the secondary cell, the second information for the secondary cell and the third information for the secondary cell to the mobile station apparatus 1 for which two serving cells including one primary cell and one secondary cell are configured.

The mobile station apparatus 1 for which the plurality of serving cells is configured may set the first uplink reference UL-DL configuration, the first downlink reference UL-DL configuration and the transmission direction UL-DL configuration to each serving cell based on the first information, the second information, and the third information.

The mobile station apparatus 1 for which two serving cells including one primary cell and one secondary cell are configured may set the first uplink reference UL-DL configuration for the primary cell, the first downlink reference UL-DL configuration for the primary cell, the transmission direction UL-DL configuration for the primary cell, the first uplink reference UL-DL configuration for the secondary cell, the first downlink reference UL-DL configuration for the secondary cell, and the transmission direction UL-DL configuration for the secondary cell.

It is preferable that the first information for the primary cell is included in the system information block type 1 message or the RRC message. It is preferable that the first information for the secondary cell is included in the RRC message. It is preferable that the second information for the primary cell is included in the system information block type 1 message, the system information message or the RRC message. It is preferable that the second information for the secondary cell is included in the RRC message. It is preferable that the third information is included in the control information (for example, DCI format) of the physical layer.

It is preferable that the first information is common to the plurality of mobile station apparatuses 1 within the cell. The second information may be common to the plurality of mobile station apparatuses 1 within the cell, or may be dedicated to the mobile station apparatus 1. The third information may be common to the plurality of mobile station apparatuses 1 within the cell, or may be dedicated to the mobile station apparatus 1.

The system information block type 1 message is initially transmitted through the PDSCH in the subframe 5 of the radio frame that satisfies SFN mod 8=0, and is retransmitted (repeated) in the subframe 5 in another radio frame that satisfies SFN mod 2=0. The system information block type 1 message includes information indicating a structure (length of DwPTS, GP, and UpPTS) of the special subframe. The system information block type 1 message is cell-specific information.

The system information message is transmitted through the PDSCH. The system information message is cell-specific information. The system information message includes system information block X other than the system information block type 1.

The RRC message is transmitted through the PDSCH. The RRC message is information/signal processed in the RRC layer. The RRC message may be common to the plurality of mobile station apparatuses 1 within the cell, or may be dedicated to a specific mobile station apparatus 1.

The MAC CE is transmitted through the PDSCH. The MAC CE is information/signal processed in the MAC layer.

It is preferable that in a case where the control information (for example, DCI format) of the physical layer including the first information and/or the second information and/or the third information are received in a subframe n-k through the downlink physical channel (for example, PDCCH/EPDCCH), the mobile station apparatus 1 sets (validates) the first uplink reference UL-DL configuration and/or the first downlink reference UL-DL configuration and/or the transmission direction UL-DL configuration in a subframe n. For example, k is 4 or 8. For example, the subframe n+k is a subframe in which the HARQ-ACK (ACK) of the downlink physical channel (for example, PDCCH/EPDCCH) used to transmit the control information (for example, DCI format) of the physical layer is transmitted. For example, k is determined based on the table of FIG. 21 and the current first or second downlink reference UL-DL configuration.

It is preferable that in a case where the control information (for example, DCI format) of the physical layer including the third information is received through the downlink physical channel (for example, PDCCH/EPDCCH) in a radio frame n-k, the mobile station apparatus 1 sets (validates) the transmission direction UL-DL configuration in the radio frame n. For example, k is 1. The third information received in the radio frame n-k may be validated for only the radio frame n.

Figure 10:
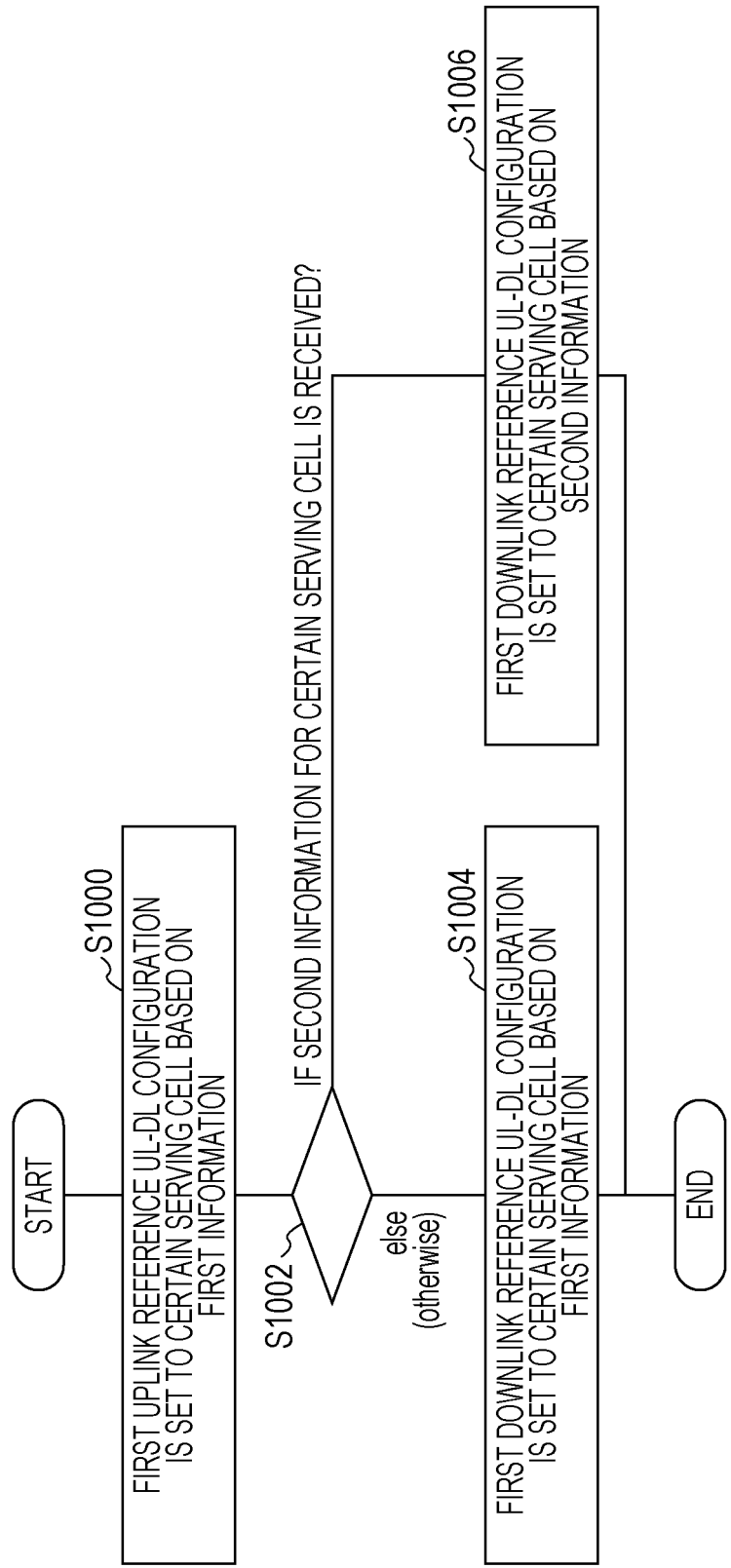
FIG. 10 is a flowchart showing a method of setting a first uplink reference UL-DL configuration and a first downlink reference UL-DL configuration according to the present embodiment.

FIG. 10 is a flowchart showing a method of setting the first uplink reference UL-DL configuration and the first downlink reference UL-DL configuration according to the present embodiment. The mobile station apparatus 1 performs the setting method of FIG. 10 on each of the plurality of serving cells.

The mobile station apparatus 1 sets the first uplink reference UL-DL configuration to a certain serving cell based on the first information (S1000). The mobile station apparatus 1 determines whether or not the second information for the certain serving cell is received (S1002). In a case where the second information for the certain serving cell is received, the mobile station apparatus 1 sets the first downlink reference UL-DL configuration to the certain serving cell based on the second information for the certain serving cell (S1006). In a case where the second information for the certain serving cell is not received (else/otherwise), the mobile station apparatus 1 sets the first downlink reference UL-DL configuration to the certain serving cell based on the first information for the certain serving cell (S1004).

The serving cell to which the first uplink reference UL-DL configuration and the first downlink reference UL-DL configuration are set based on the first information is also referred to as a serving cell for which the dynamic TDD is not configured. The serving cell to which the first downlink reference UL-DL configuration is set based on the second information is also referred to as a serving cell for which the dynamic TDD is configured.

The mobile station apparatus 1 receives the second information, and determines a subframe in which the uplink signal can be transmitted based on the second information. Subsequently, the mobile station apparatus 1 monitors the third information. In a case where the third information is received, the mobile station apparatus 1 determines a subframe in which the uplink signal can be transmitted based on the third information.

For example, the base station apparatus 3 transmits the third information to the mobile station apparatus 1 by using the PDCCH/EPDCCH. The third information controls an operation of the dynamic TDD within the coverage of the base station apparatus 3 (cell). The third information is transmitted and received in a common search space (CSS) or a UE-specific search space (USS).

The CSS is a region in which the plurality of mobile station apparatuses 1 commonly monitors the PDCCH/EPDCCH. The USS is a region defined based on at least C-RNTI. The C-RNTI is an identifier assigned so as to be specific to the mobile station apparatus 1.

The C-RNTI may be used in the transmission of the DCI format including the third information (information indicating the transmission direction for the subframe). An RNTI different from the C-RNTI and the SPS C-RNTI may be used in the transmission of the DCI format including the third information (information indicating the transmission direction for the subframe). The RNTI is referred to as an X-RNTI. That is, the CRC parity bit added to the DCI format including the third information is scrambled with the C-RNTI or the X-RNTI.

The subframe in which the mobile station apparatus 1 monitors the PDCCH/EPDCCH including the third information may be restricted. The base station apparatus 3 may control the subframe in which the mobile station apparatus 1 monitors the PDCCH/EPDCCH including the third information. The base station apparatus 3 may transmit information indicating the subframe in which the mobile station apparatus 1 monitors the PDCCH/EPDCCH including the third information to the mobile station apparatus 1.

For example, the PDCCH/EPDCCH including the third information may be allocated at an interval of 10 subframes. For example, the mobile station apparatus 1 monitors the third information at an interval of 10 subframes. A subframe to which the PDCCH/EPDCCH including the third information may be allocated may be previously determined. For example, the third information may be allocated to only the subframe 0 or 5 of the radio frame.

The mobile station apparatus 1 that starts the operation of the dynamic TDD monitors the PDCCH/EPDCCH including the third information in the subframe to which the PDCCH/EPDCCH including the third information may be allocated.

The mobile station apparatus 1 tries to decode the received signal, and determines whether or not the PDCCH/EPDCCH including the third information is detected. In a case where the PDCCH/EPDCCH including the third information is detected, the mobile station apparatus 1 determines the subframe in which the uplink signal can be transmitted based on the detected third information. In a case where the PDCCH/EPDCCH including the third information is not detected, the mobile station apparatus 1 may maintain the determination related to the subframe in which the uplink signal can be transmitted.

Hereinafter, the method of setting the second uplink reference UL-DL configuration will be described.

The plurality of serving cells is configured for the mobile station apparatus 1, and the mobile station apparatus 1 and the base station apparatus 3 set the second uplink reference UL-DL configuration in a case where the first uplink reference UL-DL configurations for at least two serving cells are different.

The plurality of serving cells may be configured for the mobile station apparatus 1, and the mobile station apparatus 1 and the base station apparatus 3 may not set the second uplink reference UL-DL configuration in a case where the first uplink reference UL-DL configurations for at least two serving cells are not different.

The case where the first uplink reference UL-DL configurations for at least two serving cells are not different is a case where the first uplink reference UL-DL configurations for all the serving cells are the same. In a case where one serving cell is configured for the mobile station apparatus 1, the mobile station apparatus 1 and the base station apparatus 3 may not set the second uplink reference UL-DL configuration.

Figure 11:
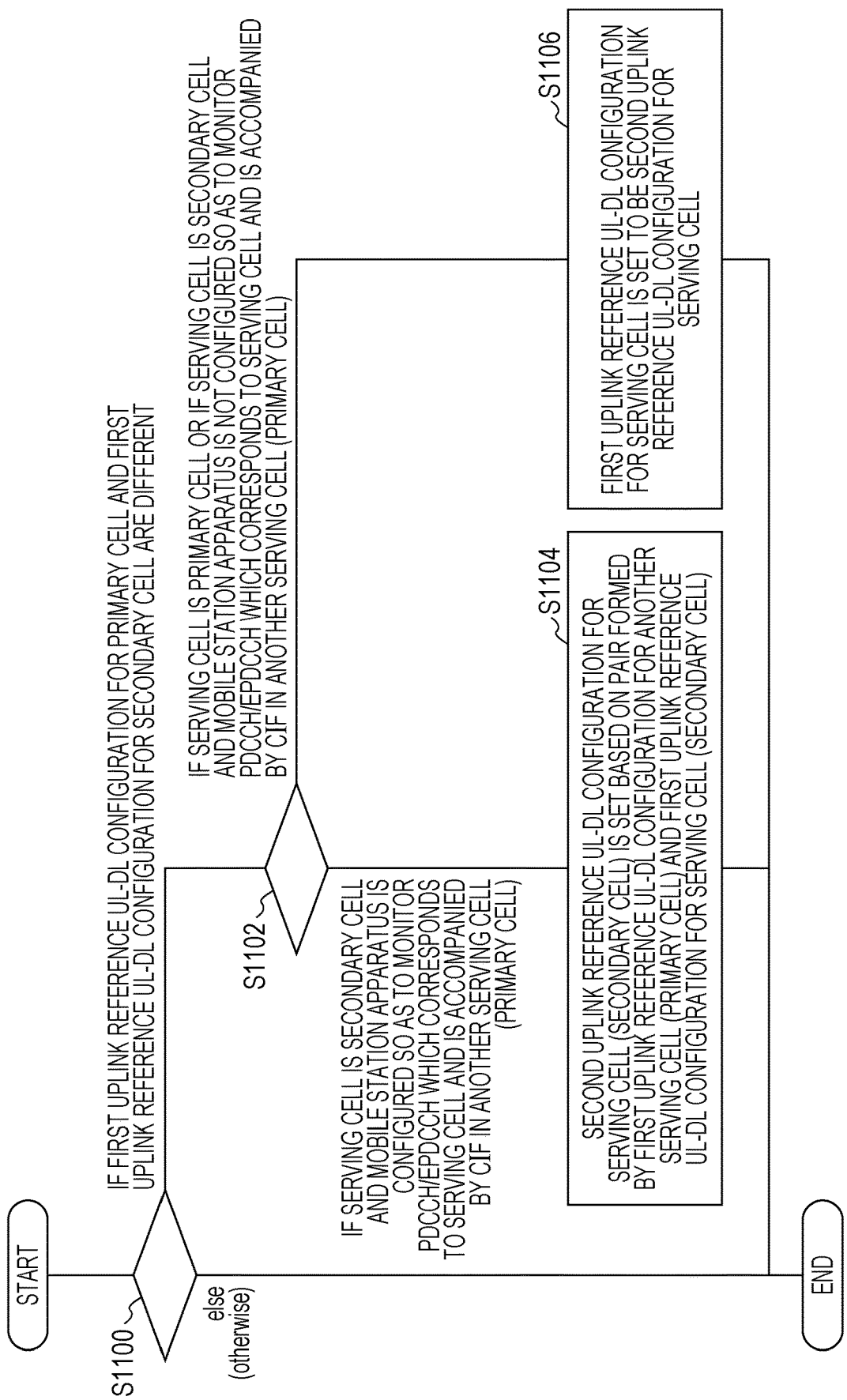
FIG. 11 is a flowchart showing a method of setting a second uplink reference UL-DL configuration according to the present embodiment.

FIG. 11 is a flowchart showing the method of setting the second uplink reference UL-DL configuration according to the present embodiment. In FIG. 11, one primary cell and one secondary cell are configured for the mobile station apparatus 1. The mobile station apparatus 1 performs the setting method of FIG. 11 on the primary cell and the secondary cell.

The mobile station apparatus 1 determines whether or not the first uplink reference UL-DL configuration for the primary cell and the first uplink reference UL-DL configuration for the secondary cell are different (S1100). In a case where the first uplink reference UL-DL configuration for the primary cell and the first uplink reference UL-DL configuration for the secondary cell are the same, the mobile station apparatus 1 ends the process of setting the second uplink reference UL-DL configuration without setting the second uplink reference UL-DL configuration.

In a case where the first uplink reference UL-DL configuration for the primary cell and the first uplink reference UL-DL configuration for the secondary cell are different, the mobile station apparatus 1 determines whether the serving cell is the primary cell or the secondary cell and/or the mobile station apparatus is configured so as to monitor the PDCCH/EPDCCH which corresponds to the serving cell and is accompanied by a carrier indicator field (CIF) in another serving cell (S1102).

In a case where the serving cell is the secondary cell and the mobile station apparatus 1 is configured so as to monitor the PDCCH/EPDCCH which corresponds to the serving cell (secondary cell) and is accompanied by the CIF in another serving cell (primary cell), the mobile station apparatus sets the secondary uplink reference UL-DL configuration for the serving cell (secondary cell) based on a pair formed by the first uplink reference UL-DL configuration for another serving cell (primary cell) and the first uplink reference UL-DL configuration for the serving cell (secondary cell) (S1104).

In S1104, the mobile station apparatus 1 sets the second uplink reference UL-DL configuration for the serving cell (secondary cell) based on the table of FIG. 12. FIG. 12 is a diagram showing the correspondence between the pair formed by the first uplink reference UL-DL configuration for another serving cell (primary cell) and the first uplink reference UL-DL configuration for the serving cell (secondary cell) with the second uplink reference UL-DL configuration for the secondary cell in the present embodiment.

In FIG. 12, the primary cell UL-DL configuration refers to the first uplink reference UL-DL configuration for another serving cell (primary cell). In FIG. 12, the secondary cell UL-DL configuration refers to the first uplink reference UL-DL configuration for the serving cell (secondary cell).

For example, in a case where the mobile station apparatus sets the first uplink reference UL-DL configuration 0 for another serving cell (primary cell) sets the first uplink reference UL-DL configuration 2 for the serving cell (secondary cell), the mobile station apparatus sets the second uplink reference UL-DL configuration 1 to the secondary cell.

In a case where the serving cell is the primary cell, or the serving cell is the secondary cell and the mobile station apparatus 1 does not set so as to monitor the PDCCH/EPDCCH which corresponds to the serving cell (secondary cell) and is accompanied by the CIF in another serving cell (primary cell), the mobile station apparatus sets the first uplink reference UL-DL configuration for the serving cell to be the second uplink reference UL-DL configuration for the serving cell (S1106).

The base station apparatus 3 sets the second uplink reference UL-DL configuration based on the setting method of FIG. 11.

A case where the PDCCH/EPDCCH accompanied by the CIF is monitored means that the decoding of the PDCCH or the EPDCCH is tried according to the DCI format including the CIF. The CIF is a field to which the carrier indicator is mapped. A value of the carrier indicator indicates the serving cell corresponding to the DCI format associated with the carrier indicator.

The mobile station apparatus 1 set so as to monitor the PDCCH/EPDCCH which corresponds to the serving cell and is accompanied by the CIF in another serving cell monitors the PDCCH/EPDCCH accompanied by the CIF in the another serving cell.

It preferable that the mobile station apparatus 1 set so as to monitor the PDCCH/EPDCCH which corresponds to the serving cell and is accompanied by the CIF in another serving cell receives the third information for the serving cell through the PDCCH/EPDCCH in the another serving cell.

The mobile station apparatus 1 which is not set so as to monitor the PDCCH/EPDCCH which corresponds to the serving cell and is accompanied by the CIF in another serving cell monitors the PDCCH/EPDCCH which is accompanied by the CIF or does not accompany by the CIF in the serving cell.

It is preferable that the mobile station apparatus 1 which is not set so as to monitor the PDCCH/EPDCCH which corresponds to the serving cell and is accompanied by the CIF in another serving cell receives the third information for the serving cell through the PDCCH/EPDCCH in the serving cell.

The PDCCH/EPDCCH for the primary cell is transmitted in the primary cell. It is preferable that the third information for the primary cell is transmitted through the PDCCH/EPDCCH of the primary cell.

The base station apparatus 3 transmits a parameter (cif-Presence-r10) indicating whether or not the CIF is included in the DCI format transmitted in the primary cell to the mobile station apparatus 1.

The base station apparatus 3 transmits a parameter (CrossCarrierSchedulingConfig-r10) associated with the cross-carrier scheduling for each secondary cell to the mobile station apparatus 1.

The parameter (CrossCarrierSchedulingConfig-r10) includes a parameter (schedulignCellInfo-r10) indicating whether the PDCCH/EPDCCH corresponding to the associated secondary cell is transmitted in the secondary cell or another serving cell.

In a case where the parameter (schedulingCellInfo-r10) indicates that the PDCCH/EPDCCH corresponding to the associated secondary cell is transmitted in the secondary cell, the parameter (schedulingCellInfo-r10) includes the parameter (cif-Presence-r10) indicating whether or not the CIF is included in the DCI format transmitted in the secondary cell.

In a case where the parameter (schedulingCellInfo-r10) indicates that the PDCCH/EPDCCH corresponding to the associated secondary cell is transmitted in another serving cell, the parameter (schedulingCellInfo-r10) includes the parameter (schedulingCellId) indicating whether or not the downlink assignment for the associated secondary cell is transmitted in any serving cell.

Hereinafter, the method of setting the second downlink reference UL-DL configuration will be described.

In a case where the plurality of serving cells is configured for the mobile station apparatus 1 and the first downlink reference UL-DL configurations for at least two serving cells are different, the mobile station apparatus 1 and the base station apparatus 3 set the second downlink reference UL-DL configuration. In a case where the plurality of serving cell is configured for the mobile station apparatus 1 and the first downlink reference UL-DL configurations for at least two serving cells are not different, the mobile station apparatus 1 and the base station apparatus 3 may not set the second downlink reference UL-DL configuration.

The case where the first downlink reference UL-DL configurations for at least two serving cells are not different is a case where the first downlink reference UL-DL configurations for all the serving cells are the same. In a case where one serving cell is configured for the mobile station apparatus 1, the mobile station apparatus 1 and the base station apparatus 3 may not set the second downlink reference UL-DL configuration.

Figure 13:
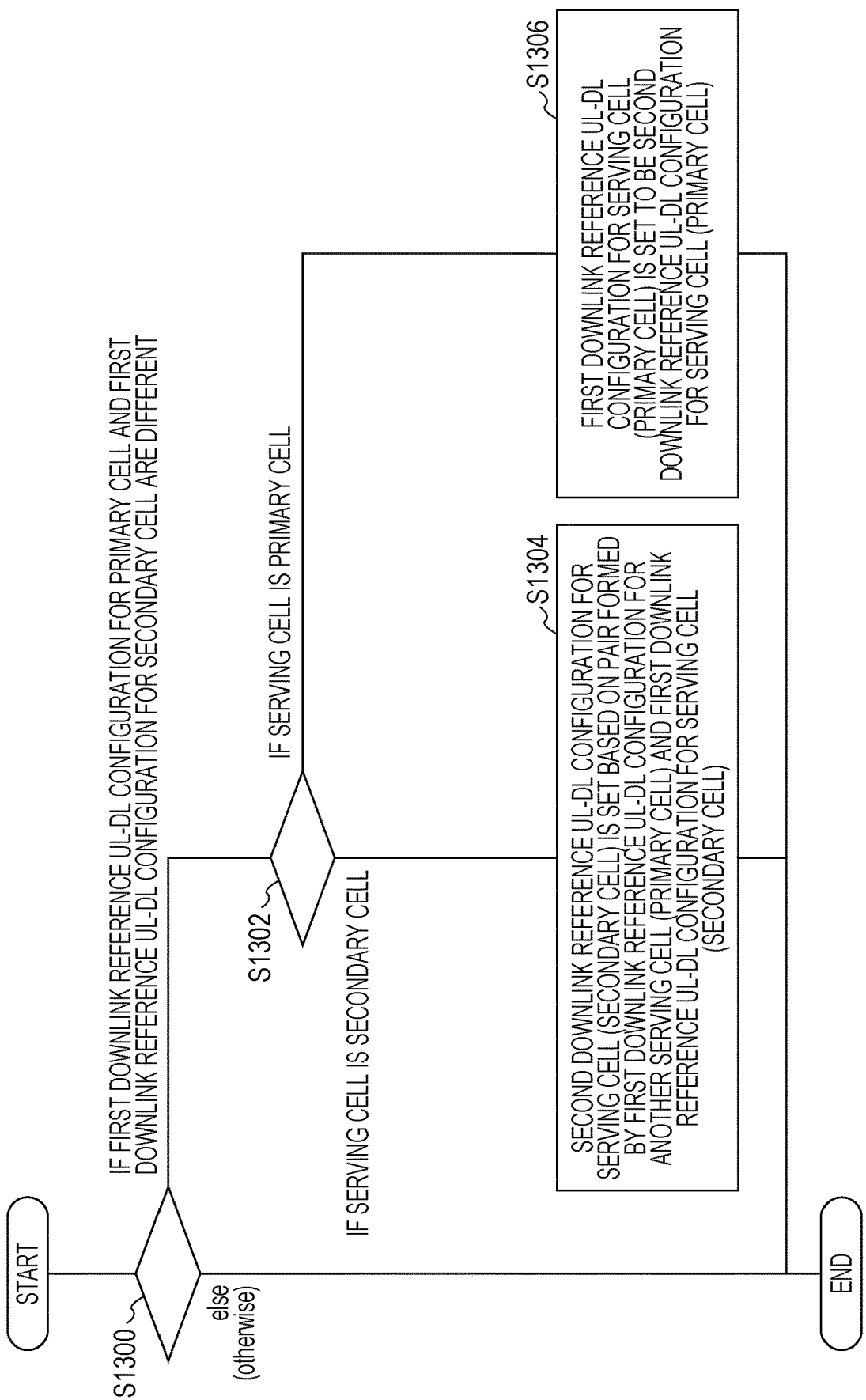
FIG. 13 is a flowchart showing a second downlink reference UL-DL configuration according to the present embodiment.
Figure 23:
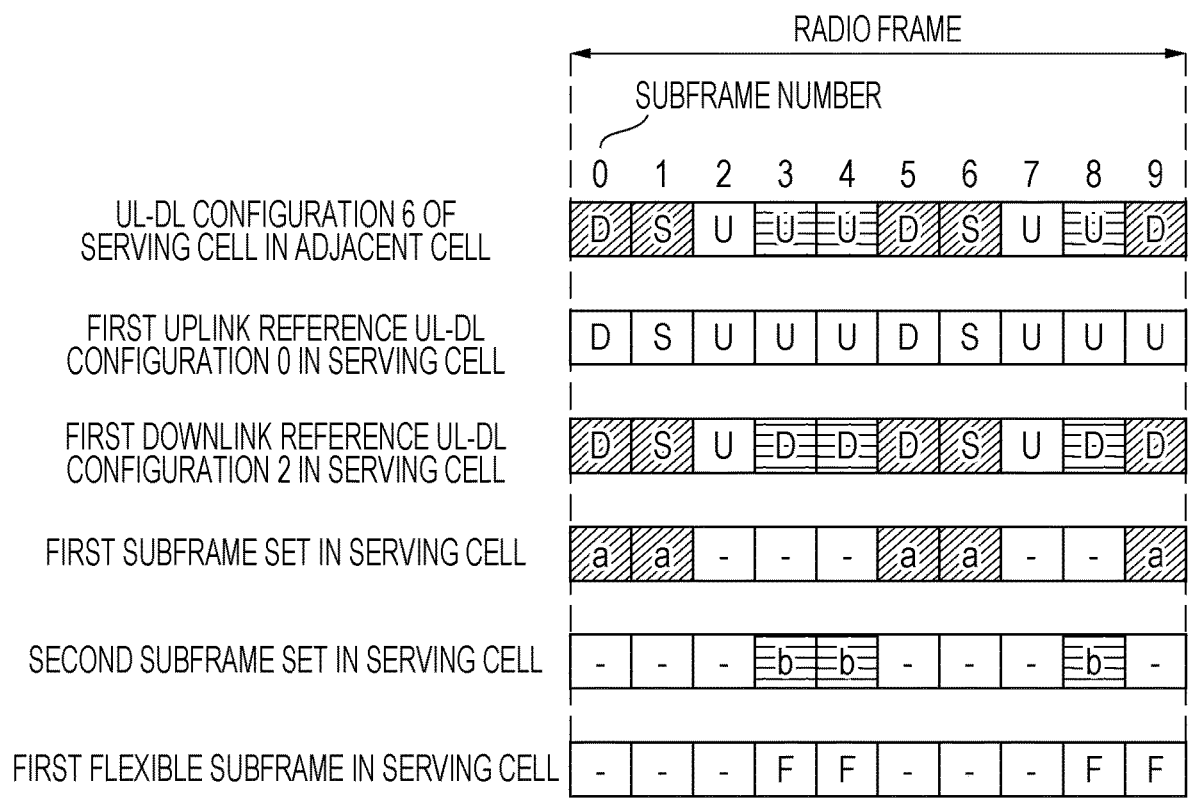
FIG. 23 is a diagram showing an example of a structure of a subframe set according to the present embodiment.

FIG. 13 is a flowchart showing the method of setting the second downlink reference UL-DL configuration according to the present embodiment. In FIG. 13, one primary cell and one secondary cell are configured for the mobile station apparatus 1. The mobile station apparatus 1 performs the setting method of FIG. 13 on each of the primary cell and the secondary cell.

The mobile station apparatus 1 determines whether or not the first downlink reference UL-DL configuration for the primary cell and the first downlink reference UL-DL configuration for the secondary cell are different (S1300). In a case where the first downlink reference UL-DL configuration for the primary cell and the first downlink reference UL-DL configuration for the secondary cell are the same, the mobile station apparatus 1 ends the process of setting the second downlink reference UL-DL configuration without setting the second downlink reference UL-DL configuration.

In a case where the first downlink reference UL-DL configuration for the primary cell and the first downlink reference UL-DL configuration for the secondary cell are different, the mobile station apparatus 1 determines whether the serving cell is the primary cell or the secondary cell (S1302).

In a case where the serving cell is the secondary cell, the mobile station apparatus sets the second uplink reference UL-DL configuration for the serving cell (secondary cell) based on the pair formed by the first downlink reference UL-DL configuration for another serving cell (primary cell) and the first downlink reference UL-DL configuration for the serving cell (secondary cell) (S1304).

In S1304, the mobile station apparatus 1 sets the second downlink reference UL-DL configuration for the serving cell (secondary cell) based on the table of FIG. 14. FIG. 14 is a diagram showing the correspondence between the pair formed by the first downlink reference UL-DL configuration for the primary cell and the first downlink reference UL-DL configuration for the secondary cell and the second downlink reference UL-DL configuration for the secondary cell in the present embodiment.

In FIG. 14, the primary cell UL-DL configuration refers to the first downlink reference UL-DL configuration for the primary cell. In FIG. 14, the secondary cell UL-DL configuration refers to the first downlink reference UL-DL configuration for the secondary cell.

In a case where the pair formed by the first downlink reference UL-DL configuration for the primary cell and the first downlink reference UL-DL configuration for the secondary cell belongs to Set 1 of FIG. 14, the second downlink reference UL-DL configuration for the secondary cell is defined in Set 1.

In a case where the mobile station apparatus 1 is not configured so as to monitor the PDCCH/EPDCCH which corresponds to the secondary cell and is accompanied by the CIF in the primary cell and the pair formed by the first downlink reference UL-DL configuration for the primary cell and the first downlink reference UL-DL configuration for the secondary cell belongs to Set 2 of FIG. 14, the second downlink reference UL-DL configuration for the secondary cell is defined in Set 2.

In a case where the mobile station apparatus 1 is not configured so as to monitor the PDCCH/EPDCCH which corresponds to the secondary cell and is accompanied by the CIF in the primary cell and the pair formed by the first downlink reference UL-DL configuration for the primary cell and the first downlink reference UL-DL configuration for the secondary cell belongs to Set 3 of FIG. 14, the second downlink reference UL-DL configuration for the secondary cell is defined in Set 3.

In a case where the mobile station apparatus 1 is configured so as to monitor the PDCCH/EPDCCH which corresponds to the secondary cell and is accompanied by the CIF in the primary cell and the pair formed by the first downlink reference UL-DL configuration for the primary cell and the first downlink reference UL-DL configuration for the secondary cell belongs to Set 4 of FIG. 14, the second downlink reference UL-DL configuration for the secondary cell is defined in Set 4.

In a case where the mobile station apparatus 1 is configured so as to monitor the PDCCH/EPDCCH which corresponds to the secondary cell and is accompanied by the CIF in the primary cell and the pair formed by the first downlink reference UL-DL configuration for the primary cell and the first downlink reference UL-DL configuration for the secondary cell belongs to Set 5 of FIG. 14, the second downlink reference UL-DL configuration for the secondary cell is defined in Set 5.

For example, in a case where the mobile station apparatus sets the first downlink reference UL-DL configuration 1 to the primary cell and sets the first downlink reference UL-DL configuration 0 to the secondary cell, the mobile station apparatus sets the second downlink reference UL-DL configuration to the secondary cell.

In a case where the serving cell is the primary cell, the mobile station apparatus sets the first downlink reference UL-DL configuration for the serving cell (primary cell) to be the second downlink reference UL-DL configuration for the serving cell (primary cell) (S1306).

The base station apparatus 3 sets the second downlink reference UL-DL configuration based on the setting method of FIG. 13.

Hereinafter, the first uplink reference UL-DL configuration will be described.

The first uplink reference UL-DL configuration is at least used to specify the subframe in which the uplink transmission can be performed or is not able to be performed in the serving cell.

The mobile station apparatus 1 does not perform the uplink transmission in the subframe indicated as the downlink subframe by the first uplink reference UL-DL configuration. The mobile station apparatus 1 does not perform the uplink transmission in the DwPTS and the GP of the subframe indicated as the special subframe by the first uplink reference UL-DL configuration.

Hereinafter, the first downlink reference UL-DL configuration will be described.

The first downlink reference UL-DL configuration is at least used to specify the subframe in which the downlink transmission can be performed or is able to be performed in the serving cell.

The mobile station apparatus 1 does not perform the downlink transmission in the subframe indicated as the uplink subframe by the first downlink reference UL-DL configuration. The mobile station apparatus 1 does not perform the downlink transmission in the UpPTS and the GP of the subframe indicated as the special subframe by the first downlink reference UL-DL configuration.

The mobile station apparatus 1 to which the first downlink reference UL-DL configuration is set based on the first information may perform measurement (for example, measurement related to the channel state information) using the downlink signal in the DwPTS of the downlink subframe or the special subframe indicated by the first uplink reference UL-DL configuration or the first downlink reference UL-DL configuration.

The base station apparatus 3 determines the downlink reference UL-DL configuration among a configuration set (set of configurations) restricted based on the first uplink reference UL-DL configuration. That is, the first downlink reference UL-DL configuration is an element in the configuration set restricted based on the first uplink reference UL-DL configuration. The configuration set restricted based on the first uplink reference UL-DL configuration includes the uplink-downlink configuration that satisfies the following conditions (a) to (c). FIG. 15 is a diagram showing the relationship between the subframe indicated by the first uplink reference UL-DL configuration and the subframe indicated by the first downlink reference UL-DL configuration in the present embodiment. In FIG. 15, D represents the downlink subframe, U represents the uplink subframe, and S represents the special subframe.

Condition (a): the subframe indicated as the downlink subframe by the first uplink reference UL-DL configuration is indicated as the downlink subframe Condition (b): the subframe indicated as the uplink subframe by the first uplink reference UL-DL configuration is indicated as the uplink subframe or the downlink subframe Condition (c): the subframe indicated as the special subframe by the first uplink reference UL-DL configuration is indicated as the downlink subframe or the special subframe.

Thus, In the dynamic TDD, since the DwPTSs of the subframe and the special subframe indicated as the downlink subframe by the first uplink reference UL-DL configuration are not used for the uplink transmission, the mobile station apparatus 1 to which the first downlink reference UL-DL configuration is set based on the first information may appropriately perform the measurement using the downlink signal.

The mobile station apparatus 1 to which the first downlink reference UL-DL configuration is set based on the second information may also perform the measurement (for example, measurement related to the channel state information) using the downlink signal in the DwPTS of the downlink subframe or the special subframe indicated by the first uplink reference UL-DL configuration.

The subframe which is indicated as the uplink subframe by the first uplink reference UL-DL configuration and is indicated as the downlink subframe by the first downlink reference UL-DL configuration is also referred to as a first flexible subframe. The first flexible subframe is a subframe reserved for the uplink and downlink transmission.

The subframe which is indicated as the special subframe by the first uplink reference UL-DL configuration and is indicated as the downlink subframe by the first downlink reference UL-DL configuration is also referred to as a second flexible subframe. The second flexible subframe is a subframe reserved for the downlink transmission. The second flexible subframe is a subframe reserved for the downlink transmission in the DwPTS and the uplink transmission in the UpPTS.

Hereinafter, the transmission direction UL-DL configuration will be described in detail.

The mobile station apparatus 1 and the base station apparatus 3 set the transmission direction UL-DL configuration related to a transmission direction (up/down) in the subframe. The transmission direction UL-DL configuration is used to determine the transmission direction in the subframe.

The mobile station apparatus 1 controls the transmission in the first flexible subframe and the second flexible subframe based on the scheduling information (DCI format and/or HARQ-ACK) and the transmission direction UL-DL configuration.

The base station apparatus 3 transmits the third information indicating the transmission direction UL-DL configuration to the mobile station apparatus 1. The third information is information indicating the subframe in which the uplink transmission can be performed. The third information is information indicating the subframe in which the downlink transmission can be performed. The third information is information indicating the subframe in which the uplink transmission in the UpPTS and the downlink in the DwPTS can be performed.

For example, the transmission direction UL-DL configuration is used to specify the transmission direction in the subframe indicated as the uplink subframe by the first uplink reference UL-DL configuration and is indicated as the downlink subframe by the first downlink reference UL-DL configuration and/or the subframe indicated as the special subframe by the first uplink reference UL-DL configuration and is indicated as the downlink subframe by the first downlink reference UL-DL configuration. That is, the transmission direction UL-DL configuration is used to specify the transmission direction in the subframe indicated as the subframe for which the first uplink reference UL-DL configuration and the first downlink reference UL-DL configuration are different.

FIG. 16 is a diagram showing the relationship of the subframe indicated by the first uplink reference UL-DL configuration, the subframe indicated by the first downlink reference UL-DL configuration, and the subframe indicated by the transmission direction UL-DL configuration in the present embodiment. In FIG. 16, D represents the downlink subframe, U represents the uplink subframe, and S represents the special subframe.

The base station apparatus 3 determines the transmission direction UL-DL configuration among a configuration set (set of configurations) restricted based on the first uplink reference UL-DL configuration and the first downlink reference UL-DL configuration. That is, the transmission direction UL-DL configuration is an element in the configuration set restricted based on the first uplink reference UL-DL configuration and the first downlink reference UL-DL configuration. The configuration set restricted based on the first uplink reference UL-DL configuration and the first downlink reference UL-DL configuration includes the uplink-downlink configuration that satisfies the following conditions (d) to (h).

Condition (d): the subframe indicated as the downlink subframe by the first uplink reference UL-DL configuration and the first downlink reference UL-DL configuration is indicated as the downlink subframe Condition (e): the subframe indicated as the uplink subframe by the first uplink reference UL-DL configuration and the first downlink reference UL-DL configuration is indicated as the uplink subframe Condition (f): the subframe which is indicated as the uplink subframe by the first uplink reference UL-DL configuration but is indicated as the downlink subframe by the first downlink reference UL-DL configuration is indicated as uplink subframe or downlink subframe Condition (g): the subframe indicated as the special subframe by the first uplink reference UL-DL configuration and the first downlink reference UL-DL configuration is indicated as the special subframe Condition (h): the subframe which is indicated as the special subframe by the first uplink reference UL-DL configuration but is indicated as the downlink subframe by the first downlink reference UL-DL configuration is indicated as the special subframe or the downlink subframe.

The base station apparatus 3 may schedule the downlink transmission in the subframe indicated as the downlink subframe by the transmission direction UL-DL configuration.

The mobile station apparatus 1 may perform the reception process of the downlink signal in the subframe indicated as the downlink subframe by the transmission direction UL-DL configuration. The mobile station apparatus 1 may monitor the PDCCH/EPDCCH in the subframe indicated as the downlink subframe by the transmission direction UL-DL configuration. The mobile station apparatus 1 may perform the reception process of the PDSCH in the subframe indicated as the downlink subframe by the transmission direction UL-DL configuration based on the detection of the downlink grant through the PDCCH/EPDCCH.

In a case where the transmission of the uplink signal (PUSCH/SRS) in the subframe indicated as the downlink subframe by the transmission direction UL-DL configuration is scheduled or configured, the mobile station apparatus 1 does not perform the transmission process of the uplink signal (PUSCH/SRS) in the subframe.

The base station apparatus 3 may schedule the uplink transmission in the subframe indicated as the uplink subframe by the transmission direction UL-DL configuration.

The base station apparatus 3 may schedule the downlink transmission in the subframe indicated as the uplink subframe by the transmission direction UL-DL configuration. The scheduling of the downlink transmission by the base station apparatus 3 may be inhibited in the subframe indicated as the uplink subframe by the transmission direction UL-DL configuration.

The mobile station apparatus 1 may perform the transmission process of the uplink signal in the subframe indicated as the uplink subframe by the transmission direction UL-DL configuration. In a case where the transmission of the uplink signal (PUSCH/DMRS/SRS) in the subframe indicated as the uplink subframe by the transmission direction UL-DL configuration is scheduled or configured, the mobile station apparatus 1 may perform the transmission process of the uplink (PUSCH/DMRS/SRS) in the subframe.

The mobile station apparatus 1 may perform the reception process of the downlink signal in the subframe which is indicated as the uplink subframe by the transmission direction UL-DL configuration and in which the uplink transmission is not scheduled. The reception process of the downlink signal by the mobile station apparatus 1 may be inhibited in the subframe indicated as the uplink subframe by the transmission direction UL-DL configuration.

The base station apparatus 3 may schedule the downlink transmission in the DwPTS of the subframe indicated as the special subframe by the transmission direction UL-DL configuration.

The mobile station apparatus 1 may perform the reception process of the downlink signal in the DwPTS of the subframe indicated as the special subframe by the transmission direction UL-DL configuration. The mobile station apparatus 1 may monitor the PDCCH/EPDCCH in the DwPTS of the subframe indicated as the special subframe by the transmission direction UL-DL configuration. The mobile station apparatus 1 may perform the reception process of the PDSCH in the DwPTS of the subframe indicated as the special subframe by the transmission direction UL-DL configuration based on the detection of the downlink grant through the PDCCH/EPDCCH.

In a case where the transmission of the PUSCH in the subframe indicated as the special subframe by the transmission direction UL-DL configuration is scheduled or configured, the mobile station apparatus 1 does not perform the transmission process of the PUSCH in the subframe.

In a case where the transmission of the SRS in the UpPTS of the subframe indicated as the special subframe by the transmission direction UL-DL configuration is scheduled or configured, the mobile station apparatus 1 may perform the transmission process of the SRS in the UpPTS of the subframe.

The CRS, the PDCCH, the PHICH, and/or the PCFICH may not be transmitted in the first flexible subframe indicated as the downlink subframe by the transmission direction UL-DL configuration. In this case, the EPDCCH and the PDSCH are transmitted in the first flexible subframe used as the downlink subframe.

Whether or not the CRS, the PDCCH, the PHICH and/or the PCFICH are transmitted in the first flexible subframe indicated as the downlink subframe by the transmission direction UL-DL configuration may be controlled by the base station apparatus 3. In this case, the base station apparatus 3 transmits a CRS parameter indicating whether or not the CRS, the PDCCH, the PHICH and/or the PCFICH is transmitted in the first flexible subframe indicated as the downlink subframe by the transmission direction UL-DL configuration to the mobile station apparatus 1, and the mobile station apparatus 1 sets the CRS parameter.

The CRS may not be transmitted in the GP and UpPTS fields of the second flexible subframe indicated as the downlink subframe by the transmission direction UL-DL configuration. Whether or not the CRS is transmitted in the second flexible subframe indicated as the downlink subframe by the transmission direction UL-DL configuration may be controlled by the base station apparatus 3. In this case, the mobile station apparatus 1 may determine whether or not the CRS is transmitted in the GP and UpPTS fields of the second flexible subframe indicated as the downlink subframe by the transmission direction UL-DL configuration based on the CRS parameter.

FIG. 17 is a diagram showing the relationship between the first uplink reference UL-DL configuration, the first downlink reference UL-DL configuration and the transmission direction UL-DL configuration in the present embodiment.

For example, in FIG. 17, in a case where the first uplink reference UL-DL configuration is 0, the first downlink reference UL-DL configuration is 1 of the set {0, 1, 2, 3, 4, 5, 6}. For example, in FIG. 17, in a case where the first uplink reference UL-DL configuration is 1, the first downlink reference UL-DL configuration is 1 of the set {1, 2, 4, 5}.

For example, in FIG. 17, in a case where the first uplink reference UL-DL configuration is 0 and the first downlink reference UL-DL configuration is 1, the transmission direction UL-DL configuration is 1 of the set {0, 1, 6}.

The value of the first downlink reference UL-DL configuration may be the same as the value of the first uplink reference UL-DL configuration. However, since the mobile station apparatus 1 that does not receive the second information sets the same value as the first uplink reference UL-DL configuration as the first downlink reference UL-DL configuration, it is preferable that the value of the first downlink reference UL-DL configuration indicated by the second information is not the same as the value of the first uplink reference UL-DL configuration indicated by the first information.

In a case where the value of the first uplink reference UL-DL configuration and the value of the first downlink reference UL-DL configuration are the same, the transmission direction UL-DL configuration may not be defined. Alternatively, in a case where the value of the first uplink reference UL-DL configuration and the value of the first downlink reference UL-DL configuration are the same, the same value as that value of the first uplink reference UL-DL configuration and the value of the first downlink reference UL-DL configuration may be set as the transmission direction UL-DL configuration.

The third information may be information indicating the transmission direction UL-DL configuration of the configuration set (set of configurations) constituted by the first uplink reference UL-DL configuration and the first downlink reference UL-DL configuration.

Hereinafter, the first uplink reference UL-DL configuration and the second uplink reference UL-DL configuration will be described in detail.

The first uplink reference UL-DL configuration and the second uplink reference UL-DL configuration are used to specify (select or determine) the correspondence between a subframe n to which the PDCCH/EPDCCH/PHICH is allocated and a subframe n+k to which the PUSCH corresponding to the PDCCH/EPDCCH/PHICH is allocated.

In a case where one primary cell is configured, or in a case where one primary cell and one secondary cell are configured and the first uplink reference UL-DL configuration for the primary cell and the first uplink reference UL-DL configuration for the secondary cell are the same, the corresponding first uplink reference UL-DL configurations are used to determine the correspondence between the subframe to which the PDCCH/EPDCCH/PHICH is allocated and the subframe to which the PUSCH corresponding to the PDCCH/EPDCCH/PHICH is allocated in two serving cells.

In a case where one primary cell and one secondary cell are configured and the first uplink reference UL-DL configuration for the primary cell and the first uplink reference UL-DL configuration for the secondary cell are different, the corresponding second uplink reference UL-DL configurations are used to determine the correspondence between the subframe to which the PDCCH/EPDCCH/PHICH is allocated and the subframe to which the PUSCH corresponding to the PDCCH/EPDCCH/PHICH is allocated in two serving cells.

FIG. 18 is a diagram showing the correspondence between the subframe n to which the PDCCH/EPDCCH/PHICH is allocated and the subframe n+k to which the PUSCH corresponding to the PDCCH/EPDCCH/PHICH is allocated in the present embodiment. The mobile station apparatus 1 specifies (selects or determines) a value of k according to the table of FIG. 18.

In FIG. 18, in a case where one primary cell is configured, or in a case where one primary cell and one secondary cell are configured and the first uplink reference UL-DL configuration for the primary cell and the first uplink reference UL-DL configuration for the secondary cell, the uplink-downlink configuration refers to the first uplink reference UL-DL configuration.

In FIG. 18, in a case where one primary cell and one secondary cell are configured and the first uplink reference UL-DL configuration for the primary cell and the first uplink reference UL-DL configuration for the secondary cell are different, the uplink-downlink configuration refers to the second uplink reference UL-DL configuration.

Hereinafter, the first uplink reference UL-DL configuration and the second uplink reference UL-DL configuration are simply referred to as the uplink-downlink configuration in the description of FIG. 18.

In a case where the PDCCHs/EPDCCHs which correspond to the serving cells to which the uplink-downlink configurations 1 to 6 are set and accompany by the uplink grant addressed to the mobile station apparatus 1 are detected in the subframe n, the mobile station apparatus 1 performs the PUSCH transmission corresponding to the uplink grant in the subframe n+k specified (selected or determined) based on the table of FIG. 18.

In a case where the PHICHs which correspond to the serving cells to which the uplink-downlink configurations 1 to 6 are set and accompany by the NACK addressed to the mobile station apparatus 1 are detected in the subframe n, the mobile station apparatus 1 performs the PUSCH transmission in the subframe n+k specified (selected or determined) based on the table of FIG. 18.

A 2-bit uplink index (UL index) is included in the uplink grant which corresponds to the serving cell for which the uplink-downlink configuration 0 is configured and is addressed to the mobile station apparatus 1. The uplink index (UL index) is not included in the uplink grants which correspond to the serving cells for which the uplink-downlink configurations 1 to 6 are configured and are addressed to the mobile station apparatus 1.

In a case where a most significant bit (MSB) of the uplink index included in the uplink grant corresponding to the serving cell to which the uplink-downlink configuration 0 is set is set to be 1 in the subframe n, the mobile station apparatus 1 adjusts the PUSCH transmission corresponding to the uplink grant in the subframe n+k specified (selected or determined) based on the table of FIG. 18.

In a case where the PHICH accompanied by the NACK corresponding to the serving cell to which the uplink-downlink configuration 0 is set is received in a first resource set of the subframe n=0 or 5, the mobile station apparatus 1 adjusts the PUSCH transmission corresponding to the PHICH in the subframe n+k specified (selected or determined) based on the table of FIG. 18.

In a case where a least significant bit (LSB) of the uplink index included in the uplink grant corresponding to the serving cell to which the uplink-downlink configuration 0 is set is set to be 1 in the subframe n, the mobile station apparatus 1 adjusts the PUSCH transmission corresponding to the uplink grant in a subframe n+7.

In a case where the PHICH accompanied by the NACK corresponding to the serving cell to which the uplink-downlink configuration 0 is set is received in a second resource set of the subframe n=0 or 5, the mobile station apparatus 1 adjusts the PUSCH transmission corresponding to the uplink grant in the subframe n+7.

In a case where the PHICH accompanied by the NACK corresponding to the serving cell to which the uplink-downlink configuration 0 is set is received in the subframe n=1 or 6, the mobile station apparatus 1 adjusts the PUSCH transmission corresponding to the uplink grant in the subframe n+7.

For example, in a case where the PDCCH/EPDCCH/PHICH corresponding to the serving cell to which the uplink-downlink configuration 0 is set is detected in [SFN=m, subframe 1], the mobile station apparatus 1 adjusts the PUSCH transmission in a subframe [SFN=m, subframe 7] which is positioned after 6 subframes.

The first uplink reference UL-DL configuration and the second uplink reference UL-DL configuration are used to specify (select or determine) the correspondence between the subframe n to which the PHICH is allocated and the subframe n−k to which the PUSCH corresponding to the PHICH is allocated.

In a case where one primary cell is configured, or in a case where one primary cell and one secondary cell are configured and the first uplink reference UL-DL configuration for the primary cell and the first uplink reference UL-DL configuration for the secondary cell are the same, the corresponding first uplink reference UL-DL configurations are used to specify (select or determine) the correspondence between the subframe n to which the PHICH is allocated and the subframe n−k to which the PUSCH corresponding to the PHICH is allocated in two serving cell.

In a case where one primary cell and one secondary cell are configured and the first uplink reference UL-DL configuration for the primary cell and the first uplink reference UL-DL configuration for the secondary cell are different, the corresponding second uplink reference UL-DL configurations are used to specify (select or determine) the correspondence between the subframe n to which the PHICH is allocated and the subframe n−k to which the PUSCH corresponding to the PHICH is allocated in two serving cell.

FIG. 19 is a diagram showing the correspondence between the subframe n to which the PHICH is allocated and the subframe n−k to which the PUSCH corresponding to the PHICH is allocated in the present embodiment. The mobile station apparatus 1 specifies (selects or determines) a value of k according to the table of FIG. 19.

In FIG. 19, in a case where one primary cell is configured, or in a case where one primary cell and one secondary cell are configured and the first uplink reference UL-DL configuration for the primary cell and the first uplink reference UL-DL configuration for the secondary cell are the same, the uplink-downlink configuration refers to the first uplink reference UL-DL configuration.

In FIG. 19, in a case where one primary cell and one secondary cell are configured and the first uplink reference UL-DL configuration for the primary cell and the first uplink reference UL-DL configuration for the secondary cell are different, the uplink-downlink configuration refers to the second uplink reference UL-DL configuration.

Hereinafter, the first uplink reference UL-DL configuration and the second uplink reference UL-DL configuration are simply referred to as the uplink-downlink configuration in the description of FIG. 19.

The HARQ indicator (HARQ-ACK) received through the PHICH corresponding to the serving cell in the subframe n for the serving cells to which the uplink-downlink configurations 1 to 6 are set is associated with the transmission of the PUSCH in the subframe n−k specified based on the table of FIG. 19.

The HARQ indicator (HARQ-ACK) received through the PHICH corresponding to the serving cell in the first resource set of the subframe n=0 or 5 or the subframe n=1 or 6 for the serving cells to which the uplink-downlink configuration 0 is set is associated with the transmission of the PUSCH in the subframe n−k specified based on the table of FIG. 19.

The HARQ indicator (HARQ-ACK) received through the PHICH corresponding to the serving cell in the second resource set in the subframe n=0 or 5 for the serving cell to which the uplink-downlink configuration 0 is set is associated with the transmission of the PUSCH of the subframe n−6.

For example, the HARQ indicator (HARQ-ACK) received through the PHICH in [SFN=m, subframe 1] for the serving cell to which the uplink-downlink configuration 1 is set is associated with the PUSCH transmission in a subframe [SFN=m−1, subframe 7] which is positioned after 4 subframes.

The first uplink reference UL-DL configuration and the second uplink reference UL-DL configuration are used to specify (select or determine) the correspondence between the subframe n to which the PUSCH is allocated and the subframe n+k to which the PHICH corresponding to the PUSCH is allocated.

In a case where one primary cell is configured, or in a case where one primary cell and one secondary cell are configured and the first uplink reference UL-DL configuration for the primary cell and the first uplink reference UL-DL configuration for the secondary cell are the same, the corresponding first uplink reference UL-DL configurations are used to specify (select or determine) the correspondence between the subframe n to which the PUSCH is allocated and the subframe n+k to which the PHICH corresponding to the PUSCH is allocated in two serving cells.

In a case where one primary cell and one secondary cell are configured and the first uplink reference UL-DL configuration for the primary cell and the first uplink reference UL-DL configuration for the secondary cell are different, the corresponding second uplink reference UL-DL configurations are used to specify (select or determine) the correspondence between the subframe n to which the PUSCH is allocated and the subframe n+k to which the PHICH corresponding to the PUSCH is allocated in two serving cells.

FIG. 20 is a diagram showing the correspondence between the subframe n to which the PUSCH is allocated and the subframe n+k to which the PHICH corresponding to the PUSCH is allocated in the present embodiment. The mobile station apparatus 1 specifies (selects or determines) a value of k according to the table of FIG. 20.

In FIG. 20, in a case where one primary cell is configured, or in a case where one primary cell and one secondary cell are configured and the first uplink reference UL-DL configuration for the primary cell and the first uplink reference UL-DL configuration for the secondary cell are the same, the uplink-downlink configuration refers to the first uplink reference UL-DL configuration.

In FIG. 20, in a case where one primary cell and one secondary cell are configured and the first uplink reference UL-DL configuration for the primary cell and the first uplink reference UL-DL configuration for the secondary cell are different, the uplink-downlink configuration refers to the second uplink reference UL-DL configuration.

Hereinafter, the first uplink reference UL-DL configuration and the second uplink reference UL-DL configuration are simply referred to as the uplink-downlink configuration in the description of FIG. 20.

In a case where the PUSCH transmission is scheduled in the subframe n, the mobile station apparatus 1 determines that the PHICH resource in the subframe n+k specified from the table of FIG. 20.

For example, in a case where the PUSCH transmission is scheduled in [SFN=m, subframe n=2], the PHICH resource is determined for the serving cell to which the uplink-downlink configuration 0 is set in [SFN=m, subframe n=6].

Hereinafter, the first downlink reference UL-DL configuration and the second downlink reference UL-DL configuration will be described in detail.

The first downlink reference UL-DL configuration and the second downlink reference UL-DL configuration are used to specify (select or determine) the correspondence between the subframe n to which the PDSCH is allocated and the subframe n+k in which the HARQ-ACK corresponding to the PDSCH is transmitted.

In a case where one primary cell is configured, or in a case where one primary cell and one secondary cell are configured and the first downlink reference UL-DL configuration for the primary cell and the first downlink reference UL-DL configuration for the secondary cell are the same, the corresponding first downlink reference UL-DL configurations are used to specify (select or determine) the correspondence between the subframe n to which the PDSCH is allocated and the subframe n=k in which the HARQ-ACK corresponding to the PDSCH is transmitted in two serving cells.

In a case where one primary cell and one secondary cell are configured and the first downlink reference UL-DL configuration for the primary cell and the first downlink reference UL-DL configuration for the secondary cell are different, the corresponding second downlink reference UL-DL configurations are used to specify (select or determine) the correspondence between the subframe n to which the PDSCH is allocated and the subframe n+k in which the HARQ-ACK corresponding to the PDSCH is transmitted in two serving cells.

FIG. 21 is a diagram showing the correspondence between the subframe n−k to which the PDSCH is allocated and the subframe n in which the HARQ-ACK corresponding to the PDSCH is transmitted in the present embodiment. The mobile station apparatus 1 specifies (selects or determines) a value of k according to the table of FIG. 21.

In FIG. 21, in a case where one primary cell is configured, or in a case where one primary cell and one secondary cell are configured and the first downlink reference UL-DL configuration for the primary cell and the first downlink reference UL-DL configuration for the secondary cell are the same, the uplink-downlink configuration refers to the first downlink reference UL-DL configuration.

In FIG. 21, in a case where one primary cell and one secondary cell are configured and the first downlink reference UL-DL configuration for the primary cell and the first downlink reference UL-DL configuration for the secondary cell are different, the uplink-downlink configuration refers to the second downlink reference UL-DL configuration.

Hereinafter, the first downlink reference UL-DL configuration and the second downlink reference UL-DL configuration are simply referred to as the uplink-downlink configuration in the description of FIG. 21.

In a case where the PDSCH transmission which is addressed to the mobile station apparatus 1 and which is used to perform the transmission of the corresponding HARQ-ACK is detected in the subframe n−k (k is specified by the table of FIG. 21) of the serving cell, the mobile station apparatus 1 transmits the HARQ-ACK in the subframe n.

For example, the mobile station apparatus 1 does not reply the HARQ-ACK of the PDSCH transmission used to transmit the system information. For example, the mobile station apparatus 1 replies the HARQ-ACK of the PDSCH transmission scheduled by the DCI format accompanied by the CRC scrambled with the C-RNTI.

For example, the mobile station apparatus 1 transmits the HARQ-ACK of the PDSCH received in the subframe n=2, the subframe n−6 and/or the subframe n−7 of the serving cell to which the uplink-downlink configuration 1 is set.

The first downlink reference UL-DL configuration may not be defined for the serving cell which does not receive the second information. In this case, the mobile station apparatus 1 and the base station apparatus 3 may perform the process performed based on the above-described first downlink reference UL-DL configuration based on the first uplink reference UL-DL configuration (serving cell UL-DL configuration). The serving cell which does not receive the second information is a serving cell for which the dynamic TDD is not configured.

For example, in a case where one primary cell and one secondary cell are configured, the second information for the primary cell is not received, the second information for the secondary cell is received, the first uplink reference UL-DL configuration (serving cell UL-DL configuration) for the primary cell and the first downlink reference UL-DL configuration for the secondary cell are different, and the serving cell is the secondary cell, the second downlink reference UL-DL configuration for the serving cell (secondary cell) may be set based on the pair formed by the first uplink reference UL-DL configuration for another serving cell (primary cell) and the first downlink reference UL-DL configuration for the serving cell (secondary cell).

For example, in a case where one primary cell and one secondary cell are configured, the secondary information for the primary cell is not received, the second information for the secondary cell is received, the first uplink reference UL-DL configuration (serving cell UL-DL configuration) for the primary cell and the first downlink reference UL-DL configuration for the secondary cell are different, the corresponding second downlink reference UL-DL configurations may be used to specify (select or determine) the correspondence between the subframe n to which the PDSCH is allocated and the subframe n+k in which the HARQ-ACK corresponding to the PDSCH is transmitted in two serving cells.

For example, in a case where one primary cell and one secondary cell are configured, the second information for the primary cell is not received, the second information for the secondary cell is received, and the first uplink reference UL-DL configuration (serving cell UL-DL configuration) for the primary cell and the first downlink reference UL-DL configuration for the secondary cell are the same, the corresponding first uplink reference UL-DL configuration (serving cell UL-DL configuration) may be used to specify (select or determine) the correspondence between the subframe n to which the PDSCH is allocated and the subframe n+k in which the HARQ-ACK corresponding to the PDSCH is transmitted in the primary cell, and the corresponding first downlink reference UL-DL configuration may be used to specify (select or determine) the correspondence between the subframe n to which the PDSCH is allocated and the subframe n+k in which the HARQ-ACK corresponding to the PDSCH is transmitted in the secondary cell.

For example, in a case where one primary cell and one secondary cell are configured, the second information for the primary cell is not received, the second information for the secondary cell is received, and the first uplink reference UL-DL configuration (serving cell UL-DL configuration) for the primary cell and the first downlink reference UL-DL configuration for the secondary cell are different, the primary cell UL-DL configuration refers to the first uplink reference UL-DL configuration for the primary cell in FIGS. 12 and 14.

Hereinafter, the CSI will be described in detail.

The CSI includes a channel quality indicator (CQI), a rank indicator (RI), and a precoding matrix indicator (PMI). The CQI is expressed by a combination of a modulation scheme and a coding rate on a single transport block transmitted through the PDSCH. The coding rate is derived from the resource amount of the PDSCH and the transport block size.

FIG. 22 is a table showing a modulation scheme and a coding rate corresponding to the CQI index according to the present embodiment. The mobile station apparatus 1 derives the highest CQI index from 1 to 15 of the table of FIG. 22 which satisfies a condition in which a single PDSCH transport block which is transmitted through a group of downlink physical resource blocks called the CSI reference resource and is the combination of the modulation scheme and the transport block size corresponding to the CQI index may not be received with a transport block error probability that does not exceed 0.1. In a case where CQI index 1 does not satisfy the above-described condition, the mobile station apparatus 1 derives CQI index 0.

Figure 26:
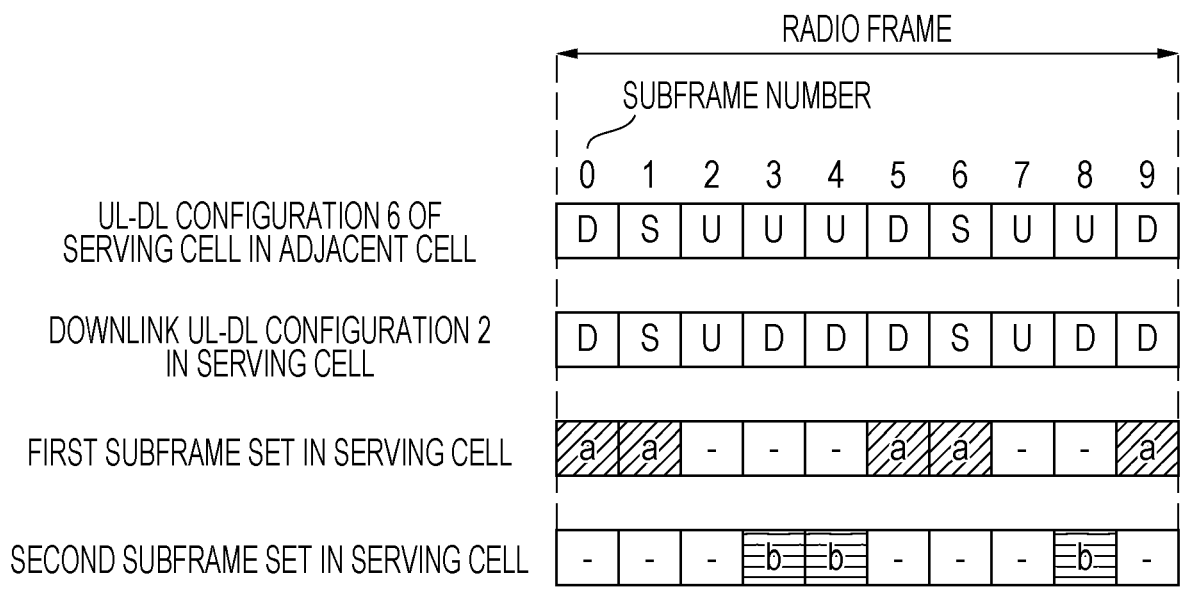
FIG. 26 is a diagram showing an example of a configuration of a subframe set according to the present embodiment.

FIG. 26 is a diagram showing an example of the configuration of the subframe set according to the present embodiment. In FIG. 26, D represents the downlink subframe, U represents the uplink subframe, S represents the special subframe, a represents a subframe belonging to a first subframe set, and b represents a subframe belonging to a second subframe set.

Here, in a case where the UL-DL configurations of the adjacent cell and the serving cell are different, an interference state is different for each subframe. Thus, in FIG. 26, at least two subframe sets are defined, and the mobile station apparatus 1 reports the channel state information of each of at least two subframe sets to the base station apparatus 3. For example, it is preferable that a plurality of subframe sets is configured based on the interference state of the subframe. It is preferable that the plurality of subframe sets is configured based on the parameter transmitted from the base station apparatus 3.

In FIG. 26, the downlink transmission may be performed in the subframes {0, 1, 3, 4, 5, 6, 8, 9} of the serving cell. In FIG. 26, the downlink transmission may be performed in the subframes {0, 1, 5, 6, 9} of the adjacent cell, and the uplink transmission may be performed in the subframes {3, 4, 8} of the adjacent cell. Accordingly, the serving cell, the interference state is different between the subframes {0, 1, 5, 6, 9} and the subframes {3, 4, 8}. Thus, in FIG. 26, the subframes {0, 1, 5, 6, 9} are configured as the first subframe set, and the subframes {3, 4, 8} are configured as the second subframe set.

Figure 27:
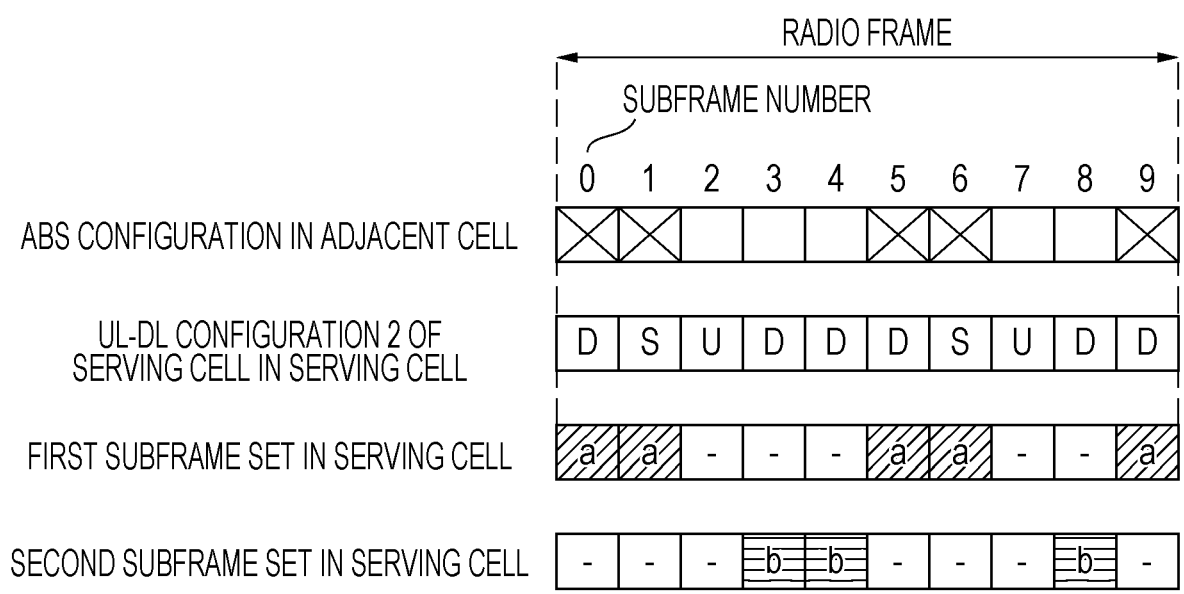
FIG. 27 is another diagram showing the example of the structure of the subframe set according to the present embodiment.

FIG. 27 is another diagram showing an example of the structure of the subframe set according to the present embodiment. In FIG. 27, D represents the downlink subframe, U represents the uplink subframe, S represents the special subframe, a represents the subframe belonging to the first subframe set, and b represents the subframe belonging to the second subframe set.

FIG. 27 shows an example of a method of configuring the plurality of subframe sets in a case where the amount of interference given to another cell by the adjacent cell is controlled (in a case where an eICIC technology is used), as an example for describing the present embodiment.

For example, in a case where an almost blank subframe (ABS) which is the subframe in which the transmission through the PDSCH which is addressed to the specific mobile station apparatus 1 is stopped is configured in the adjacent cell, that is, in a case where the interference amount given to another cell is controlled, the interference state is different for each subframe of the serving cell. Thus, in FIG. 27, at least two subframe sets are defined, and the mobile station apparatus 1 reports the channel state information for each of at least two subframe sets to the base station apparatus 3. For example, it is preferable that the plurality of subframe sets is configured based on the interference state of the subframe. It is preferable that the plurality of subframe sets is configured based on the parameter (MeasSubframe-Pattern-r10) transmitted from the base station apparatus 3.

In FIG. 27, the downlink transmission may be performed in the subframes {0, 1, 3, 4, 5, 6, 8, 9} of the serving cell. In the configuration of the ABS in the adjacent cell of FIG. 27, the hatched subframes {0, 1, 5, 6, 9} represent the subframes which are configured as the ABS, and the not-hatched subframes {3, 4, 8} represent the subframes which are not configured as the ABS. That is, in FIG. 27, the transmission through the PDSCH which is addressed to the specific mobile station apparatus 1 is not performed in the subframes {0, 1, 5, 6, 9}. Accordingly, the interference state is different between the subframes {0, 1, 5, 6, 9} and the subframes {3, 4, 8} in the serving cell. Thus, in FIG. 27, the subframes {0, 1, 5, 6, 9} are configured as the first subframe set, and the subframes {3, 4, 8} are configured as the second subframe set.

Figures 28, 29:
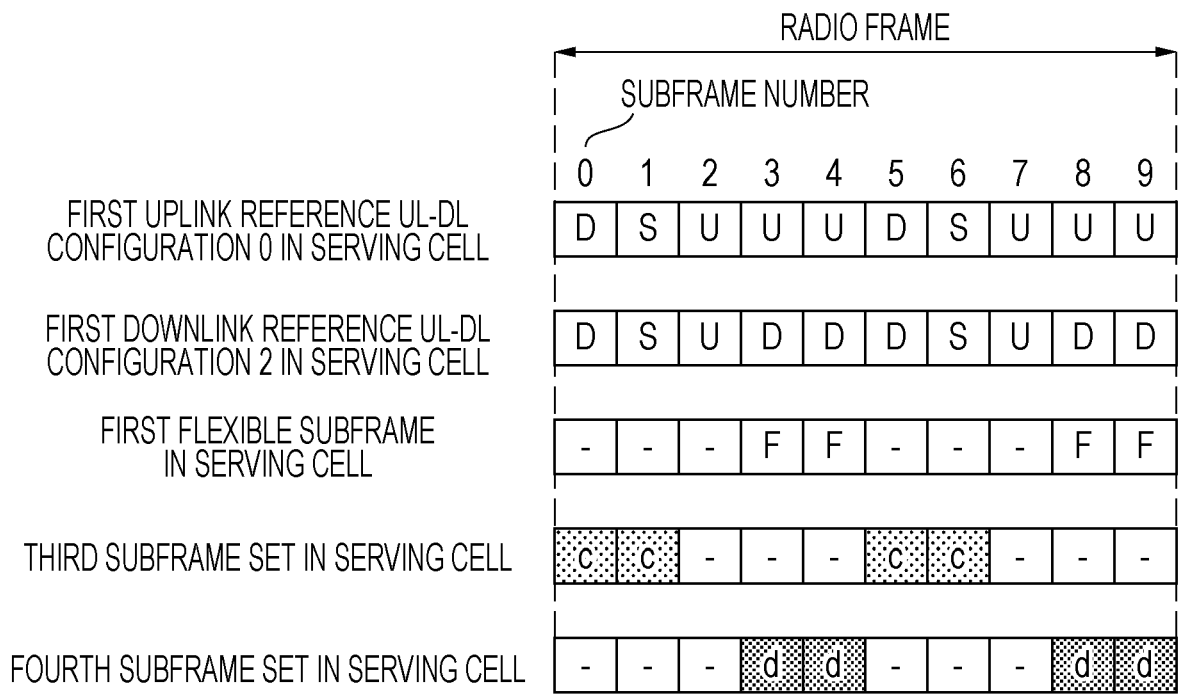
FIG. 28 is another diagram showing the example of the structure of the subframe set according to the present embodiment.
FIG. 29 is a diagram showing an example of a subframe set index according to the present embodiment.

FIG. 28 is another example showing an example of the structure of the subframe set according to the present embodiment. In FIG. 28, D represents the downlink subframe, U represents the uplink subframe, S represents the special subframe, F represents the first flexible subframe, c represents a subframe belonging to a third subframe set, and d represents a subframe belonging to a fourth subframe set.

FIG. 28 shows an example of a method of configuring the plurality of subframe sets in a case where traffic adaptation is performed (in a case where an eIMTA technology is used), as the example for describing the present embodiment. In a case where the traffic adaptation technology is used, the flexible subframe may be adaptively used for the uplink transmission and the downlink transmission.

In the present embodiment, it is preferable that the subframe which is indicated as the uplink subframe by the first uplink reference UL-DL configuration and is indicated as the downlink subframe by the first downlink reference UL-DL configuration is used the first flexible subframe. The first flexible subframe is the subframe reserved for the uplink and downlink transmission.

In the present embodiment, the subframe which is indicated as the special subframe by the first uplink reference UL-DL configuration and is indicated as the downlink subframe by the first downlink reference UL-DL configuration may be configured as the second flexible subframe. The second flexible subframe is the subframe reserved for the downlink transmission. The second flexible subframe is the subframe reserved for the downlink transmission in the DwPTS and the uplink transmission in the UpPTS.

Here, if the same subframes are configured as the first flexible subframe in the adjacent cell and the serving cell, an interference state is different between the first flexible subframe and a fixed downlink subframe. Here, it is preferable that the fixed downlink subframe is the subframe configured (indicated) as the downlink subframe by the first uplink reference UL-DL configuration and the first downlink reference UL-DL configuration.

In other words, the interference state is different depending on whether the subframe is the first flexible subframe or is not the first flexible subframe. Thus, in FIG. 28, at least two subframe sets are defined, and the mobile station apparatus 1 reports the channel state information for each of at least two subframe sets to the base station apparatus 3. For example, it is preferable that the plurality of subframe sets is configured based on the interference state of the subframe. It is preferable that the plurality of subframe sets is configured based on the parameter (MeasSubframePattern-r12) transmitted from the base station apparatus 3. It is preferable that the plurality of subframe sets is configured based on whether or not the subframe is the first flexible subframe.

In FIGS. 26, 27 and 28 described above, in a case where the plurality of subframe sets is configured, it is preferable that one subframe does not belong to the plurality of subframe sets. That is, it is preferable that one subframe belongs to at least one subframe set of the plurality of subframe sets.

In FIG. 28, the subframes {3, 4, 8, 9} of the serving cell may be the first flexible subframe, and the uplink transmission and the downlink transmission may be adaptively performed in these subframes. Although not shown in FIG. 28, similarly to the adjacent cell, if the subframes {3, 4, 8, 9} are the first flexible subframes, the uplink transmission and the downlink transmission may be adaptively performed in the subframes {3, 4, 8, 9} of the adjacent cell. Accordingly, the interference state is different between the subframes {0, 1, 5, 6} and the subframes {3, 4, 8, 9} in the serving cell. Thus, in FIG. 28, the subframes {0, 1, 5, 6} are configured as the third subframe set, and the subframes {3, 4, 8, 9} are configured as the fourth subframe set.

That is, the first subframe set and the second subframe set are configured based on the parameter (MeasSubframePattern-r10) transmitted from the base station apparatus 3. The third subframe set and the fourth subframe set are configured based on the parameter (MeasSubframePattern-r12) transmitted from the base station apparatus 3. Here, the first subframe set, the second subframe set, the third subframe set, and the fourth subframe set may be respectively identified by the subframe set indexes (subframe set identifiers (subframe set identities)).

Here, the parameter (MeasSubframePattern-r10) is also described as a first parameter. The parameter (MeasSubframePattern-r12) is also described as a second parameter.

For the sake of convenience in the description, the first subframe set and the second subframe set are referred to as the subframe set or an enhanced inter-cell interference coordination (eICIC) subframe set for controlling inter-cell control, and the third subframe set and the fourth subframe set are referred to as the subframe set or an enhanced interference mitigation and traffic adaptation (eIMTA) subframe set for performing the traffic adaptation. As described above, for example, the eICIC subframe set may be the subframe set configured for the eICIC. The eIMTA subframe set may be the subframe set configured for the eIMTA.

Here, the eICIC subframe sets (the first subframe set and the second subframe set) and the eIMTA subframe sets (the third subframe set and the fourth subframe set) may be identified based on the consistent subframe set index.

FIG. 29 is a diagram showing an example of the subframe set index. For example, as shown in FIG. 29, the subframe set index of the first subframe set may be configured as "0", the subframe set index of the second subframe set may be configured as "1", the subframe set index of the third subframe set may be configured as "2", and the subframe set index of the fourth subframe set may be configured as "3". The subframe set index of the first subframe set may be configured as "1", the subframe set index of the second subframe set may be configured as "2", the subframe set index of the third subframe set may be configured as "3", and the subframe set index of the fourth subframe set may be configured as "4".

The eICIC subframe sets (the first subframe set and the second subframe set) and the eIMTA subframe sets (the third subframe set and the fourth subframe set) may be identified based on the individual subframe set indexes.

FIG. 30 is a diagram showing an example of the subframe set index. For example, as shown in FIG. 30, the subframe set index of the first subframe set may be configured as "0", the subframe set index of the second subframe set may be configured as "1", the subframe set index of the third subframe set may be configured as "0", and the subframe set index of the fourth subframe set may be configured as "1". The subframe set index of the first subframe set may be configured as "1", the subframe set index of the second subframe set may be configured as "2", the subframe set index of the third subframe set may be configured as "1", and the subframe set index of the fourth subframe set may be configured as "2".

The eICIC subframe set and/or the eIMTA subframe set may be configured based on whether or not the subframe includes the reference signal such as the cell-specific reference signal (CRS).

The eICIC subframe set and/or the eIMTA subframe set may be constituted based on whether or not the subframe is the MBSFN subframe.

The eICIC subframe set and/or the eIMTA subframe set may indicate the subframes having different interference states. That is, the structures of the eICIC subframe set and/or the eIMTA subframe set according to the present embodiment are not limited to any one of the above-described structures.

The number of eICIC subframe sets and/or the number of eIMTA subframe sets are not limited to four subframe sets including the first subframe set to the fourth subframe set.

There may be subframes which do not belong to any one subframe set of the eICIC subframe set and/or the eIMTA subframe set. For example, the special subframe may not belong to any one subframe set of the eICIC subframe set and/or the eIMTA subframe set.

Here, the mobile station apparatus 1 may transmit information (eIMTA capable information: information indicating that the mobile station apparatus has a function (capability) related to the eIMTA) related to the supporting of an eIMTA function to the base station apparatus 3. The mobile station apparatus 1 may transmit information (eICIC capable information: information indicating that the mobile station apparatus has a function (capability) related to the eICIC) related to the supporting of an eICIC function to the base station apparatus 3. The information (eIMTA capable information: information indicating that the mobile station apparatus has a function (capability) related to the eIMTA) related to the supporting of the eIMTA function and/or the information (eICIC capable information: information indicating that the mobile station apparatus has a function (capability) related to the eICIC) related to the supporting of the eICIC function may be transmitted as capable parameters or feature group indicators (FGIs). For example, the information related to the supporting of the eIMTA function and/or the information related to the supporting of the eICIC function may be transmitted by being included in the signal (for example, RRC message) of the higher layer, as the capable parameters or FGIs.

The signal (UE-EUTRA-Capability-v1020-IEs) of the higher layer including the information related to the supporting of the eICIC function may be referred to as information indicating that the eICIC function is supported. The signal (UE-EUTRA-Capability-v1020-IEs) of the higher layer which does not include the information related to the supporting of the eICIC function may be referred to as information indicating that the eICIC function is not supported. The signal (UE-EUTRA-Capability-v1020-IEs) of the higher layer may be referred to as information indicating whether or not the eICIC function is supported.

The signal (UE-EUTRA-Capability-v12xx-IEs) of the higher layer including the information related to the supporting of the eIMTA function may be referred to as information indicating that the eIMTA function is supported. The signal (UE-EUTRA-Capability-v12xx-IEs) of the higher layer which does not include the information related to the supporting of the eIMTA function may be referred to as information indicating that the eIMTA function is not supported. The signal (UE-EUTRA-Capability-v12xx-IEs) of the higher layer may be referred to as information indicating whether or not the eIMTA function is supported.

Here, for example, the capable parameters may be a parameter indicating whether or not an option function is given and is normally installed. The capable parameters may be a parameter indicating whether or not an essential function accompanied by this parameter is normally tested. The FGI may be a specific index in a case where all functions for a function group described in a prescribed table are given and are normally tested.

For example, the information related to the supporting of the eIMTA function may be transmitted as the capable parameters. The information related to the supporting of the eICIC function may be transmitted as the FGI.

For example, the information related to the supporting of the eIMTA function may be transmitted as the FGI. The information related to the supporting of the eICIC function may be transmitted as the capable parameters.

The base station apparatus 3 may transmit information indicating the subframe set and/or information indicating the subframe set index to the mobile station apparatus 1, and the mobile station apparatus 1 may configure the subframe set based on the information.

For example, the base station apparatus 3 may indicate two eICIC subframe sets corresponding to two subframe set indexes by transmitting the parameter (MeasSubframePattern-r10) by using the signal of the higher layer. The base station apparatus 3 may indicate two eIMTA subframe sets corresponding to two subframe set indexes by transmitting the parameter (MeasSubframePattern-r12) by using the signal of the higher layer. That is, the subframe set index and the subframe set may be configured by the higher layer.

For example, the base station apparatus 3 may indicate two eICIC subframe sets corresponding to two subframe set indexes or two eIMTA subframe sets corresponding to two subframe set indexes by transmitting the parameter (MeasSubframePattern-r10) by using the signal of the higher layer based on the information related to the supporting of the eIMTA function and/or the information related to the supporting of the eICIC function. That is, the base station apparatus may indicate two eICIC subframe sets corresponding to two subframe set indexes by transmitting the parameter (MeasSubframePattern-r10) to the mobile station apparatus (mobile station apparatus that does not have the function (capability) related to the eIMTA) that does not support the eIMTA function by using the signal of the higher layer. The base station apparatus may indicate two eIMTA subframe sets corresponding to two subframe set indexes by transmitting the parameter (MeasSubframePattern-r10) to the mobile station apparatus (mobile station apparatus having the function (capability) related to the eIMTA) that supports the eIMTA function by using the signal of the higher layer.

For example, the base station apparatus 3 may indicate two eICIC subframe sets corresponding to two subframe set indexes and two eIMTA subframe sets corresponding to two subframe set indexes by transmitting two parameters (MeasSubframePattern-r10) by using the signal of the higher layer.

For example, the base station apparatus 3 may indicate two eICIC subframe sets corresponding to two subframe set indexes by transmitting an RRC information element message including at least a parameter indicating two eICIC subframe sets corresponding to two subframe set indexes.

For example, the base station apparatus 3 may indicate two eIMTA subframe sets corresponding to two subframe set indexes by transmitting an RRC information element message including at least a parameter indicating two eIMTA subframe sets corresponding to two subframe set indexes.

That is, the base station apparatus 3 may indicate two eICIC subframe sets corresponding to two subframe set indexes and two eIMTA subframe sets corresponding to two subframe set indexes by transmitting the RRC information element message including at least the parameter indicating two eICIC subframe sets corresponding to two subframe set indexes and the parameter indicating two eIMTA subframe sets corresponding to two subframe set indexes.

The parameter (MeasSubframePattern-r10) may be configured using a bitmap having the number of bits different between the FDD system and the TDD system. This parameter may be configured using a bitmap having the number of bits different depending on the UL-DL configuration in the TDD system. For example, this parameter may be configured using a bitmap having 40 bits in the case of the FDD system, may be configured using a bitmap having 20 bits in a case where the UL-DL configuration is 1 to 5 in the TDD system, may be configured using a bit having 70 bits in a case where the UL-DL configuration is 0 in the TDD system, or may be configured using a bitmap having 60 bits in a case where the UL-DL configuration is 6 in the TDD system.

The parameter (MeasSubframePattern-r12) may be configured using the same bitmap as that of the parameter (MeasSubframePattern-r10), or may be configured using different bitmaps. For example, this parameter may be configured using a bitmap having bits common to all the UL-DL configurations in the TDD system. The parameter (MeasSubframePattern-r12) may be configured using only two bitmaps including a bitmap in the FDD and a bitmap in the TDD.

It is preferable that the information indicating the subframe set is information represented by a bit array (bitmap). In a case where the information indicating the subframe set indicates the eICIC subframe set, it is preferable that the bit indicating the subframe that may be used for the downlink transmission by the base station apparatus 3 is set to be "1". In a case where the information indicating the subframe set indicates the eIMTA subframe set, it is preferable that the bit indicating the subframe used as the fixed downlink subframe by the base station apparatus 3 is set to be "1" and/or the bit indicating the subframe used as the flexible subframe is set to be "1".

When the eICIC subframe sets (the first subframe set and the second subframe set) are configured, the first subframe set may be explicitly configured, and the second subframe set may be implicitly configured based on the first subframe set.

When the eIMTA subframe sets (the third subframe set and the fourth subframe set) are configured, the third subframe set may be explicitly configured, and the fourth subframe set may be implicitly configured based on the third subframe set.

In a case where the parameter (MeasSubframePattern-r12) is configured for the mobile station apparatus 1, the base station apparatus 3 may not configure the parameter (MeasSubframePattern-r10). The parameter (MeasSubframePattern-r10) and the parameter (MeasSubframePattern-r12) may be configured for each serving cell. That is, in a case where the parameter (MeasSubframePattern-r12) is configured for a certain serving cell, the parameter (MeasSubframePattern-r10) may not be configured. In a case where the parameter (MeasSubframePattern-r10) is configured for a certain serving cell, the parameter (MeasSubframePattern-r12) may not be configured. That is, the parameter (MeasSubframePattern-r12) and the parameter (MeasSubframePattern-r10) are not simultaneously configured for a certain serving cell.

For example, the base station apparatus 3 may configure the parameter (MeasSubframePattern-r12) for the mobile station apparatus 1 for which Transmission Modes 1 to 9 are configured (in a case where Transmission Modes 1 to 9 are configured). The base station apparatus 3 may configure the parameter (MeasSubframePattern-r12) for the mobile station apparatus 1 for which Transmission Mode 10 is configured (in a case where Transmission Mode 10 is configured).

In a case where the parameter (MeasSubframePattern-r12) is configured by the base station apparatus 3, the mobile station apparatus 1 may not clear/release the parameter (MeasSubframePattern-r10). Here, in a case where the parameter (MeasSubframePattern-r12) is configured by the base station apparatus 3, the mobile station apparatus 1 for which Transmission Modes 1 to 9 are configured may clear/release the parameter (MeasSubframePattern-r10). In a case where the parameter (MeasSubframePattern-r12) is configured by the base station apparatus 3, the mobile station apparatus 1 for which Transmission Mode 10 is configured may clear/release the parameter (MeasSubframePattern-r10).

The subframe set may be implicitly constituted based on the first flexible subframe. For example, the first subframe set may be constituted based on the first flexible subframe. The second subframe set may be constituted based on the subframe indicated as the downlink subframe or the special subframe by the first uplink reference UL-DL configuration.

A plurality of CSI processes may be configured for the mobile station apparatus 1. At least two subframe sets may be configured for a single CSI process. At least two CSI processes may be configured for the mobile station apparatus 1, and one subframe set may be configured for each of at least two CSI processes.

The mobile station apparatus 1 may derive the plurality of CSI processes and/or the CSI for each of the plurality of subframe sets, and may report the CSI.

The special subframe including the DwPTS of which a length is equal to or less than $7680/(15000\times2048)$ seconds may not belong to any one subframe set.

Here, the reporting of the CSI is periodic or aperiodic. The CSI which is periodically reported is referred to as periodic CSI. The CSI which is aperiodically reported is referred to as aperiodic CSI.

A resource that may be used to report the CSI by the mobile station apparatus 1 is controlled by the base station apparatus 3.

For example, the mobile station apparatus 1 is semi-statically by the higher layer (RRC layer) such that the CSI is periodically fed back through the PUCCH. That is, the mobile station apparatus 1 configures the subframe in which the periodic CSI is reported by the higher layer (RRC layer).

The mobile station apparatus 1 may be configured so as to report the periodic CSI for each CSI process and/or each subframe set. That is, the reporting of the periodic CSI is triggered based on the configuration of the higher layer related to the reporting of the periodic CSI.

The periodic CSI is accompanied by a PUCCH reporting type.

The PUCCH reporting type is different depending on whether or not the CSI to be reported supports any one of the channel quality indicator (CQI), the rank indicator (RI) and the precoding matrix indicator (PMI).

That is, each PUCCH reporting type supports the reporting of different combinations of the CQI, the RI and the PMI. For example, the PUCCH reporting type may include a PUCCH reporting type that supports the reporting of at least the RI. The PUCCH reporting type may include a PUCCH reporting type that supports the reporting of at least a wideband CQI. The PUCCH reporting type may include a PUCCH reporting type that supports the reporting of at least a subband CQI.

The PUCCH reporting type may be constituted based on the number of antenna ports used for the downlink transmission by the base station apparatus 3.

The PUCCH reporting type may a PUCCH reporting type previously determined by the specifications of LTE.

The aperiodic CSI is transmitted through the PUSCH. The mobile station apparatus 1 detects the uplink grant in the subframe n of the serving cell c, and performs the reporting of the aperiodic CSI by using the PUSCH scheduled by the uplink grant in the subframe n+k of the serving cell c in a case where a CSI request field included in the uplink grant is set so as to trigger the reporting of the CSI. That is, the reporting of the aperiodic CSI is triggered based on the detection of the information (DCI format) including the CSI request field set so as to trigger the reporting of the CSI.

The information (CSI request) indicating whether or not the mobile station apparatus 1 is instructed such that the aperiodic CSI is reported is mapped to the CSI request field. The information may indicate the CSI process and/or the subframe set, and the mobile station apparatus 1 may report the CSI process indicated by the information and/or the aperiodic CSI for each subframe set.

The mobile station apparatus 1 derives the wideband CQI and the subband CQI. In the frequency domain, the wideband CQI corresponds to all the downlink physical resource blocks, and the subband CQI corresponds to a part of the downlink physical resource blocks.

Hereinafter, the CSI reference resource will be described.

In the frequency domain, the CSI reference resource is defined by a group of downlink physical resource blocks corresponding to a band associated with a value of the derived CQI.

In the time domain, the CSI reference resource is defined by one subframe. In a case where the CSI is reported in the subframe n, the CSI reference resource is defined by a subframe $n\text{-}n_{CQIref}$.

In the reporting of the periodic CSI, the $n_{CQIref}$ may be the smallest value which is greater than or equal to 4 such that the subframe $n_{CQIref}$ corresponds to an effective subframe.

In the reporting of the aperiodic CSI, the $n_{CQIref}$ may be the smallest value which is greater than or equal to 4 such as the subframe $n_{CQIref}$ corresponds to an effective subframe and the subframe $n_{CQIref}$ is positioned after the effective subframe n–k in which the CSI request is received.

In the reporting of the aperiodic CSI, the $n_{CQIref}$ may be 4 such that the subframe $n_{CQIref}$ corresponds to an effective subframe and the subframe $n_{CQIref}$ is positioned after the effective subframe n–k in which the CSI request is received.

The mobile station apparatus 1 regards that the subframe which satisfies at least the following conditions is effective. The UL-DL configuration indicated by the first information is referred to as the UL-DL configuration of the serving cell.

- Condition (X1): the effective subframe is indicated as the downlink subframe by the UL-DL configuration of the serving cell for a period (radio frame) during which the transmission direction UL-DL configuration is not set in the reporting of the periodic CSI
- Condition (X2): the effective subframe is indicated as the downlink subframe by the transmission direction UL-DL configuration for a period (radio frame) during which the transmission direction UL-DL configuration is set in the reporting of the periodic CSI
- Condition (X3): the effective subframe is indicated as the downlink subframe by the downlink reference UL-DL configuration in the reporting of the aperiodic CSI
- Condition (X4): the effective subframe is not the MBSFN subframe except for Transmission Mode 9 and Transmission Mode 10
- Condition (X5): the effective subframe does not include the DwPTS field of which a length is equal to or less than 7680/(15000×2048) seconds
- Condition (X6): the effective subframe does not include the measurement gap configured for the mobile station apparatus 1
- Condition (X7): the effective subframe is an element of the subframe set corresponding to the CSI report in a case where the mobile station apparatus 1 configures the subframe set The downlink subframe of the condition (X1), the condition (X2) and the condition (X3) includes the special subframe.

In a case where the plurality of cells having different UL-DL configurations is aggregated and the mobile station apparatus 1 does not have the simultaneous transmission and reception capability in the aggregated cells, the downlink subframe of the condition (X1), the condition (X2) and the condition (X3) includes the downlink subframe of the primary cell and the special subframe including the DwPTS field of which a length is greater than 7680/(15000×2048) seconds.

Each CSI reference resource for a certain serving cell belongs to any one subframe set, and does not belong to the plurality of subframe sets.

FIG. 24 is a diagram showing an example of the CSI reference resource corresponding to the reporting of the periodic CSI according to the present embodiment.

FIG. 25 is a diagram showing an example of the CSI reference resource corresponding to the reporting of the aperiodic CSI according to the present embodiment.

In FIGS. 24 and 25, squares expressed by a represent the subframes belonging to the first subframe set, and squares expressed by b represent the subframes belonging to the second subframe set. In FIGS. 24 and 25, the uplink reference UL-DL configuration 0 and the downlink reference UL-DL configuration 5 are set. In FIG. 24, the effective transmission direction UL-DL configuration 1 is detected (set) for the radio frame 0, and the effective transmission direction UL-DL configuration is not detected (set) for the radio frame 1.

In FIG. 24, squares expressed by P represent the subframes in which the reporting of the periodic CSI corresponding to the second subframe set is performed, and squares expressed by R are the CSI reference resources corresponding to the reporting of the periodic CSI.

In FIG. 24, the subframe which is positioned before four or more subframes from the subframe in which the periodic CSI is reported, belongs to the second subframe set, and satisfies the condition (X1) or the condition (X2) is the subframe 4 within the radio frame 0. That is, in FIG. 24, the subframe 4 within the radio frame 0 is the CSI reference resource.

In FIG. 25, squares expressed by G represent the subframes in which the uplink grant including the CSI request set such that the reporting of the channel state information corresponding to the second subframe set is triggered is detected, squares expressed by A represent the subframes in which the reporting of the periodic CSI corresponding to the second subframe set is performed, and squares expressed by R represent the CSI reference resources corresponding to the reporting of the aperiodic CSI.

In FIG. 25, the subframe which is positioned before four or more subframes from the subframe in which the aperiodic CSI is reported, is the subframe in which the uplink grant including the CSI request set such that the reporting of the channel state information is triggered is detected or is positioned after this subframe, is the subframe belongs to the second subframe set, and satisfies the condition (X3) is the subframe 8 within the radio frame 0. That is, in FIG. 25, the subframe 8 within the radio frame 0 is the CSI reference resource.

In the reporting of the aperiodic CSI, the condition (X1) and the condition (X2) may be applied instead of the condition (X3).

In a case where there is no effective subframe for the CSI reference resource, the mobile station apparatus 1 may omit the CSI reporting.

In a case where there is not effective subframe for the CSI reference resource, the mobile station apparatus 1 to which the downlink reference UL-DL configuration is set may report the channel state information indicating the CQI index (for example, CQI index 0) previously determined by the specifications of LTE.

In a case where the CSI reference resource is indicated as the downlink subframe by the downlink reference UL-DL configuration but is indicated as the uplink subframe by the uplink reference UL-DL configuration and the transmission direction UL-DL configuration, the mobile station apparatus 1 may report the channel state information indicating the CQI index (for example, CQI index 0) previously determined by the specifications of LTE. That is, in this case, the mobile station apparatus 1 may not measure the CSI.

In a case where the CSI reference resource is indicated as the uplink subframe by the uplink reference UL-DL configuration, is indicated as the downlink subframe by the downlink reference UL-DL configuration, and the effective transmission direction UL-DL configuration is not set, the mobile station apparatus 1 may report the channel state information indicating the CQI index (for example, CQI index 0) previously determined by the specifications of LTE. That is, in this case, the mobile station apparatus 1 may not measure the CSI.

In the reporting of the aperiodic CSI, in a case where the CSI reference resource is a subframe positioned before the subframe in which the DCI format including the corresponding CSI request field is received, the mobile station apparatus 1 may report the channel state information indicating the CQI index (for example, CQI index 0) previously determined by the specifications of LTE. That is, in this case, the mobile station apparatus 1 may not measure the CSI.

In order to derive the CQI associated with the CSI reference resource, the mobile station apparatus 1 in Transmission Modes 1 to 8 performs the channel measurement based on the CRS.

In order to derive the CQI associated with the CSI reference resource, the mobile station apparatus 1 in Transmission Modes 9 and 10 performs the channel measurement by using the NZP CSI-RS resource corresponding to the CSI process. The NZP CSI-RS resource may be configured for each CSI process.

In order to derive the CQI associated with the CSI reference resource, the mobile station apparatus 1 in Transmission Mode 10 performs the interference measurement by using the CSI-IM resource corresponding to the CSI process. In order to derive the CQI associated with the CSI reference resource, in a case where at least two subframe sets are configured for a single CSI process, the mobile station apparatus 1 in Transmission Mode 10 performs the interference measurement by using the CSI-IM resource within the subframe set to which the CSI reference resource belongs.

In LTE, the transmission mode is controlled by the base station apparatus 3.

In order to derive the CQI index, the mobile station apparatus 1 assumes at least the following items in the CSI reference resource.

The mobile station apparatus 1 assumes that the number of resource elements corresponding to the CRS is the same as that within the non-MB SFN subframe.

The mobile station apparatus 1 assumes that the number of OFDM symbols occupied by the control signal including the PDCCH is 3.

The mobile station apparatus 1 assumes a ratio between the PDSCH EPRE and the NZP CSI-RS EPRE given by $P_c$ corresponding to the subframe set and/or the CSI process in a case where the NZP CSI-RS is used for the channel measurement. The ratio between the PDSCH EPRE and the CRS EPRE is given by $P_A$.

The mobile station apparatus 1 assumes a ratio between the PDSCH EPRE and the CRS EPRE given by $P_A$ corresponding to the subframe set and $\Delta_{offset}$ common to the subframe sets in a case where the CRS is used for the channel measurement.

The resource element is not used by the synchronization signal, the PBCH, or the EPDCCH.

The CP length of the non-MB SFN subframe

Redundancy version 0

There are no resource elements assigned to the NZP CSI-RS and the ZP CSI-RS.

There is no resource element assigned to the PRS

The PDSCH transmission method corresponding to the transmission mode currently configured for the mobile station apparatus 1

Here, in a case where the mobile station apparatus 1 reports the CSI to each of the plurality of CSI processes and/or the plurality of subframe sets which are configured (constituted) as above, the plurality of periodic CSI reports collides. Hereinafter, a process in a case where the plurality of periodic CSI reports simultaneously occurs will be described. That is, a process in a case where the plurality of periodic CSI reports occurs in the same subframe will be described. Here, the following process may be applied to the mobile station apparatus 1 for which Transmission Modes 1 to 9 are configured.

In a case where a plurality of periodic CSI reports simultaneously occurs in a prescribed subframe in which the periodic CSI can be transmitted (in a case where the plurality of periodic CSI reports collides), one periodic CSI report of the periodic CSI reports is transmitted based on the priority of the cell index, and/or the priority of the subframe set index, and/or the priority of the PUCCH reporting type. That is, all the periodic CSI reports having a low priority are dropped, and only one periodic CSI report having a high priority is transmitted.

Figure 31:
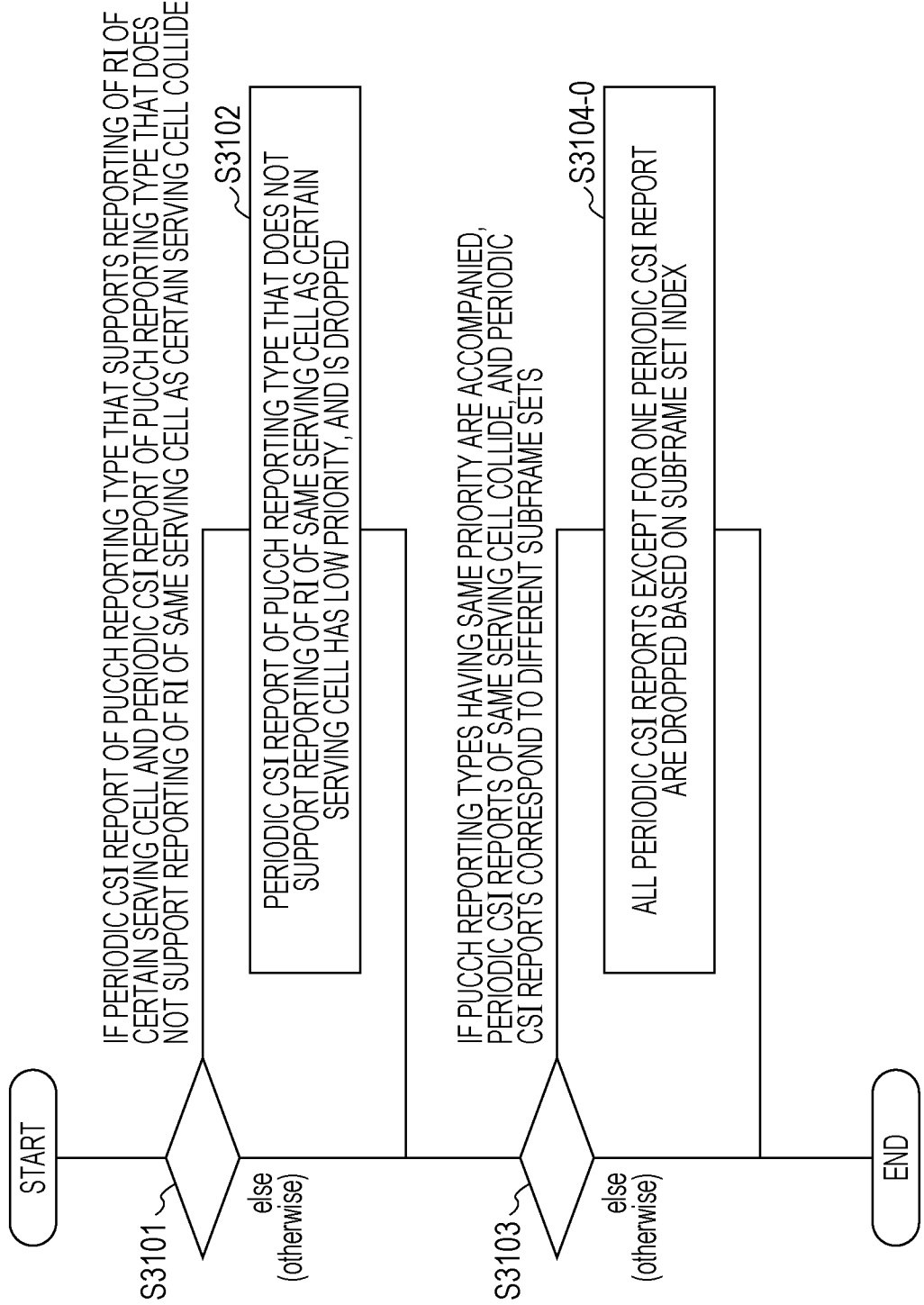
FIG. 31 is a diagram showing an example of a flow of determining the priority of a periodic CSI report in a case where one serving cell is configured for the mobile station apparatus 1 according to the present embodiment.

FIG. 31 is a diagram showing an example of a flow of determining the priority of the periodic CSI report in a case where one serving cell is configured for the mobile station apparatus 1. The mobile station apparatus 1 performs the flow of determining the priority of FIG. 31 on the configured serving cell.

If the periodic CSI report of the PUCCH reporting type that supports the reporting of the RI of a certain serving cell and the periodic CSI report of the PUCCH reporting type that does not support the reporting of the RI of the same serving cell as the certain serving cell (S3101) collide, the mobile station apparatus 1 drops the latter periodic CSI report (S3102). That is, the periodic CSI report of the PUCCH reporting type that does not support the reporting of the RI of the same serving cell as the certain serving cell has a low priority, and is dropped.

If the PUCCH reporting types having the same priority are accompanied, the periodic CSI reports of the serving cell collide, and the periodic CSI reports correspond to different subframe sets (S3103), the mobile station apparatus 1 drops all the periodic CSI reports except for one periodic CSI report based on the subframe set index (S3104-0). That is, the periodic CSI report having a large subframe set index has a low priority. That is, the periodic CSI report having the smallest subframe set index has a high priority. That is, all periodic CSI reports except for the periodic CSI report having the smallest subframe set index are dropped.

Here, S3104-0 may be replaced with any one of the following S3104-1 to S3104-3. At least two or more of S3104-0 to S3104-3 may be simultaneously performed. In a case where at least two or more of S3104-0 to S3104-3 are simultaneously performed, the process may be performed in any order.

S3104-1 will be described. S3104-1 is an example of the process in a case where the periodic CSI reports corresponding to the subframe sets accompanied by the subframe set indexes of different eICIC subframe sets collide. If the periodic CSI reports corresponding to the subframe sets accompanied by the subframe set indexes of different eICIC subframe sets collide, all the periodic CSI reports corresponding to the subframe sets accompanied by the subframe set indexes which are greater than 0 are dropped. That is, the periodic CSI report corresponding to the subframe set accompanied by the large subframe set index has a low priority. That is, the periodic CSI report corresponding to the subframe set accompanied by the smallest subframe set index has a high priority. That is, all the periodic CSI reports except for the periodic CSI report corresponding to the subframe set accompanied by the smallest subframe set index are dropped.

The periodic CSI report may be controlled by the base station apparatus 3 such that the periodic CSI reports corresponding to the subframe sets accompanied by the subframe set indexes of different eICIC subframe sets do not collide. That is, S3104-1 may not be applied. That is, a dropping rule may not be applied to the periodic CSI reports corresponding to the subframe sets accompanied by the subframe set indexes of different eICIC subframe sets.

S3104-2 will be described. S3104-2 is an example of a process in a case where the periodic CSI reports corresponding to the subframe sets accompanied by the subframe set indexes of different eIMTA subframe sets collide. If the periodic CSI reports corresponding to the subframe sets accompanied by the subframe set indexes of different eIMTA subframe sets collide, all the periodic CSI reports corresponding to the subframe sets accompanied by the subframe set indexes which are greater than 0 are dropped. That is, the periodic CSI report corresponding to the subframe set accompanied by the large subframe set index has a low priority. That is, the periodic CSI report corresponding to the subframe set accompanied by the smallest subframe set index has a high priority. That is, all the periodic CSI reports except for the periodic CSI report corresponding to the subframe set accompanied by the smallest subframe set index are dropped.

S3104-3 will be described. S3104-3 is an example of a process in a case where the periodic CSI report corresponding to the subframe set accompanied by the subframe set index of the eICIC subframe set and the periodic CSI report corresponding to the subframe set accompanied by the subframe set index of the eIMTA subframe set collide. It is preferable that if the periodic CSI report corresponding to the subframe set accompanied by the subframe set index of the eICIC subframe set and the periodic CSI report corresponding to the subframe set accompanied by the subframe set index of the eIMTA subframe set collide, any one of S3104-3-1 and S3104-3-2 is applied. That is, a case where S3104-3 is applied is the same as a case where S3104-3-1 is applied or a case where S3104-3-2 is applied.

S3104-3-1 will be described. If the periodic CSI report corresponding to the subframe set accompanied by the subframe set index of the eICIC subframe set and the periodic CSI report corresponding to the subframe set accompanied by the subframe set index of the eIMTA subframe set collide, all the periodic CSI reports corresponding to the subframe set accompanied by the subframe set index of the eIMTA subframe set are dropped. That is, the periodic CSI report corresponding to the subframe set accompanied by the subframe set index of the eIMTA subframe set has a low priority. That is, the periodic CSI report corresponding to the subframe set accompanied by the subframe set index of the eICIC subframe set has a high priority. That is, all the periodic CSI reports except for the periodic CSI report corresponding to the subframe set accompanied by the subframe set index of the eICIC subframe set are dropped.

It is preferable that S3104-1 is applied in a case where the periodic CSI reports corresponding to the subframe sets accompanied by the subframe set indexes of different eICIC subframe sets collide after S3104-3-1 is applied. The application order of S3104-1 is not limited to a point of time after S3104-3-1 is applied. For example, S3104-3-1 may be applied after S3104-1 is applied, or S3104-1 and S3104-3-1 may be simultaneously applied.

S3104-3-2 will be described. If the periodic CSI report corresponding to the subframe set accompanied by the subframe set index of the eICIC subframe set and the periodic CSI report corresponding to the subframe set accompanied by the subframe set index of the eIMTA subframe set collide, all the periodic CSI reports corresponding to the subframe set accompanied by the subframe set index of the eICIC subframe set are dropped. That is, the periodic CSI report corresponding to the subframe set accompanied by the subframe set index of the eICIC subframe set has a low priority. That is, the periodic CSI report corresponding to the subframe set accompanied by the subframe set index of the eIMTA subframe set has a high priority. That is, all the periodic CSI reports except for the periodic CSI report corresponding to the subframe set accompanied by the subframe set index of the eIMTA subframe set are dropped.

It is preferable that S3104-2 is applied in a case where the periodic CSI reports corresponding to the subframe sets accompanied by the subframe set indexes of different eIMTA subframe sets collide after S3104-3-2 is applied. The application order of S3104-2 is not limited to a point of time after S3104-3-2 is applied. For example, S3104-3-2 may be applied after S3104-2 is applied, or S3104-2 and S3104-3-2 may be simultaneously applied.

Here, the mobile station apparatus 1 may perform the following control.

The mobile station apparatus 1 may transmit the information indicating whether or not the eICIC function is support and/or the information indicating whether or not the eIMTA function is supported. In a case where only the eICIC function is supported, the dropping rule may not be applied to the periodic CSI reports corresponding to the subframe sets accompanied by the subframe set indexes of different eICIC subframe sets. In a case where only the eIMTA function is supported, the dropping rule may be applied to the periodic CSI reports corresponding to the subframe sets accompanied by the subframe set indexes of different eIMTA subframe sets. In a case where the eICIC function and the eIMTA function are supported, the dropping rule may be applied to the periodic CSI reports corresponding to the subframe sets accompanied by the subframe set indexes of different eICIC subframe sets and the periodic CSI reports corresponding to the subframe sets accompanied by the subframe set indexes of different eIMTA subframe sets.

In a case where the mobile station apparatus 1 transmits only the information related to the supporting of the eICIC function, the dropping rule may not be applied to the periodic CSI reports corresponding to the subframe sets accompanied by the subframe set indexes of different eICIC subframe sets. That is, at least S3104-1 may not be applied.

In a case where the mobile station apparatus 1 transmits only the information related to the supporting of the eIMTA function, the dropping rule may be applied to the periodic CSI reports corresponding to the subframe sets accompanied by the subframe set indexes of different eIMTA subframe sets. That is, at least S3104-2 may be applied.

In a case where the mobile station apparatus 1 transmits the information related to the supporting of the eICIC function and the information related to the supporting of the eIMTA function, the dropping rule may be applied to the periodic CSI reports corresponding to the subframe sets accompanied by the subframe set indexes of different eICIC subframe sets and the periodic CSI reports corresponding to the subframe sets accompanied by the subframe set indexes of different eIMTA subframe sets. That is, at least S3104-1 and S3104-2 may be applied.

That is, the information related to the supporting of the eIMTA function may also be referred to (may be interpreted) as information for determining whether or not to apply the dropping rule to the periodic CSI reports corresponding to the subframe sets accompanied by the subframe set indexes of different eICIC subframe sets and the periodic CSI reports corresponding to the subframe sets accompanied by the subframe set indexes of different eIMTA subframe sets. That is, in a case where the mobile station apparatus 1 transmits information associated with the application of the dropping rule (information related to the supporting of the eIMTA function), the dropping rule may be applied to the periodic CSI reports corresponding to the subframe sets accompanied by the subframe set indexes of different eICIC subframe sets and the periodic CSI reports corresponding to the subframe sets accompanied by the subframe set indexes of different eIMTA subframe sets.

In a case where the base station apparatus 3 receives only the information related to the supporting of the eICIC function, it may be assumed that the CSI is transmitted without applying the dropping rule to the periodic CSI reports corresponding to the subframe sets accompanied by the subframe set indexes of different eICIC subframe sets. That is, it may be assumed that the CSI is transmitted without applying at least S3104-1. That is, it is preferable that the periodic CSI reports do not collide through scheduling. That is, it is preferable that the periodic CSI reports are controlled (scheduled) such that the periodic CSI reports corresponding to the subframe sets accompanied by the subframe set indexes of different eICIC subframe sets do not collide.

In a case where the base station apparatus 3 receives only the information related to the supporting of the eIMTA function, it may be assumed that the CSI is transmitted while applying the dropping rule to the periodic CSI reports corresponding to the subframe sets accompanied by the subframe set indexes of different eIMTA subframe sets. That is, it may be assumed that the CSI is transmitted while applying at least S3104-2.

In a case where the base station apparatus 3 receives the information related to the supporting of the eICIC function and the information related to the supporting of the eIMTA function, it may be assumed that the CSI is transmitted while applying the dropping rule to the periodic CSI reports corresponding to the subframe sets accompanied by the subframe set indexes of different eICIC subframe sets and the periodic CSI reports corresponding to the subframe sets accompanied by the subframe set indexes of different eIMTA subframe sets. That is, it may be assumed that the CSI is transmitted while applying at least S3104-1 and S3104-2.

The expression "the periodic CSI report is dropped" used in the present embodiment has the same meaning as that of "a specific periodic CSI report is transmitted and a periodic CSI report other than the specific periodic CSI report is not transmitted".

The eIMTA subframe set may be configured for only the serving cell for which the eIMTA function is configured.

The information indicating the eIMTA subframe set and the information indicating the first downlink reference UL-DL configuration may be included in the same RRC message.

Figure 32:
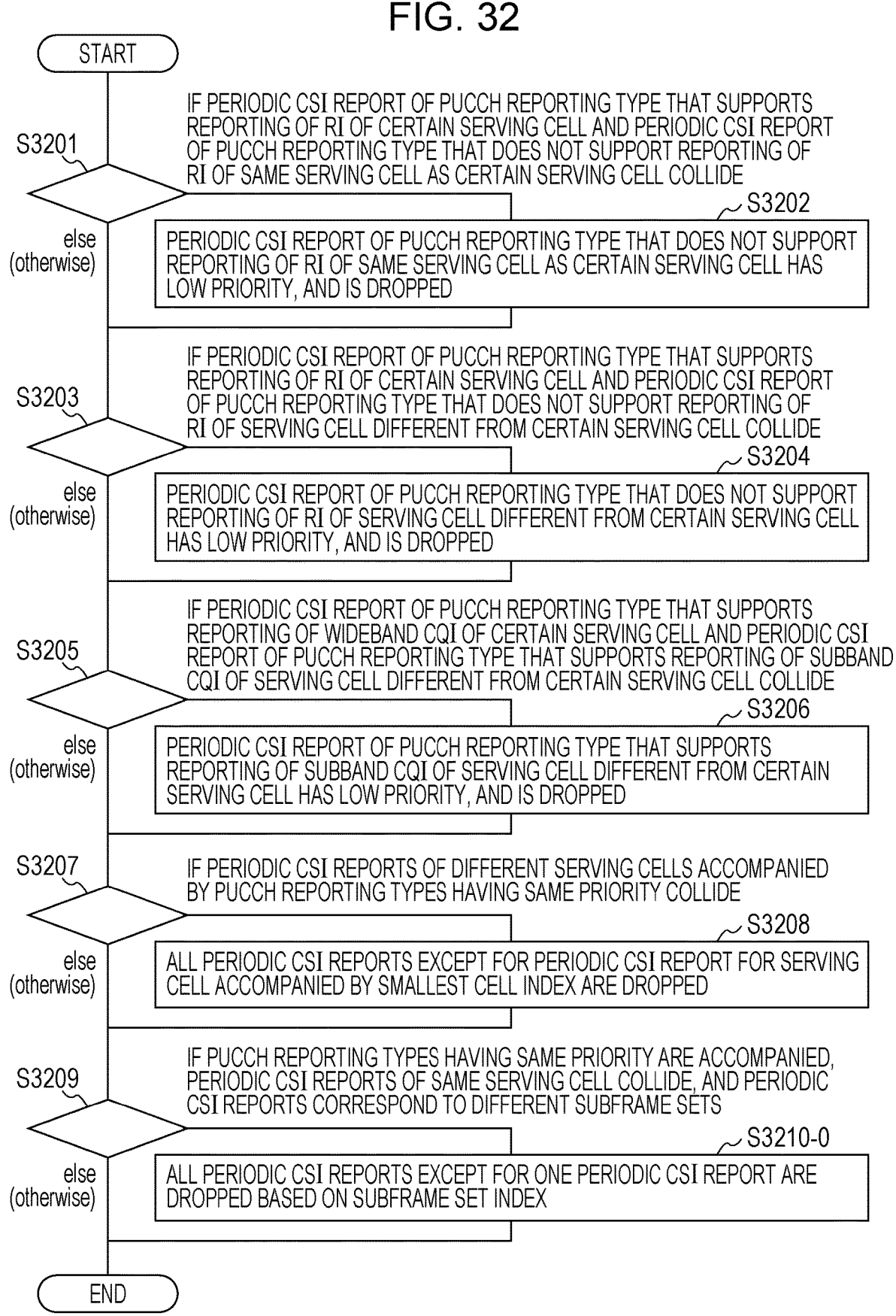
FIG. 32 shows an example of a flow of determining the priority of the periodic CSI report in a case where a plurality of serving cells is configured for the mobile station apparatus 1 according to the present embodiment.

FIG. 32 is a diagram showing an example of a flow of determining the priority of the periodic CSI report in a case where the plurality of serving cells is configured for the mobile station apparatus 1. The mobile station apparatus 1 performs the flow of determining the priority of FIG. 32 on a prescribed serving cell or each of the plurality of serving cell.

If the periodic CSI report of the PUCCH reporting type that supports the reporting of the RI of a certain serving cell and the periodic CSI report of the PUCCH reporting type that does not support the reporting of the RI of the same serving cell as the certain serving cell collide (S3201), the mobile station apparatus 1 drops the latter periodic CSI report (S3202). That is, the periodic CSI report of the PUCCH reporting type that does not support the reporting of the RI of the same serving cell as the certain serving cell has a low priority, and is dropped.

If the periodic CSI report of the PUCCH reporting type that supports the reporting of the RI of a certain serving cell and the periodic CSI report of the PUCCH reporting type that does not support the reporting of the RI of the serving cell different from the certain serving cell collide (S3203), the mobile station apparatus 1 drops the latter periodic CSI report (S3204). That is, the periodic CSI report of the PUCCH reporting type that does not support the reporting of the RI of the serving cell different from the certain serving cell has a low priority, and is dropped.

If the periodic CSI report of the PUCCH reporting type that supports the reporting of the wideband CQI of a certain serving cell and the periodic CSI report of the PUCCH reporting type that supports the reporting of the subband CQI of the serving cell different from the certain serving cell collide (S3205), the mobile station apparatus 1 drops the latter periodic CSI report (S3206). That is, the periodic CSI report of the PUCCH reporting type that supports the reporting of the subband CQI of the serving cell different from the certain serving cell has a low priority, and is dropped.

If the periodic CSI reports of different serving cells accompanied by the PUCCH reporting types having the same priority collide (S3207), the mobile station apparatus 1 drops all the periodic CSI reports except for the periodic CSI report for the serving cell accompanied by the smallest cell index (S3208). That is, the periodic CSI report for the serving cell accompanied by the large cell index has a low priority. That is, the periodic CSI report for the serving cell accompanied by the smallest cell index has a high priority. That is, all the periodic CSI reports except for the periodic CSI report for the serving cell accompanied by the smallest cell index are dropped.

If the PUCCH reporting types having the same priority are accompanied, the periodic CSI reports of the same serving cell collide, and the periodic CSI reports correspond to different subframe sets (S3209), the mobile station apparatus 1 drops all the periodic CSI reports except for one periodic CSI report based on the subframe set index (S3210-0). That is, the periodic CSI report having the large subframe set index has a low priority. That is, the periodic CSI report having the smallest subframe set index has a high priority. That is, all the periodic CSI reports except for the periodic CSI report having the smallest subframe set index are dropped.

S3209 and S3210-0 may be applied before S3207 and S3208. That is, S3207 to S3210-0 may be applied in the order of S3209, S3210-0, S3207 and S3208. That is, the dropping rule of S3208 may be applied to the periodic CSI reports accompanied by the PUCCH reporting types having the same priority after the dropping rule of S3210-0 are applied.

Here, S3210-0 may be replaced with any one of the following S3210-1 to S3210-3. At least two or more of S3210-0 to S3210-3 may be simultaneously performed. In a case where at least two or more of S3210-0 to S3210-3 are simultaneously performed, the process may be performed in any order.

S3210-1 will be described. S3210-1 is an example of a process in a case where the periodic CSI reports corresponding to the subframe sets accompanied by the subframe set indexes of different eICIC subframe sets collide. If the periodic CSI reports corresponding to the subframe sets accompanied by the subframe set indexes of different eICIC subframe sets collide, all the periodic CSI reports corresponding to the subframe sets accompanied by the subframe set indexes which are greater than 0 are dropped. That is, the periodic CSI report corresponding to the subframe set accompanied by the large subframe set index has a low priority. That is, the periodic CSI report corresponding to the subframe set accompanied by the smallest subframe set index has a high priority. That is, all the periodic CSI reports except for the periodic CSI report corresponding to the subframe set accompanied by the smallest subframe set index are dropped.

The periodic CSI report may be controlled by the base station apparatus 3 such that the periodic CSI reports corresponding to the subframe sets accompanied by the subframe set indexes of different eICIC subframe sets do not collide. That is, S3210-1 may not be applied. That is, the dropping rule may not be applied to the periodic CSI reports corresponding to the subframe sets accompanied by the subframe set indexes of different eICIC subframe sets.

S3210-2 will be described. S3210-2 is an example of a process in a case where the periodic CSI reports corresponding to the subframe sets accompanied by the subframe set indexes of different eIMTA subframe sets collide. If the periodic CSI reports corresponding to the subframe sets accompanied by the subframe set indexes of different eIMTA subframe sets collide, all the periodic CSI reports corresponding to the subframe sets accompanied by the subframe sets which are greater than 0 are dropped. That is, the periodic CSI report corresponding to the subframe set accompanied by the large subframe set index has a low priority. That is, the periodic CSI report corresponding to the subframe set accompanied by the smallest subframe set index has a high priority. That is, all the periodic CSI reports except for the periodic CSI report corresponding to the subframe set accompanied by the smallest subframe set index are dropped.

S3210-3 will be described. S3210-3 is an example of a process in a case where the periodic CSI report corresponding to the subframe set accompanied by the subframe set index of the eICIC subframe set and the periodic CSI report corresponding to the subframe set accompanied by the subframe set index of the eIMTA subframe set collide. If the periodic CSI report corresponding to the subframe set accompanied by the subframe set index of the eICIC subframe set and the periodic CSI report corresponding to the subframe set accompanied by the subframe set index of the eIMTA subframe set collide, it is preferable that any one of S3210-3-1 and S3210-3-2 is applied. That is, a case where S3210-3 is applied has the same meaning as a case where S3210-3-1 is applied or a case where S3210-3-2 is applied.

S3210-3-1 will be described. If the periodic CSI report corresponding to the subframe set accompanied by the subframe set index of the eICIC subframe set and the periodic CSI report corresponding to the subframe set accompanied by the subframe set index of the eIMTA subframe set collide, all the periodic CSI reports corresponding to the subframe set accompanied by the subframe set index of the eIMTA subframe set are dropped. That is, the periodic CSI report corresponding to the subframe set accompanied by the subframe set index of the eIMTA subframe set has a low priority. That is, the periodic CSI report corresponding to the subframe set accompanied by the subframe set index of the eICIC subframe set has a high priority. That is, all the periodic CSI reports except for the periodic CSI report corresponding to the subframe set accompanied by the subframe set index of the eICIC subframe set are dropped.

In a case where the periodic CSI reports corresponding to the subframe sets accompanied by the subframe set indexes of different eICIC subframe sets collide after S3210-3-1 is applied, it is preferable that S3210-1 is applied. The application order of S3210-1 is not limited to a point of time after S3210-3-1 is applied. For example, S3210-3-1 may be applied after S3210-1 is applied, or S3210-1 and S3210-3-1 may be simultaneously applied.

S3210-3-2 will be described. If the periodic CSI report corresponding to the subframe set accompanied by the subframe set index of the eICIC subframe set and the periodic CSI report corresponding to the subframe set accompanied by the subframe set index of the eIMTA subframe set collide, all the periodic CSI reports corresponding to the subframe set accompanied by the subframe set index of the eICIC subframe set are dropped. That is, the periodic CSI report corresponding to the subframe set accompanied by the subframe set index of the eICIC subframe set has a low priority. That is, the periodic CSI report corresponding to the subframe set accompanied by the subframe set index of the eIMTA subframe set has a high priority. That is, all the periodic CSI reports except for the periodic CSI report corresponding to the subframe set accompanied by the subframe set index of the eIMTA subframe set are dropped.

In a case where the periodic CSI reports corresponding to the subframe sets accompanied by the subframe set indexes of different eIMTA subframe sets collide after S3210-3-2 is applied, it is preferable that S3210-2 is applied. The application order of S3210-2 is not limited to a point of time after S3210-3-2 is applied. For example, S3210-3-2 may be applied after S3210-2 is applied, or S3210-2 and S3210-3-2 may be simultaneously applied.

Here, the mobile station apparatus 1 may perform the following control.

The mobile station apparatus 1 may transmit the information indicating whether or not the eICIC function is supported and/or the information indicating whether or not the eIMTA function is supported. In a case where only the eICIC function is supported, the dropping rule may not be applied to the periodic CSI reports corresponding to the subframe sets accompanied by the subframe set indexes of different eICIC subframe sets. In a case where only the eIMTA function is supported, the dropping rule may be applied to the periodic CSI reports corresponding to the subframe sets accompanied by the subframe set indexes of different eIMTA subframe sets. In a case where the eICIC function and the eIMTA function are supported, the dropping rule may be applied to the periodic CSI reports corresponding to the subframe sets accompanied by the subframe set indexes of different eICIC subframe sets and the periodic CSI reports corresponding to the subframe sets accompanied by the subframe set indexes of different eIMTA subframe sets.

In a case where the mobile station apparatus 1 transmits only the information related to the supporting of the eICIC function, the dropping rule may not be applied to the periodic CSI reports corresponding to the subframe sets accompanied by the subframe set indexes of different eICIC subframe sets. That is, at least S3210-1 may not be applied.

In a case where the mobile station apparatus 1 transmits only the information related to the supporting of the eIMTA function, the dropping rule may be applied to the periodic CSI reports corresponding to the subframe sets accompanied by the subframe set indexes of different eIMTA subframe sets. That is, at least S3210-2 may be applied.

In a case where the mobile station apparatus 1 transmits the information related to the supporting of the eICIC function and the information related to the supporting of the eIMTA function, the dropping rule may be applied to the periodic CSI reports corresponding to the subframe sets accompanied by the subframe set indexes of different eICIC subframe sets and the periodic CSI reports corresponding to the subframe sets accompanied by the subframe set indexes of different eIMTA subframe sets. That is, at least S3210-1 and S3210-2 may be applied.

That is, the information related to the supporting of the eIMTA function may also be referred to (may be interpreted) as information for determining whether or not to apply the dropping rule to the periodic CSI reports corresponding to the subframe sets accompanied by the subframe set indexes of different eICIC subframe sets and the periodic CSI reports corresponding to the subframe sets accompanied by the subframe set indexes of different eIMTA subframe sets. That is, in a case where the mobile station apparatus 1 transmits the information (information related to the supporting of the eIMTA function) associated with the application of the dropping rule, the dropping rule may be applied to the periodic CSI reports corresponding to the subframe sets accompanied by the subframe set indexes of different eICIC subframe sets and the periodic CSI reports corresponding to the subframe sets accompanied by the subframe set indexes of different eIMTA subframe sets.

In a case where the base station apparatus 3 receives only the information related to the supporting of the eICIC function, it may be assumed that the CSI is transmitted without applying the dropping rule to the periodic CSI reports corresponding to the subframe sets accompanied by the subframe set indexes of different eICIC subframe sets. That is, it may be assumed that the CSI is transmitted without applying at least S3210-1. That is, it is preferable that the periodic CSI reports do not collide through scheduling. That is, it is preferable that the periodic CSI reports are controlled (scheduled) such that the periodic CSI reports corresponding to the subframe sets accompanied by the subframe set indexes of different eICIC subframe sets do not collide.

In a case where the base station apparatus 3 receives only the information related to the supporting of the eIMTA function, it may be assumed that the CSI is transmitted while applying the dropping rule to the periodic CSI reports corresponding to the subframe sets accompanied by the subframe set indexes of different eIMTA subframe sets. That is, it may be assumed that the CSI is transmitted while applying at least S3210-2.

In a case where the base station apparatus 3 receives the information related to the supporting of the eICIC function and the information related to the supporting of the eIMTA function, it may be assumed that the CSI is transmitted while applying the dropping rule to the periodic CSI reports corresponding to the subframe sets accompanied by the subframe set indexes of different eICIC subframe sets and the periodic CSI reports corresponding to the subframe sets accompanied by the subframe set indexes of different eIMTA subframe sets. That is, it may be assumed that the CSI is transmitted while applying at least S3210-1 and S3210-2.

The expression "the periodic CSI report is dropped" used in the present embodiment has the same meaning as that of a case where "a specific periodic CSI report is transmitted and a periodic CSI report other than the specific periodic CSI report is not transmitted".

The eIMTA subframe set may be configured for only the serving cell for which the eIMTA function is configured.

The information indicating the eIMTA subframe set and the information indicating the first downlink reference UL-DL configuration may be included in the same RRC message.

FIG. 33 is a diagram showing an example a flow of determining the priority of the periodic CSI report in a case where the plurality of serving cells is configured for the mobile station apparatus 1. The mobile station apparatus 1 performs the flow of determining the priority of FIG. 33 on a prescribed serving cell or each of the plurality of serving cells.

If the periodic CSI report of the PUCCH reporting type that supports the reporting of the RI of a certain serving cell and the periodic CSI report of the PUCCH reporting type that does not support the reporting of the RI of the same serving cell as the certain serving cell collide (S3301), the mobile station apparatus 1 drops the latter periodic CSI report (S3302). That is, the periodic CSI report of the PUCCH reporting type that does not support the reporting of the RI of the same serving cell as the certain serving cell has a low priority, and is dropped.

If the PUCCH reporting types having the same priority are accompanied, the periodic CSI reports of the same serving cell collide, and the periodic CSI reports correspond to different subframe sets (S3303), the mobile station apparatus 1 drops all the periodic CSI reports except for one periodic CSI report based on the subframe set index (S3304-0). That is, the periodic CSI report having the large subframe set index has a low priority. That is, the periodic CSI report having the smallest subframe set index has a high priority. That is, all the periodic CSI reports except for the periodic CSI report having the smallest subframe set index are dropped.

If the periodic CSI report of the PUCCH reporting type that supports the reporting of the RI of a certain serving cell and the periodic CSI report of the PUCCH reporting type that does not support the reporting of the RI of the serving cell different from the certain serving cell collide (S3305), the mobile station apparatus 1 drops the latter periodic CSI report (S3306). That is, the periodic CSI report of the PUCCH reporting type that does not support the reporting of the RI of the serving cell different from the certain serving cell has a low priority, and is dropped.

If the periodic CSI report of the PUCCH reporting type that supports the reporting of the wideband CQI of a certain serving cell and the periodic CSI report of the PUCCH reporting type that supports the reporting of the subband CQI of the serving cell different from the certain serving cell collide (S3307), the mobile station apparatus 1 drops the latter periodic CSI report (S3308). That is, the periodic CSI report of the PUCCH reporting type that supports the reporting of the subband CQI of the serving cell different from the certain serving cell has a low priority, and is dropped.

If the PUCCH reporting types having the same priority are accompanied, the periodic CSI reports of different serving cells collide, and the periodic CSI reports correspond to the same subframe set (S3309), the mobile station apparatus 1 drops all the periodic CSI reports except for the periodic CSI report for the serving cell accompanied by the smallest cell index (S3310). That is, the periodic CSI report for the serving cell accompanied by the large cell index has a low priority. That is, the periodic CSI report for the serving cell accompanied by the smallest cell index has a high priority. That is, all the periodic CSI reports except for the periodic CSI report for the serving cell accompanied by the smallest cell index are dropped.

If the PUCCH reporting types having the same priority are accompanied, the periodic CSI reports of different serving cells collide, and the periodic CSI reports correspond to different subframe sets (S3311), the mobile station apparatus 1 drops all the periodic CSI reports except for one periodic CSI report based on the subframe set index (S3312-0). That is, the periodic CSI report having the large subframe set index has a low priority. That is, the periodic CSI report having the smallest subframe set index has a high priority. That is, all the periodic CSI reports except for the periodic CSI report having the smallest subframe set index are dropped.

S3311 and S3312-0 may be applied before S3309 and S3310. That is, S3309 to S3312-0 may be applied in the order of S3311, S3312-0, S3309 and S3310. That is, the dropping rule of S3310 may be applied to the periodic CSI reports accompanied by the PUCCH reporting types having the same priority after the dropping rule of S3312-0 is applied.

Here, S3304-0 and/or S3312-0 may be replaced with any one of the following S3304-1 to S3304-3. At least two or more of S3304-0 and/or S3312-0, and S3304-0 to S3304-3 may be simultaneously performed. In a case where at least two or more of S3304-0 and/or S3312-0, and S3304-0 to S3304-3 are simultaneously performed, the process may be performed in any order.

S3304-1 will be described. S3304-1 is an example of a process in a case where the periodic CSI reports corresponding to the subframe sets accompanied by the subframe set indexes of different eICIC subframe sets collide. If the periodic CSI reports corresponding to the subframe sets accompanied by the subframe set indexes of different eICIC subframe sets collide, all the periodic CSI reports corresponding to the subframe sets accompanied by the subframe set indexes which are greater than 0 are dropped. That is, the periodic CSI report corresponding to the subframe set accompanied by the large subframe set index has a low priority. That is, the periodic CSI report corresponding to the subframe set accompanied by the smallest subframe set index has a high priority. That is, all the periodic CSI reports except for the periodic CSI report corresponding to the subframe set accompanied by the smallest subframe set are dropped.

The periodic CSI reports may be controlled by the base station apparatus 3 such that the periodic CSI reports corresponding to the subframe sets accompanied by the subframe set indexes of different eICIC subframe sets do not collide. That is, S3304-1 may not be applied. That is, the dropping rule may not be applied to the periodic CSI reports corresponding to the subframe sets accompanied by the subframe set indexes of different eICIC subframe sets.

S3304-2 will be described. S3304-2 is an example of a process in a case where the periodic CSI reports corresponding to the subframe sets accompanied by the subframe set indexes of different eIMTA subframe sets. If the periodic CSI reports corresponding to the subframe sets accompanied by the subframe set indexes of different eIMTA subframe sets collide, all the periodic CSI reports corresponding to the subframe sets accompanied by the subframe set indexes which are greater than 0 are dropped. That is, the periodic CSI report corresponding to the subframe set accompanied by the large subframe set index has a low priority. That is, the periodic CSI report corresponding to the subframe set accompanied by the smallest subframe set index has a high priority. That is, all the periodic CSI reports except for the periodic CSI report corresponding to the subframe set accompanied by the smallest subframe set index are dropped.

S3304-3 will be described. S3304-3 is an example of a process in a case where the periodic CSI report corresponding to the subframe set accompanied by the subframe set index of the eICIC subframe set and the periodic CSI report corresponding to the subframe set accompanied by the subframe set index of the eIMTA subframe set collide. If the periodic CSI report corresponding to the subframe set accompanied by the subframe set index of the eICIC subframe set and the periodic CSI report corresponding to the subframe set accompanied by the subframe set index of the eIMTA subframe set collide, it is preferable that any one of S3304-3-1 and S3304-3-2 is applied. That is, a case where S3304-3 is applied is the same as a case where S3304-3-1 is applied or a case where S3304-3-2 is applied.

S3304-3-1 will be described. If the periodic CSI report corresponding to the subframe set accompanied by the subframe set index of the eICIC subframe set and the periodic CSI report corresponding to the subframe set accompanied by the subframe set index of the eIMTA subframe set collide, all the periodic CSI reports corresponding to the subframe set accompanied by the subframe set index of the eIMTA subframe set are dropped. That is, the periodic CSI report corresponding to the subframe set accompanied by the subframe set index of the eIMTA subframe set has a low priority. That is, the periodic CSI report corresponding to the subframe set accompanied by the subframe set index of the eICIC subframe set has a high priority. That is, all the periodic CSI reports except for the periodic CSI report corresponding to the subframe set accompanied by the subframe set index of the eICIC subframe set are dropped.

In a case where the periodic CSI reports corresponding to the subframe sets accompanied by the subframe set indexes of different eICIC subframe sets collide after S3304-3-1 is applied, it is preferable that S3304-1 is applied. The application order of S3304-1 is not limited to a point of time after S3304-3-1 is applied. For example, S3304-3-1 may be applied after S3304-1 is applied, or S3304-1 and S3304-3-1 may be simultaneously applied.

S3304-3-2 will be described. If the periodic CSI report corresponding to the subframe set accompanied by the subframe set index of the eICIC subframe set and the periodic CSI report corresponding to the subframe set accompanied by the subframe set index of the eIMTA subframe set collide, all the periodic CSI reports corresponding to the subframe sets accompanied by the subframe set indexes of the eICIC subframe sets are dropped. That is, the periodic CSI report corresponding to the subframe set accompanied by the subframe set index of the eICIC subframe set has a low priority. That is, the periodic CSI report corresponding to the subframe set accompanied by the subframe set index of the eIMTA subframe set has a high priority. That is, all the periodic CSI reports except for the periodic CSI report corresponding to the subframe set accompanied by the subframe set index of the eIMTA subframe set are dropped.

In a case where the periodic CSI reports corresponding to the subframe sets accompanied by the subframe set indexes of different eIMTA subframe sets collide after S3304-3-2 is applied, it is preferable that S3304-2 is applied. The application order of S3304-2 is not limited to a point of time after S3304-3-2 is applied. For example, S3304-3-2 may be applied after S3304-2 is applied, or S3304-2 and S3304-3-2 may be simultaneously applied.

Here, the mobile station apparatus 1 may perform the following control.

The mobile station apparatus 1 may transmit the information indicating whether or not the eICIC function is supported and/or the information indicating whether or not the eIMTA function is supported. In a case where only the eICIC function is supported, the dropping rule may not be applied to the periodic CSI reports corresponding to the subframe sets accompanied by the subframe set indexes of different eICIC subframe sets. In a case where only the eIMTA function is supported, the dropping rule may be applied to the periodic CSI reports corresponding to the subframe sets accompanied by the subframe set indexes of different eIMTA subframe sets. In a case where the eICIC function and the eIMTA function are supported, the dropping rule may be applied to the periodic CSI reports corresponding to the subframe sets accompanied by the subframe set indexes of different eICIC subframe sets and the periodic CSI reports corresponding to the subframe sets accompanied by the subframe set indexes of different eIMTA subframe sets.

In a case where the mobile station apparatus 1 transmits only the information related to the supporting of the eICIC function, the dropping rule may not be applied to the periodic CSI reports corresponding to the subframe sets accompanied by the subframe set indexes of different eICIC subframe sets. That is, at least S3304-1 may not be applied.

In a case where the mobile station apparatus 1 transmits only the information related to the supporting of the eIMTA function, the dropping rule may be applied to the periodic CSI reports corresponding to the subframe sets accompanied by the subframe set indexes of different eIMTA subframe sets. That is, at least S3304-2 may be applied.

In a case where the mobile station apparatus 1 transmits the information related to the supporting of the eICIC function and the information related to the supporting of the eIMTA function, the dropping rule may be applied to the periodic CSI reports corresponding to the subframe sets accompanied by the subframe set indexes of different eICIC subframe sets and the periodic CSI reports corresponding to the subframe sets accompanied by the subframe set indexes of different eIMTA subframe sets. That is, at least S3304-1 and S3304-2 may be applied.

That is, the information related to the supporting of the eIMTA function may also be referred to (may be interpreted) as information for determining whether or not to apply the dropping rule to the periodic CSI reports corresponding to the subframe sets accompanied by the subframe set indexes of different eICIC subframe sets and the periodic CSI reports corresponding to the subframe sets accompanied by the subframe set indexes of different eIMTA subframe sets. That is, in a case where the mobile station apparatus 1 transmits the information (information related to the supporting of the eIMTA function) associated with the application of the dropping rule, the dropping rule may be applied to the periodic CSI reports corresponding to the subframe sets accompanied by the subframe set indexes of different eICIC subframe sets and the periodic CSI reports corresponding to the subframe sets accompanied by the subframe set indexes of different eIMTA subframe sets.

In a case where the base station apparatus 3 receives only the information related to the supporting of the eICIC function, it may be assumed that the CSI is transmitted without applying the dropping rule to the periodic CSI reports corresponding to the subframe sets accompanied by the subframe set indexes of different eICIC subframe sets. That is, it may be assumed that the CSI is transmitted without applying at least S3304-1. That is, it is preferable that the periodic CSI reports do not collide through scheduling. That is, it is preferable that the periodic CSI reports are controlled (scheduled) such that the periodic CSI reports corresponding to the subframe sets accompanied by the subframe set indexes of different eICIC subframe sets do not collide.

In a case where the base station apparatus 3 receives only the information related to the supporting of the eIMTA function, it may be assumed that the CSI is transmitted while applying the dropping rule to the periodic CSI reports corresponding to the subframe sets accompanied by the subframe set indexes of different eIMTA subframe sets. That is, it may be assumed that the CSI is transmitted while applying at least S3304-2.

In a case where the base station apparatus 3 receives the information related to the supporting of the eICIC function and the information related to the supporting of the eIMTA function, it may be assumed that the CSI is transmitted while applying the dropping rule to the periodic CSI reports corresponding to the subframe sets accompanied by the subframe set indexes of different eICIC subframe sets and the periodic CSI reports corresponding to the subframe sets accompanied by the subframe set indexes of different eIMTA subframe sets. That is, it may be assumed that the CSI is transmitted while applying at least S3304-1 and S3304-2.

The expression "the periodic CSI report is dropped" used in the present embodiment has the same meaning as that of a case where "a specific periodic CSI is transmitted and a periodic CSI report other than the specific periodic CSI report is not transmitted".

The eIMTA subframe set may be configured for only the serving cell for which the eIMTA function is configured.

The information indicating the eIMTA subframe set and the information indicating the first downlink reference UL-DL configuration may be included in the same RRC message.

Accordingly, in the wireless communication system capable of using the channel state information, the base station apparatus 3 can efficiently communicate with the mobile station apparatus 1.

The programs operated in the base station apparatus 3 and the mobile station apparatus 1 according to the present invention may be programs (causing a computer to function) for controlling a central processing unit (CPU) such that the functions of the above-described embodiment according to the present invention are realized. The information treated in the apparatuses is temporarily accumulated in a random access memory (RAM) at the time of the processing, and then is stored in various ROMs such as a flash read only memory (ROM) or hard disk drive (HDD). When necessary, the information is read by the CPU, and is modified or rewritten.

A part of the mobile station apparatus 1 and the base station apparatus 3 according to the above-described embodiment may be realized as a computer. In this case, the program for realizing the control function may be recorded in a computer-readable recording medium, and the program recorded in the recording medium may be realized by being read and executed in a computer system.

It is assumed that the "computer system" mentioned herein is a computer system built into the mobile station apparatus 1 or the base station apparatus 3, and includes OS or hardware such as peripheral devices. The "computer-readable recording medium" refers to a portable medium such as a flexible disk, a magneto-optical disk, a ROM or a CD-ROM, and a storage device such as a hard disk built into the computer system.

The "computer-readable recording medium" may include a medium that dynamically retains programs for a short period of time such as a communication line in a case where programs are transmitted via a network such as the Internet or a communication circuit such as a telephone line, and a medium that retains programs for a regular period of time such as a volatile memory within the computer system which is a server or a client in this case. The program may be used to realize a part of the above-described functions, or may be realized by a combination of the above-described functions and programs already recorded in the computer system.

The base station apparatus 3 according to the above-described embodiment may be realized as an aggregate (apparatus group) constituted by a plurality of apparatuses. Each of the apparatuses constituting the apparatus group may include a part or all of the functions or functional blocks of the base station apparatus 3 according to the above-described embodiment. The apparatus group may have the general functions or functional blocks of the base station apparatus 3. The mobile station apparatus 1 according to the above-described embodiment may communicate with the base station apparatus as the aggregate.

The base station apparatus 3 according to the above-described embodiment may be Evolved Universal Terrestrial Radio Access Network (EUTRAN). The base station apparatus 3 according to the above-described embodiment may have a part or all of the functions of the higher node for the eNodeB.

A part or all of the mobile station apparatus 1 and the base station apparatus 3 according to the above-described embodiment may be typically realized as LSI which is an integrated circuit, or may be realized as a chipset. The functional blocks of the mobile station apparatus 1 and the base station apparatus 3 may be individually realized as a chip, or a part or all thereof may be realized as a chip by being integrated. The method of realizing the apparatuses or functional blocks as the integrated circuit is not limited to the LSI, and a dedicated circuit or a general-purpose processor may be used. In a case where a technology of realizing the apparatuses or functional blocks as the integrated circuit has appeared instead of the LSI due to the advance of semiconductor technology, it is possible to use an integrated circuit produced using this technology.

Although it has been described in the embodiment that the mobile station apparatus is used as an example of the mobile station apparatus or the communication device, the present invention is not limited thereto. The present invention may also be applied to mobile station apparatuses or communication devices of stationary or non-movable electronic devices which are installed indoors or outdoors, such as AV devices, kitchen devices, cleaning and washing machines, air conditioners, office devices, vending machines, and other home appliances.

The embodiment of the present invention has been described with reference to the drawings. However, the detailed structure is not limited to the above-described embodiment, and the present invention also includes a change in the design within the gist of the invention. The present invention may be variously changed without departing from the claims, and embodiments acquired by appropriately combining technical means disclosed in different embodiments are included in the technical range of the present invention. The elements described in the respective embodiments and structures acquired by replacing the elements that exhibit the same effects are included therein.

INDUSTRIAL APPLICABILITY

An aspect of the present invention is applicable to a wireless communication system in which it is necessary to efficiently perform communication between a mobile station apparatus and a base station apparatus in the wireless communication system capable of using channel state information.

REFERENCE SIGNS LIST 1 (1A, 1B, 1C) Mobile station apparatus
3 Base station apparatus
101 Higher layer processing unit
103 Control unit
105 Reception unit
107 Transmission unit
301 Higher layer processing unit
303 Control unit
305 Reception unit
307 Transmission unit
1011 Radio resource control unit
1013 Subframe configuration unit
1015 Scheduling information interpretation unit
1017 CSI report control unit
3011 Radio resource control unit
3013 Subframe configuration unit
3015 Scheduling unit
3017 CSI report control unit

The invention claimed is:

1. A user equipment comprising:
measurement circuitry that performs measurement for computing channel state information;
reception circuitry that receives first information or second information from a base station device;
configuring circuitry that configures 1st subframe sets based on the first information, and configures 2nd subframe sets based on the second information, the 1st subframe sets including a first subframe set and a second subframe set, and the 2nd subframe sets including a third subframe set and a fourth subframe set; and
transmitting circuitry that transmits a channel state information report corresponding to at least one of the first subframe set, the second subframe set, the third subframe set, and the fourth subframe set; wherein
the first information is not configured if the second information is configured, and
the channel state information report corresponding to the fourth subframe set is dropped in a case that:
the user equipment is configured with the 2nd subframe sets based on the second information; and
collision between channel state information reports of a same serving cell with physical uplink control channel reporting types of a same priority occurs.

2. The user equipment according to claim 1, wherein collision between channel state information reports of the same serving cell with the physical uplink control channel reporting type of the same priority does not occur if the channel state information reports correspond to the 1st subframe sets based on the first information.

3. The user equipment according to claim 1, wherein the channel state information includes at least a channel quality indicator.

4. The user equipment according to claim 1, wherein the channel state information reports of the same serving cell with the physical uplink control channel reporting types of the same priority include the channel state information report corresponding to at least one of the first subframe set, the second subframe set, the third subframe set, and the fourth subframe set.

5. A base station device comprising:
transmitting circuitry that transmits first information or second information to configure 1st sets and 2nd subframe sets, the 1st subframe sets including a first subframe set and a second subframe set, and the 2nd subframe sets including a third subframe set and a fourth subframe set; and
receiving circuitry that receives a channel state information report corresponding to at least one of the first subframe set, the second subframe set, the third subframe set, and the fourth subframe set, wherein
the transmitting circuitry does not transmit the first information if the second information is transmitted, and
the channel state information report corresponding to the fourth subframe set is dropped in a case that:
the user equipment is configured with the 2nd subframe sets based on the second information, and
collision between channel state information reports of a same serving cell with physical uplink control channel reporting types of a same priority occurs.

6. The base station device according to claim 5, wherein collision between channel state information reports of the same serving cell with the physical uplink control channel reporting type of the same priority does not occur if the channel state information reports correspond to the 1st subframe sets based on the first information.

7. The base station device according to claim 5, wherein the channel state information includes at least a channel quality indicator.

8. The base station device according to claim 5, wherein the channel state information reports of the same serving cell with the physical uplink control channel reporting types of the same priority include the channel state information report corresponding to at least one of the first subframe set, the second subframe set, the third subframe set, and the fourth subframe set.

9. A communication method of a user equipment, the communication method comprising:
performing measurement for computing channel state information;
receiving first information or second information from a base station device;
configuring 1st subframe sets based on the first information and 2nd subframe sets based on the second information, the 1st subframe sets including, a first subframe set and a second subframe set, and the 2nd subframe sets including a third subframe set and a fourth subframe set; and
transmitting a channel state information report corresponding to at least one of the first subframe set, the second subframe set, the third subframe set and the fourth subframe set; wherein
the first information is not configured if the second information is configured, and
the channel state information report corresponding to the fourth subframe set is dropped in a case that:
the user equipment is configured with the 2nd subframe sets based on the second information, and collision between channel state information reports of a same serving cell with physical uplink control channel reporting types of a same priority occurs.

10. A communication method of a base station device, the communication method comprising:
   transmitting first information or second information to configure 1st subframe sets and 2nd subframe sets, the 1st subframe sets including a first subframe set and a second subframe set, and the 2nd subframe sets including a third subframe set and a fourth subframe set; and
   receiving a channel state information report corresponding to at least one of the first subframe set, the second subframe set, the third subframe set, and the fourth subframe set, wherein
   the first information is not transmitted if the second information is transmitted, and
   the channel state information report corresponding to the fourth subframe set is dropped in a case that:
      the user equipment is configured with the 2nd subframe sets based on the second information, and
      collision between channel state information reports of a same serving cell with physical uplink control channel reporting types of a same priority occurs.

* * * * *